(12) United States Patent
Sirowatka

(10) Patent No.: US 7,131,243 B1
(45) Date of Patent: Nov. 7, 2006

(54) DOUBLE-HINGE PLATE, FOLDABLE TRUSS INCORPORATING THE SAME, AND METHODS FOR ASSEMBLING AND ERECTING A FOLDABLE TRUSS

(75) Inventor: John Sirowatka, Alto, MI (US)

(73) Assignee: Universal Forest Products, Inc., Grand Rapids, MI (US)

( * ) Notice: Subject to any disclaimer, the term of this patent is extended or adjusted under 35 U.S.C. 154(b) by 0 days.

(21) Appl. No.: 10/604,061

(22) Filed: Jun. 24, 2003

Related U.S. Application Data

(60) Provisional application No. 60/319,363, filed on Jun. 27, 2002.

(51) Int. Cl.
  E04B 5/04 (2006.01)
  E04C 2/04 (2006.01)
(52) U.S. Cl. .............. 52/604; 52/645; 52/646; 52/71; 52/655.1
(58) Field of Classification Search .......... 52/640, 52/641, 645, 646, 71, 655.1; 403/119, 161, 403/162, 163, 283, 286
See application file for complete search history.

(56) References Cited

U.S. PATENT DOCUMENTS

| | | | |
|---|---|---|---|
| 0,506,154 A | 10/1893 | Buhrman |
| 1,505,593 A | 8/1924 | Fryer |
| 1,979,039 A | 10/1934 | Johnson |
| 2,365,579 A | 12/1944 | Mulligan |
| 2,982,379 A | 5/1961 | Fisher |
| 3,479,783 A | 11/1969 | Jureit |
| 3,605,355 A | 9/1971 | Solesbee |
| 3,760,550 A | 9/1973 | Mueller et al. |
| 3,785,108 A | 1/1974 | Satchell |
| 3,823,522 A | 7/1974 | Jureit et al. |
| RE31,234 E | 5/1983 | Jureit et al. |
| 4,381,635 A | 5/1983 | Solo |
| 4,483,120 A | 11/1984 | Gottlieb |
| 4,538,393 A | 9/1985 | Mitchell |
| 4,549,838 A | 10/1985 | Birckhead |
| 4,562,683 A | 1/1986 | Gottlieb |
| 4,782,641 A | 11/1988 | Manenti et al. |
| 4,831,807 A | 5/1989 | Bolt |
| 5,094,059 A | 3/1992 | Ganescu |
| 5,297,374 A | 3/1994 | Himes |
| 5,385,339 A | 1/1995 | Williams |
| 5,392,908 A | 2/1995 | Black, Jr. |
| 5,426,822 A | 6/1995 | Weir |
| 5,553,375 A | 9/1996 | Powers |
| 5,553,961 A | 9/1996 | Olden |
| 5,568,862 A | 10/1996 | Black, Jr. |
| 5,624,044 A | 4/1997 | Black, Jr. |
| 5,630,697 A | 5/1997 | Black, Jr. |
| 5,634,319 A | 6/1997 | Black, Jr. |
| 5,636,494 A | 6/1997 | Black, Jr. |
| 5,638,658 A | 6/1997 | Black, Jr. |
| 5,640,832 A | 6/1997 | Black, Jr. |
| 5,661,993 A | 9/1997 | Black, Jr. |
| 5,678,395 A | 10/1997 | Black, Jr. |
| 5,702,095 A | 12/1997 | Williams |
| D392,985 S | 3/1998 | Williams |
| 5,765,316 A | 6/1998 | Kavarsky |

(Continued)

Primary Examiner—Daniel P. Stodola
Assistant Examiner—Nahid Amiri
(74) Attorney, Agent, or Firm—McGarry Bair PC

(57) ABSTRACT

A hinged plate is provided for pivotally attaching a pair of lumber members together in a double-hinged manner. A building truss incorporating the double-hinged plate is provided which can be assembled and erected in a facilitated manner.

68 Claims, 52 Drawing Sheets

U.S. PATENT DOCUMENTS

| | | |
|---|---|---|
| 5,810,341 A | 9/1998 | Williams |
| 5,819,492 A | 10/1998 | Konicek |
| 5,833,421 A | 11/1998 | Lees et al. |
| 5,837,014 A | 11/1998 | Williams |
| 5,848,866 A | 12/1998 | Black, Jr. |
| 5,890,339 A | 4/1999 | Willis |
| 5,906,264 A | 5/1999 | Black et al. |
| 5,947,460 A | 9/1999 | Williams |
| 5,970,672 A | 10/1999 | Robinson |
| 6,038,736 A | 3/2000 | Nygren |
| 6,062,527 A | 5/2000 | Nygren, Jr. |
| 6,066,048 A | 5/2000 | Lees |
| 6,076,770 A | 6/2000 | Nygren et al. |
| 6,176,058 B1 | 1/2001 | Trarup |
| 6,205,637 B1 | 3/2001 | Williams |
| 6,364,374 B1 | 4/2002 | Noone et al. |
| 6,375,379 B1 | 4/2002 | Jefferies |

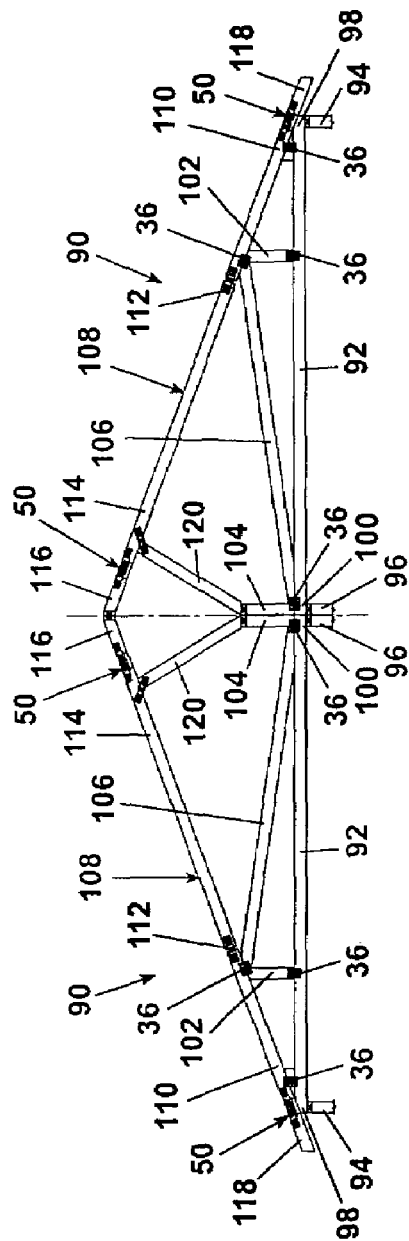
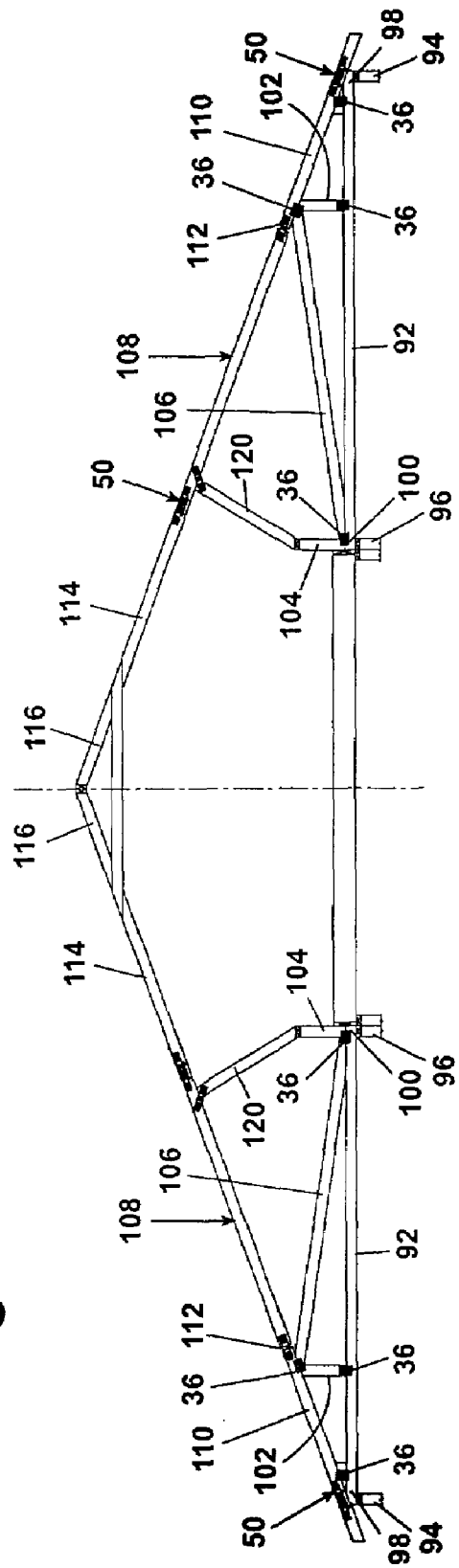
Fig. 20
Fig. 21

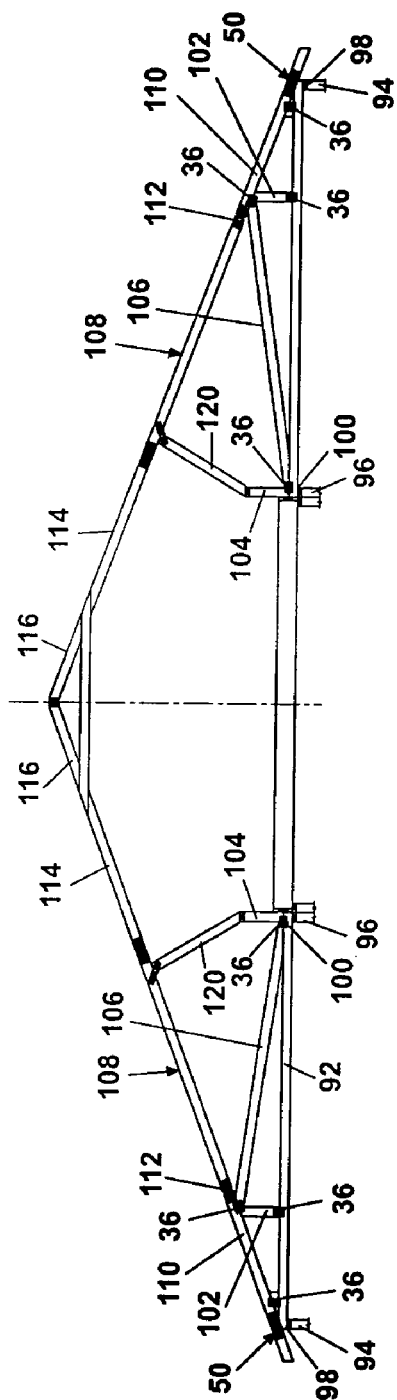
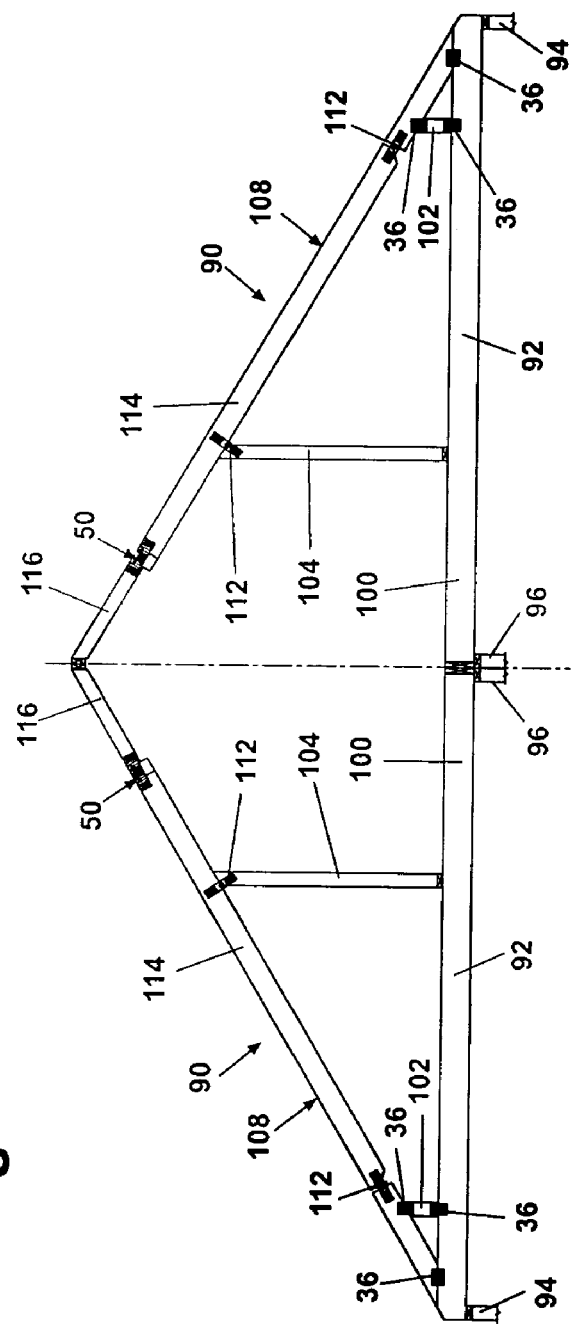
Fig. 64
Fig. 65

DOUBLE-HINGE PLATE, FOLDABLE TRUSS INCORPORATING THE SAME, AND METHODS FOR ASSEMBLING AND ERECTING A FOLDABLE TRUSS

CROSS REFERENCE TO RELATED APPLICATIONS

This application claims the benefit of U.S. Provisional Application Ser. No. 60/319,363, filed on Jun. 27, 2002.

BACKGROUND OF INVENTION

1. Field of the Invention

In one aspect, the invention relates to a hinged plate for pivotally attaching a pair of lumber members together in a double-hinged manner. In another aspect, the invention relates to a building truss incorporating the double-hinged plate. In a further aspect, the invention relates to methods for assembling and erecting a truss incorporating a foldable portion for easy transport.

2. Description of the Related Art

Residential and manufactured homes, as with any building or dwelling, comprise a skeletal structure typically including a floor which supports one or more walls upon which a ceiling and roof are mounted. The ceiling and roof are typically formed by a roof truss, generally formed in a triangular shape which forms, at its lower surface, a ceiling for the interior of the structure and, at its upper surface, a roof for the exterior of the structure.

A typical factory-built structure is shown generally by reference numeral 10 in FIG. 1 comprising a floor structure 12 supporting a plurality of walls 14 thereon. A roof truss 16 is mounted atop the walls 14. The roof truss 16 typically comprises a bottom chord 18 mounted to the walls 14. A web 20 and a ridge beam/kingpost 22 typically extend upwardly from the bottom chord at about a middle portion and an inner end portion of the bottom chord 18, respectively. A lower top chord 24 is typically mounted at an outer end to the bottom chord 24 (a portion of which forms an eaves overhang 26) and at an inner end to an upper end of the web 20. A diagonal web 28 typically extends between an upper portion of the web 20 to the inner end of the bottom chord 18 for structural support. A kneewall 30 often extends angularly and upwardly from the top surface of the ridge beam 22 toward (and mounted to) an inner and upper end of an upper top chord 32 which, in turn, is mounted at a lower, outer end by a hinge plate 34 to the upper end of the lower top chord 24. Conventional nail plates 36 typically accomplish many of the fixed connections between the chord members of the roof truss 16.

Factory-built or manufactured homes are usually constructed in modular units, typically in widths of 10 to 18 feet. This allows the factory-built home to be transported from the factory to the building site. Both width and height restrictions create special challenges and have to be resolved before home shipment can take place. There are often competitive pressures on the factory-built housing to incorporate new architectural features comparable to site-built housing. One desirable feature often requested in manufactured homes is a roof having a steep pitch. In order to be able to manufacture a roof system with a steep pitch off-site and to easily transport the home to a building site, many factory-built homes have trusses that allow the top chord to be lowered (such as that shown in FIG. 1 with the pivotally-mounted lower and upper top chords 24 and 32 by the hinge plate 34).

The pivotable top chord is required so that the roof pitch can be temporarily lowered to allow the home to be transported without exceeding over-the-road height limitations of state highway transportation authorities. When the top chord is lowered, the high end extends past the module on steep pitch roofs which creates width problems. Many manufacturers typically leave the upper or peak section of the roof off so that it can be re-assembled into place at the building site. These extra manufacturing and assembly steps cause manufacturing inefficiencies and quality control problems, typically resulting in an increased cost.

Some attempts have been made in the past to address these problems. First, some prior art systems incorporate a "built-up" cap that is fastened to the upper top chord with a variable size steel strap. Second, rather than attaching the built-up cap with a strap, the cap (which forms the peak of the truss) is shipped as a separate component to the truss and is assembled to the truss at the building site. A third solution is shown in U.S. Pat. No. 5,094,059 to Ganescu, issued Mar. 10, 1992, which uses a double-hinge connector plate which, due to the significant unrestrained shear forces encountered by this plate, requires substantial in-factory and/or on-site work to be performed in order to achieve structural soundness of the truss. A reinforcing member is normally required or vertical supports are needed on both sides of the double-hinge plate.

Although past attempts can not be considered total failures, all have serious shortcomings in that they need substantial amounts of reinforcement that normally take place at the building site. As for the first solution mentioned in the previous paragraph, the aforementioned metal strap is easily twisted in transportation, which creates alignment problems upon reaching the building site. The built-up cap also requires substantial assembly at the building site to create a truss with structural integrity. The double-hinge plate of the Ganescu '059 patent is insufficient without additional in-factory and/or on-site structural add-ons to achieve structural integrity.

SUMMARY OF INVENTION

In one aspect, the invention relates to a hinged plate for pivotally attaching a pair of lumber members together in a double-hinged manner. In another aspect, the invention relates to a building truss incorporating the double-hinged plate. In a further aspect, the invention relates to methods for assembling and erecting a truss incorporating a foldable portion for easy transport.

This invention allows the top chord of a truss to rotate in the direction of the roof covering, typically plywood or oriented strand board (OSB) sheathing. The invention is incorporated into a roof truss in a conventional manner, such as with metal connector plates. Additional field reinforcement at the points of rotation are not required in most cases. When this invention is installed and in use, the upper portion can be finished in the home manufacturer's facility, eliminating many manufacturing inefficiencies and quality control problems.

The problem is solved by creating a system of cut wood members and a double-hinge metal plate connector. The double hinge allows the top chord member to rotate as required. When the top chord is unfolded at the building site, no reinforcing members are required in order for the system to transfer shear loads.

In one aspect, the invention relates to a hinge plate for integrally and pivotally connecting a first truss member to a second truss member comprising: a first connector comprising a planar member having at least one mounting portion thereon, the first connector having a hinge portion thereon; a second connector comprising a planar member having at least one mounting portion thereon, the second connector having a hinge portion thereon; and an intermediate member comprising a planar member having at least one mounting portion thereon, the second connector having a hinge portion at a first end thereof and a hinge portion at a second end thereof opposite to the first end, wherein the hinge portion on the first connector is pivotally mounted to the hinge portion on the first end of the intermediate member and the hinge portion on the second connector is pivotally mounted to the hinge portion on the second end of the intermediate member. A multifunctional pivotal mounting between truss members can thereby be made by fastening the first connector to a first truss member and fastening the second connector to a second truss member.

Various embodiments of the invention are also contemplated. The at least one mounting portion on the first connector can comprise a nail plate. The at least one mounting portion on the second connector can comprise a nail plate. The at least one mounting portion on the intermediate member can comprise a nail plate. The hinge portion on at least one of the first connector, second connector and the intermediate member can comprise a roll-formed hinge portion.

In another aspect, the invention relates to a connector subassembly for integrally and pivotally connecting a first truss member to a second truss member comprising: a connector block having a first end and a second end opposite from the first end; a first connector member extending from the first end of the connector block and pivotally attached thereto, wherein the first connector member is adapted to be fastened to a first truss member; and a second connector member extending from the second end of the connector block and pivotally attached thereto, wherein the second connector member is adapted to be fastened to a second truss member. When the first connector is fastened to the first truss member and when the second connector is fastened to the second truss member, the first truss member can thereby be folded reversely atop the second truss member by pivoting the first and second truss members about the respective pivotal mountings on the connector block and the connector block can provide spacing for such folding to occur.

Various embodiments of the invention are also contemplated. The first connector member and the second connector member can be interconnected by an intermediate member. The first connector member can be hingedly connected to the intermediate member. The second connector member can be hingedly connected to the intermediate member. The intermediate member can be fastened to the connector block. The intermediate member can comprise an integral interconnection with the connector block.

The connector block can have a recessed portion adapted to receive a portion of the first truss member when the first truss member can be positioned in a folded position with respect to the connector block. The recessed portion can comprise a chamfered portion. The recessed portion can comprise a notched portion. The notched portion can be rectangular.

The connector block can have a recessed portion adapted to receive a portion of the second truss member when the second truss member can be positioned in a folded position with respect to the connector block. The recessed portion can comprise a chamfered portion. The recessed portion can comprise a notched portion. The notched portion can be rectangular.

The connector block can be made of wood. The first connector member can be hingedly connected to the intermediate member. The second connector member can be hingedly connected to the intermediate member. The intermediate member can be fastened to the connector block. The intermediate member can comprise an integral interconnection with the connector block.

In an additional aspect, the invention relates to a truss comprising: an array of interconnected truss members including a first truss member and a second truss member; a pivotal interconnection between the first truss member and the second truss member comprising: a connector block having a first end and a second end opposite from the first end; a first connector member extending from the first end of the connector block and pivotally mounted to the first truss member; and a second connector member extending from the second end of the connector block and pivotally mounted to the second truss member. The first truss member can thereby be folded reversely atop the second truss member by pivoting the first and second truss members about the respective pivotal mountings on the connector block and the connector block thereby provides spacing for such folding to occur.

Various embodiments of the invention are also contemplated. The first truss member can have an inner vertical surface and the connector member can have an outer vertical surface, and wherein the inner vertical surface of the first connector member and the outer vertical surface of the connector member can come into abutment when the first truss member is moved to a fully unfolded position with respect to the connector member. The second truss member can have an inner vertical surface and the connector member can have an outer vertical surface, and wherein the inner vertical surface of the second connector member and the outer vertical surface of the connector member can come into abutment when the second truss member is moved to a fully unfolded position with respect to the connector member.

The connector block can have a recessed portion adapted to receive a portion of the first truss member when the first truss member is positioned in a folded position with respect to the connector block. The recessed portion can comprise a chamfered portion. The recessed portion can comprise a notched portion. The notched portion can be rectangular.

The connector block can have a recessed portion adapted to receive a portion of the second truss member when the second truss member is positioned in a folded position with respect to the connector block. The recessed portion can comprise a chamfered portion. The recessed portion comprises a notched portion. The notched portion can be rectangular.

The truss can comprise a monopitch truss. The truss can comprise a double-wide truss. The truss can comprise a triple-wide truss. The truss can comprise a Cape Cod-style truss. The truss can comprise a storage-type truss.

At least one of the first and second truss members can be a chord. At least one of the first and second truss members can be a kneewall. At least one of the first and second truss members can form an eave portion of the truss. At least one of the first and second truss members can form a peak portion of the truss.

BRIEF DESCRIPTION OF DRAWINGS

FIG. 20 is a side elevational view of a first alternative embodiment of a foldable truss assembly incorporating the invention.

FIG. 21 is a side elevational view of a second alternative embodiment of a foldable truss assembly incorporating the invention.

FIG. 64 is a side elevational view of an alternative embodiment of a foldable truss assembly incorporating the invention, wherein the truss shown in FIG. 64 is a truss typically known as a triple-wide, monopitch truss.

FIG. 65 is a side elevational view of an alternative embodiment of a foldable truss assembly incorporating the invention, wherein the truss shown in FIG. 65 is a truss typically known as a double-wide, storage-style truss.

DETAILED DESCRIPTION

Figure 1:
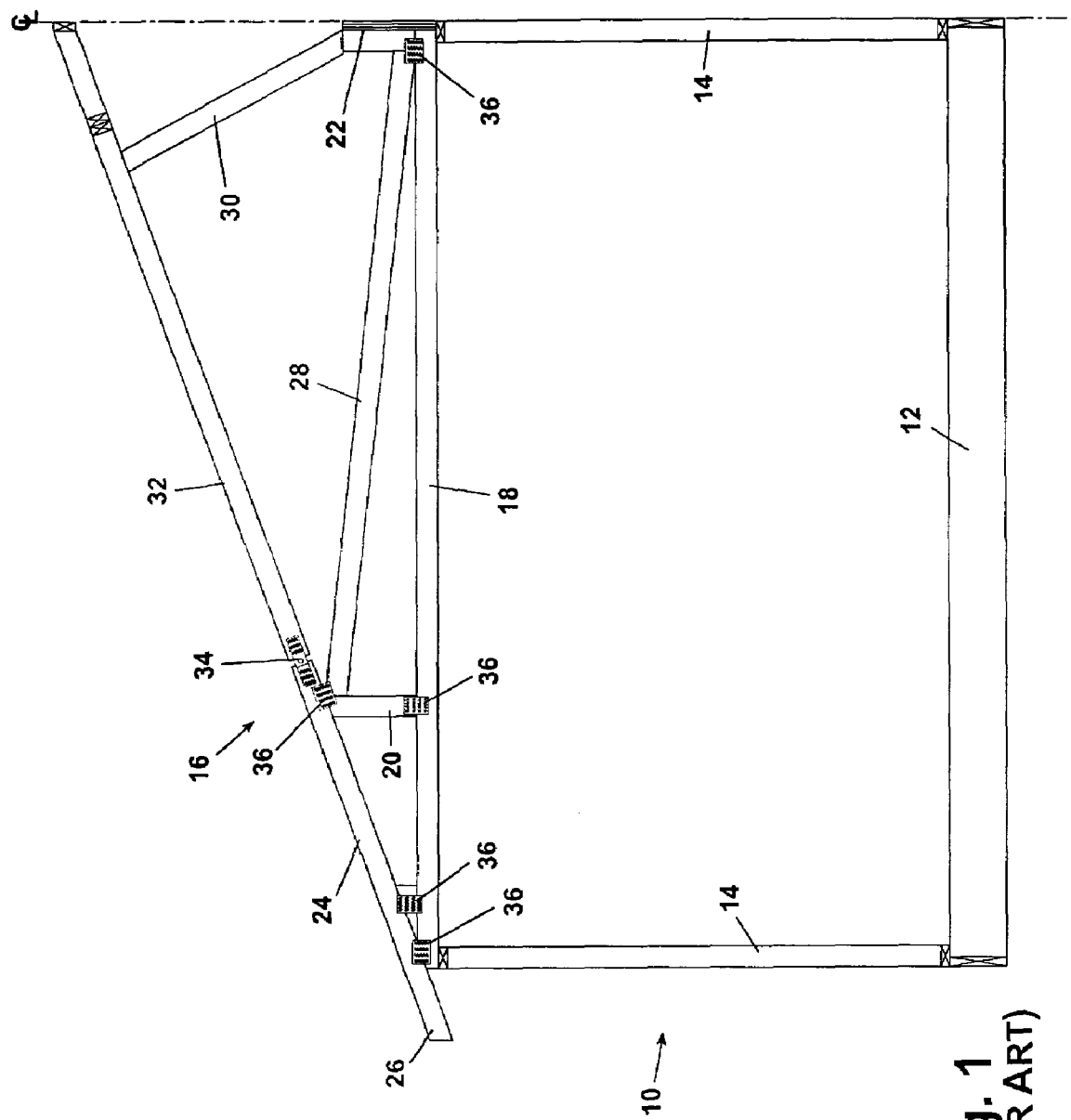
FIG. 1 is a fragmentary, cross-sectional view of a typical factory-built housing structure including walls supported on a floor joist with a ceiling truss mounted thereon.
Figure 2:
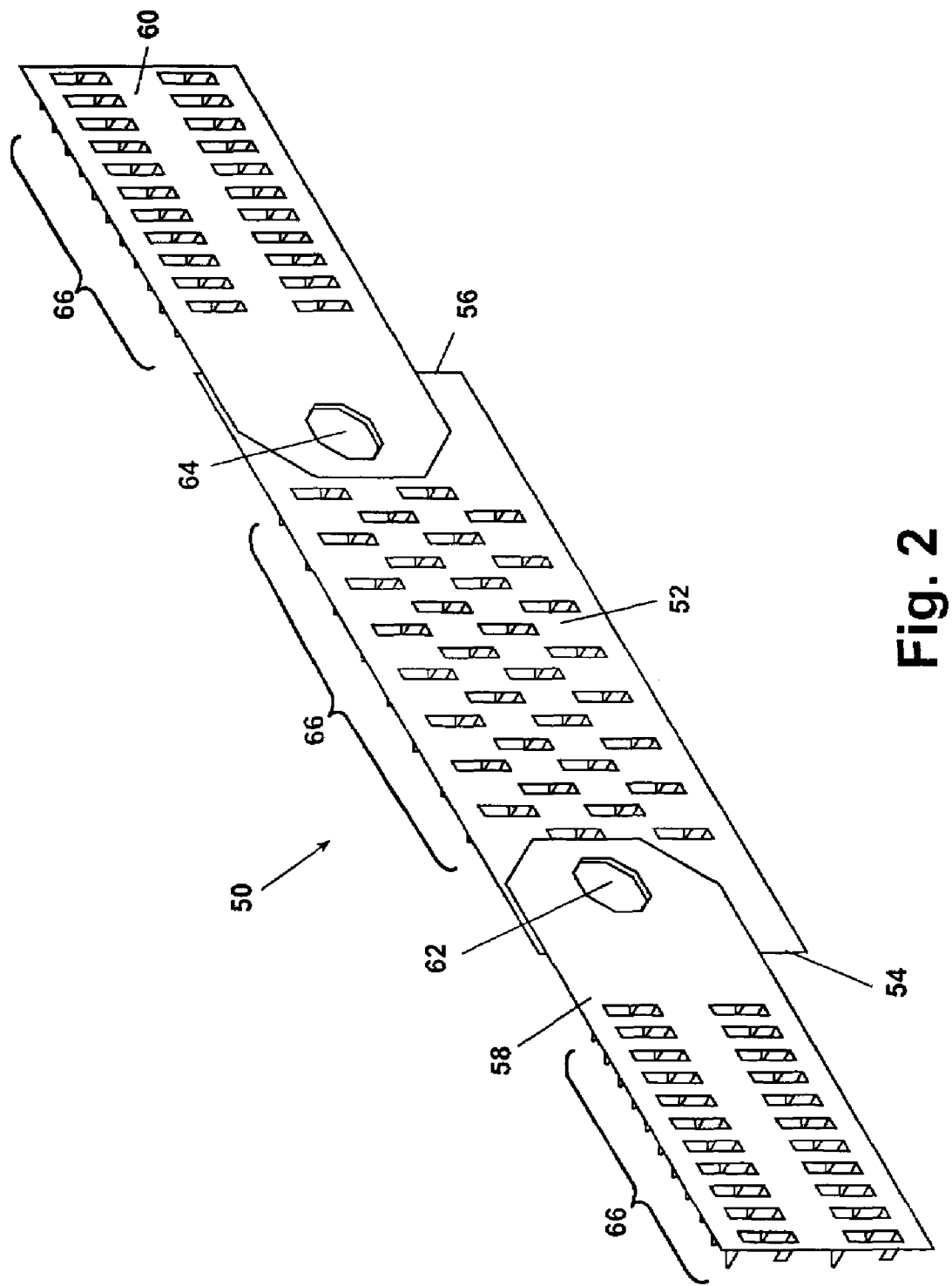
FIG. 2 is a perspective view of a front surface of a double-hinge plate according to the invention.
Figure 3:
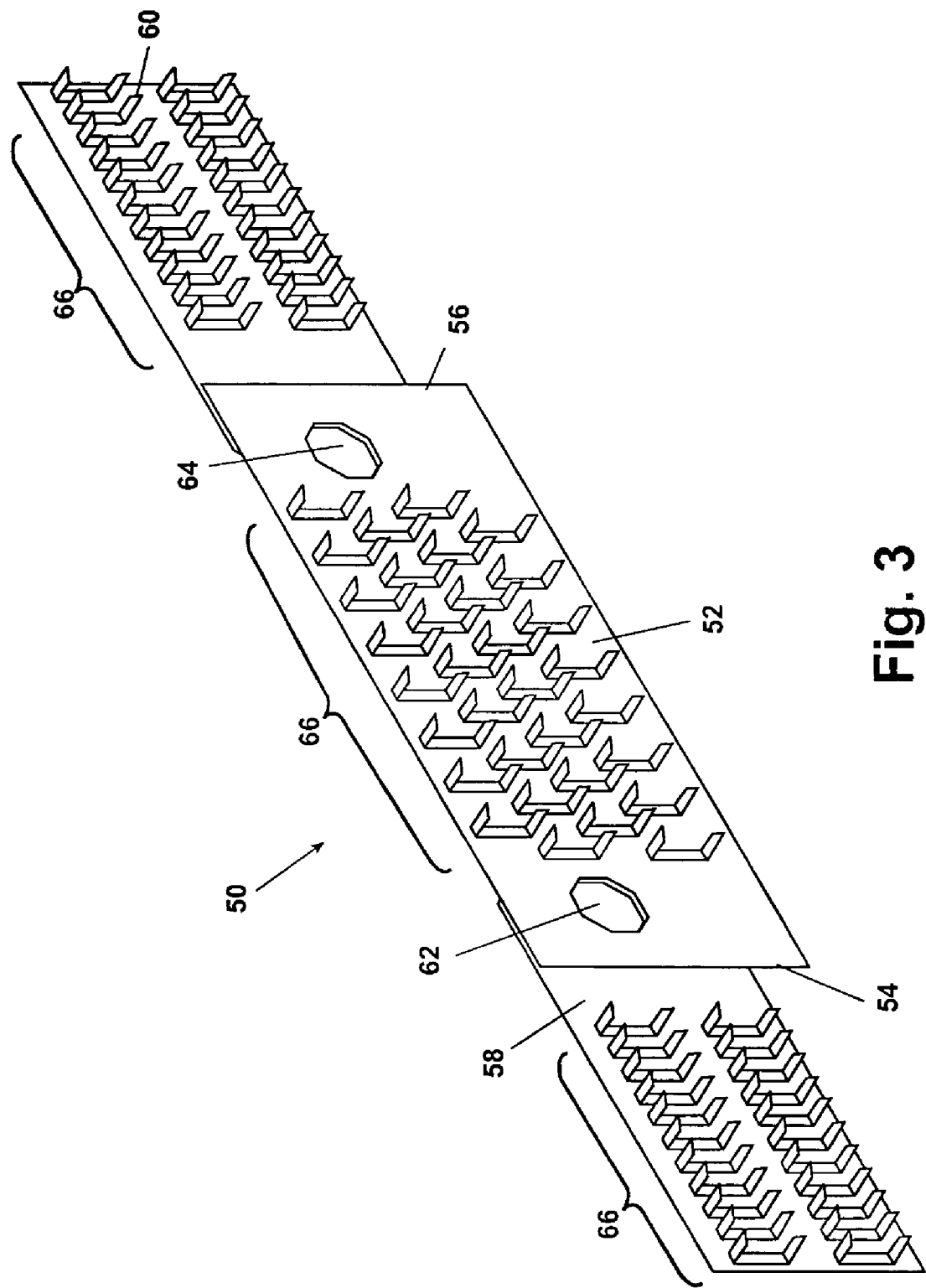
FIG. 3 is a perspective view of a rear surface of the double-hinge plate of FIG. 2.

Referring now to the drawings and to FIGS. 2–3 in particular, a first embodiment of a hinge plate 50 according to the invention is shown comprising a connector member 52 having a first end 54 and a second end 56. The connector member 52 has a first lateral member 58 and a second lateral member 60 pivotally mounted thereto by a first hinge 62 and a second hinge 64, respectively. Each of the first and second lateral members 58 and 60, as well as the connector member 52, preferably comprises a planar member having several teeth 66. The teeth 66 are typically formed by a stamping operation which forms the teeth 66 from material making up the planar member so that the teeth 66 are bent rearwardly from the planar member, leaving slots in the planar member formerly occupied by the material making up the teeth. The teeth 66 are preferably provided on the connector member 52, the first lateral member 58 and the second lateral member 60 in sufficient number and spacing so as to comprise an effective connector surface when fastened to a wood lumber member. Each of the first and second lateral members 58 and 60 as well as the connector member 52 having the array of teeth 66 thereon are commonly referred to in the lumber industry as a "nail plate."

The hinges 62 and 64 are preferably formed adjacent the first and second end 54 and 56, respectively, of the connector member 52 and can be formed in any conventional manner. For example, one typical way of forming a hinge between a pair of planar members is to align the first and second lateral members 58 and 60 with respect to the connector member 52. An aperture is then stamped out in the area making up the first and second hinges 62 and 64. The edges of the material making up the aperture are roll formed over the lateral members 58 and 60 so that the material making up the aperture in the connector member 52 retains the first and second lateral members 58 and 60 to the connector member 52. In this manner, the first and second lateral members 58 and 60 are pivotally connected to the connector member 52. It will be understood that, although one particular method by which the lateral members 58 and 60 are pivotally connected to the connector member 52 is shown, other methods by which the first and second lateral members 58 and 60 can be pivotally mounted to the connector member 52 can be employed without departing from the scope of this invention.

Figure 4:
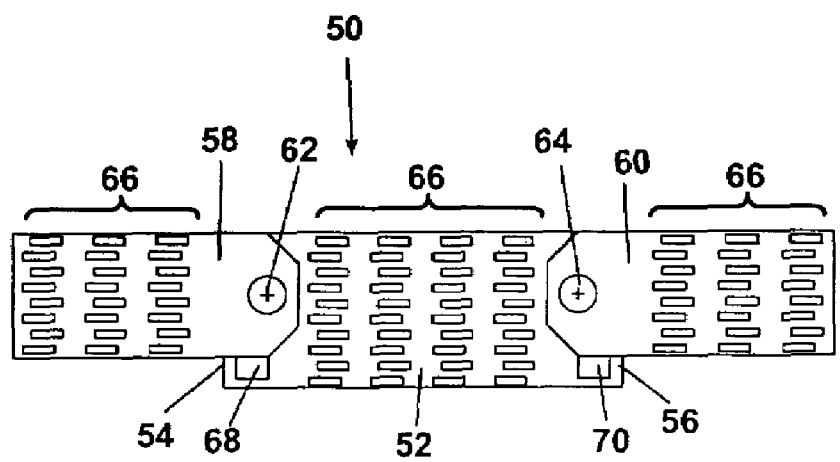
FIG. 4 is a front elevational view of the double-hinge plate of FIG. 2 including optional ledge stops for restricting the pivotal movement of portions of the double-hinge plate.
Figure 5:
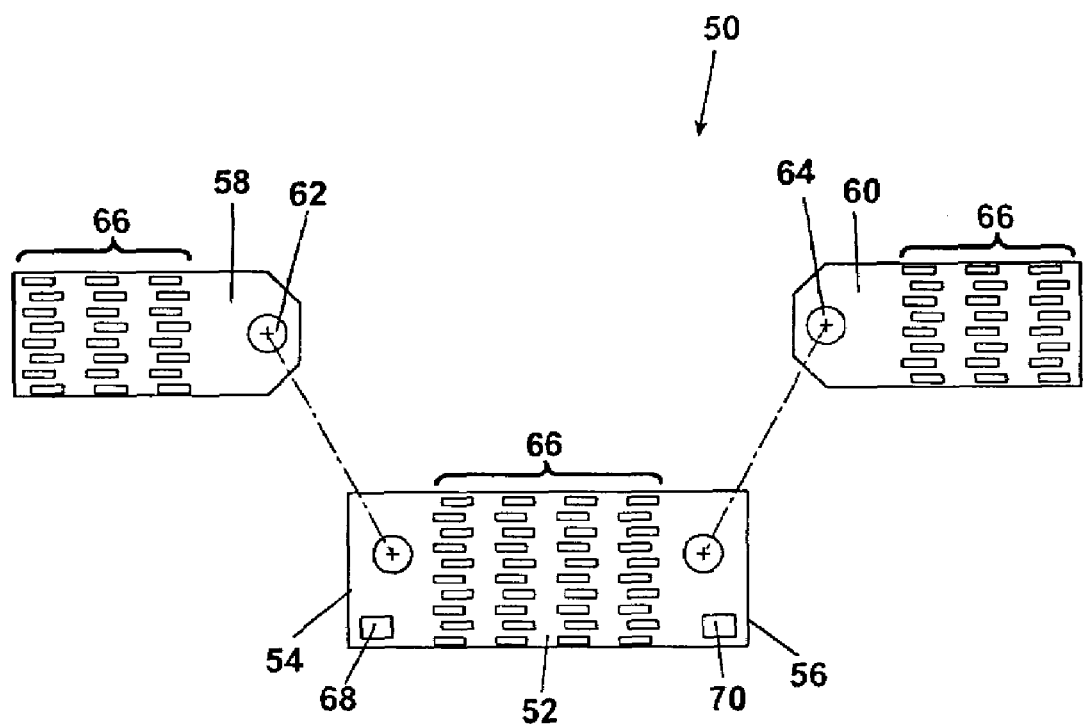
FIG. 5 is a front elevational view in an exploded orientation of the double-hinge plate of FIG. 4.

FIGS. 4–5 show a second embodiment of the hinge plate 50 according to the invention wherein first and second optional ledge members 68 and 70 are provided adjacent to lower edges of the first and second ends 54 and 56 of the connector member 52. The first and second ledge members 68 and 70 can be any protrusion of suitable size and preferably having an edge adapted to abut a lower edge of the first and second lateral members 58 and 60 and to retain the first and second lateral members 58 and 60 in a particular pivoted position with respect to the connector member 52. Preferably, this pivoted position is an approximate parallel position with respect to the connector member 52.

Figure 6:
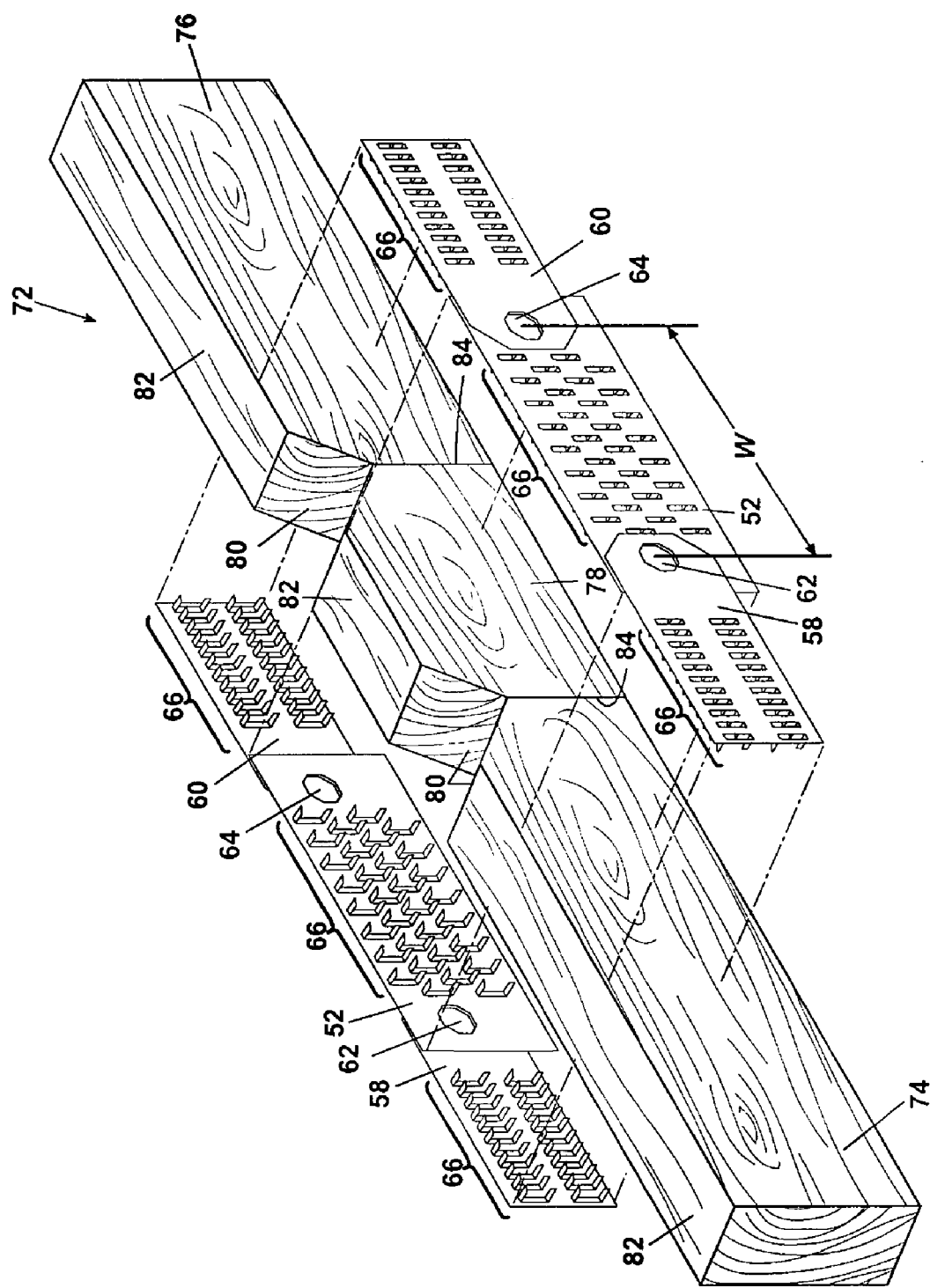
FIG. 6 is an exploded, perspective view of a pair of double-hinge plates of FIG. 2 arranged adjacent opposing sides of a pair of lumber members with a connector block therebetween.
Figure 7:
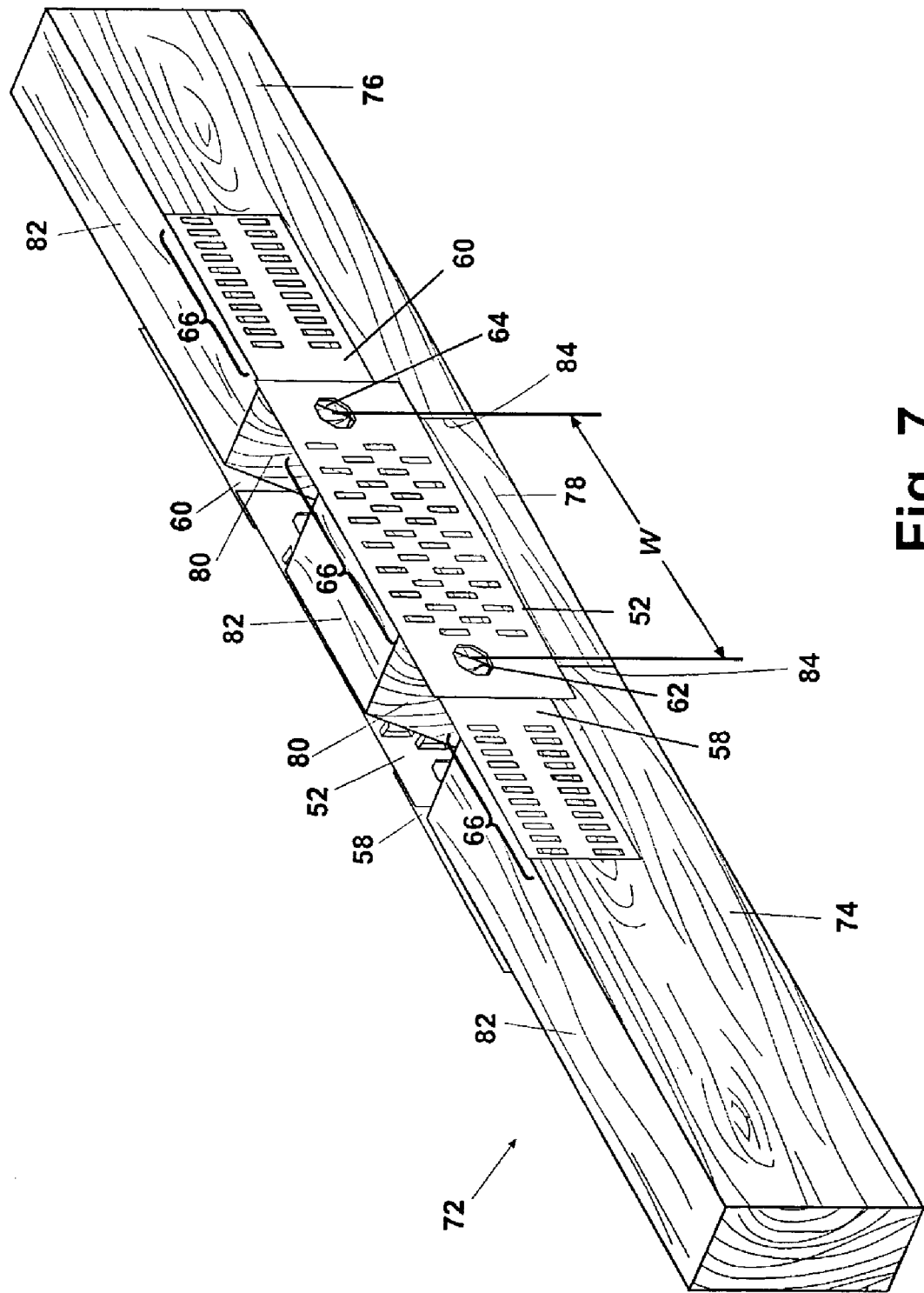
FIG. 7 is a perspective view with the pair of double-hinge plates shown in FIG. 6 mounted to the pair of lumber members and to the connector block therebetween.

FIGS. 6–7 show a pair of hinge plates 50 mounted to a lumber subassembly 72 comprising a first elongated member 74, a second elongated member 76 and a connector block 78. The first and second elongated members 74 and 76 can be any lumber member typically employed in a truss assembly. Each of the first and second elongated members 74 and 76 preferably has a chamfered portion 80 extending at a predetermined angle from a top surface 82 to a vertical end 84. The connector block 78 preferably comprises a lumber member having a width w generally corresponding to a distance between center points of the first and second hinges 62 and 64 of the connector member 52 of a hinge plate 50.

The connector block 78 also has vertical ends 84 and a top surface 82. Chamfered portions 80 extending along a predetermined angle between the top surface of 82 and each of the vertical ends 84 of the connector block 78.

FIG. 7 shows the lumber subassembly 72 after a pair of hinge plates 50 has been mounted to opposing sides thereof. The teeth 66 on the connector member 52 of the hinge plate 50 are embedded into a face of the connector block 78. The teeth 66 on the first lateral member 58 of the hinge plate 50 are embedded into a face of the first elongated member 74. The teeth 66 on the second lateral member 60 of the hinge plate 50 are embedded into a face of the second elongated member 76.

As is evident from the drawings, the lumber subassembly 72 can thereby be pivotally moved about each of the hinges 62 and 64 of the hinge plate 50. The abutment of the vertical ends 84 of each of the first and second elongated members 74 and 76 with the vertical ends 84 of the connector block 78 provides a secured end-to-end position of the lumber subassembly 72 in a straight-line position. Conversely, the chamfered portions 80 in each of the first and second elongated members 74 and 76, as well as the chamfered portions 80 in the connector block 78, provide clearance for pivotal movement of the hinge plate 50 about the hinges 62 and 64.

It will be apparent to one skilled in the art that, without the chamfered portions 80 in each of the first and second elongated members 74 and 76 as well as in the connector block 78, the lumber subassembly 72 could not be pivoted about the hinges because there would be no clearance between the ends 84 of each of these components making up the lumber subassembly 72.

Another embodiment of the hinge plate 50 is shown in FIGS. 31–36 wherein common elements between the various embodiments described herein are referred to with the same reference numerals and, where additional description is duplicative with respect to the earlier embodiments in FIGS. 1–30, the embodiments are not re-described with respect to their basic elements.

Figure 35:
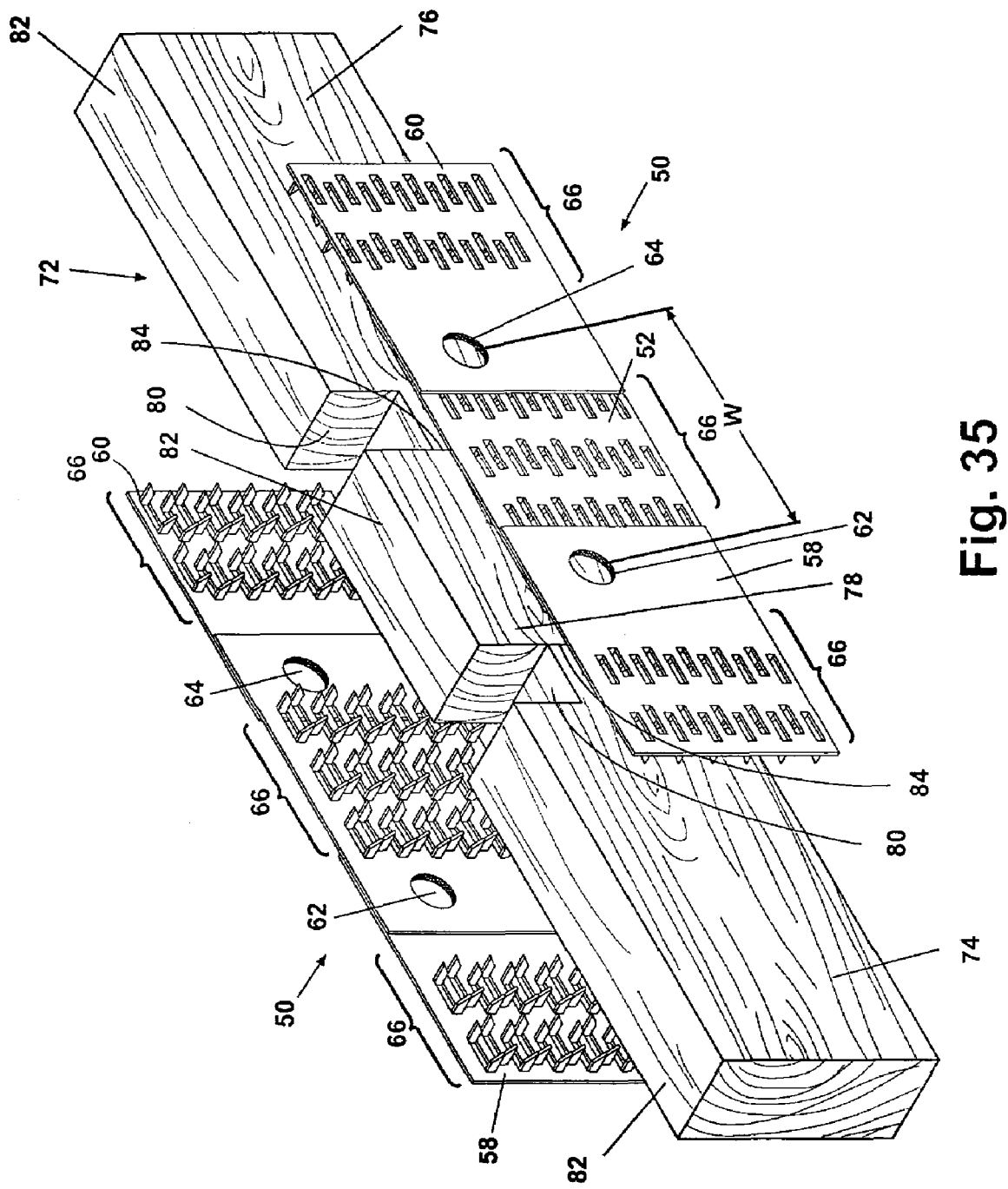
FIG. 35 is an exploded, perspective view of a pair of double-hinge plates of FIG. 31 arranged adjacent opposing sides of a pair of lumber members with a connector block therebetween.
Figure 36:
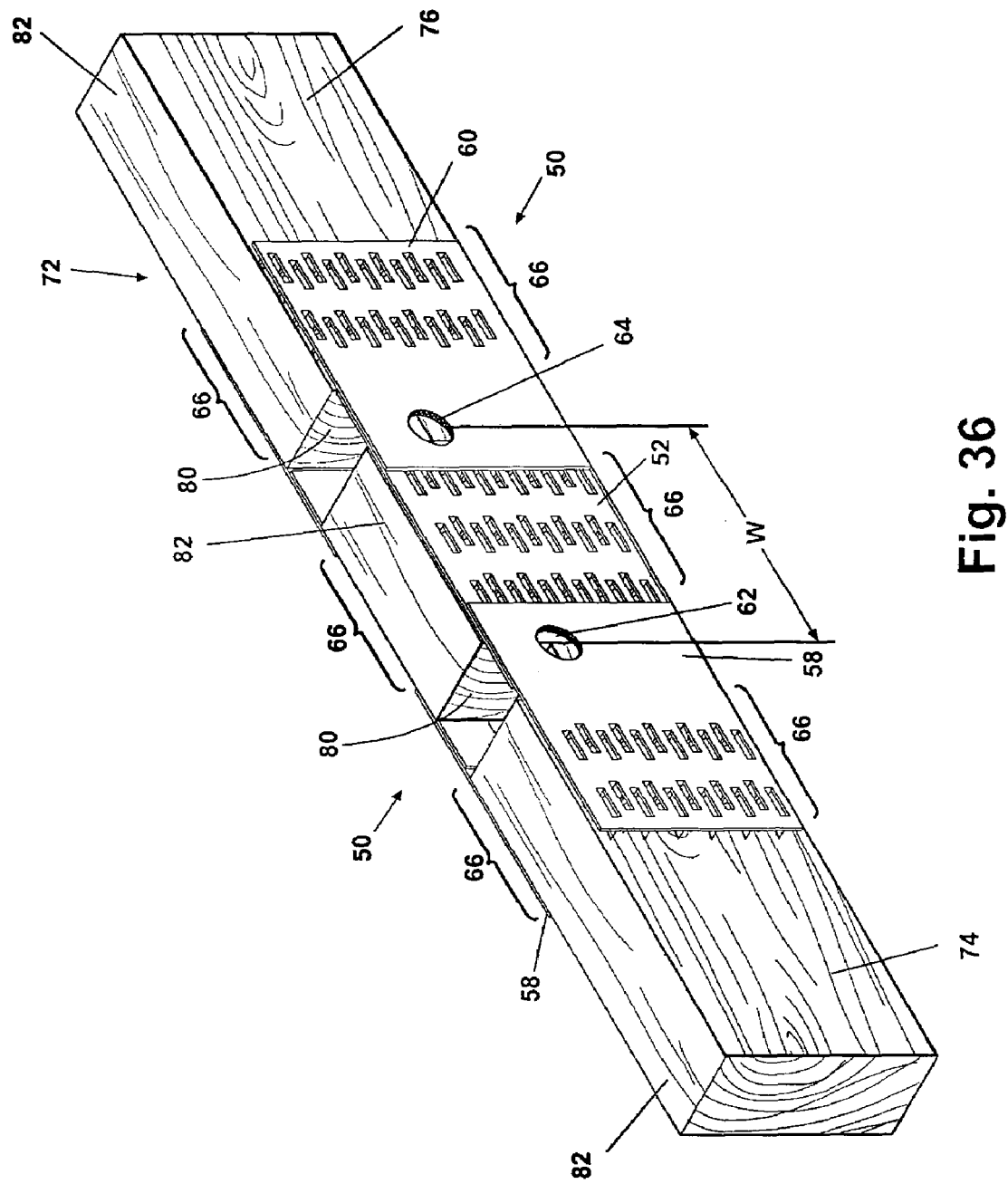
FIG. 36 is a perspective view with the pair of double-hinge plates shown in FIG. 35 mounted to the pair of lumber members and to the connector block therebetween.
Figure 37:
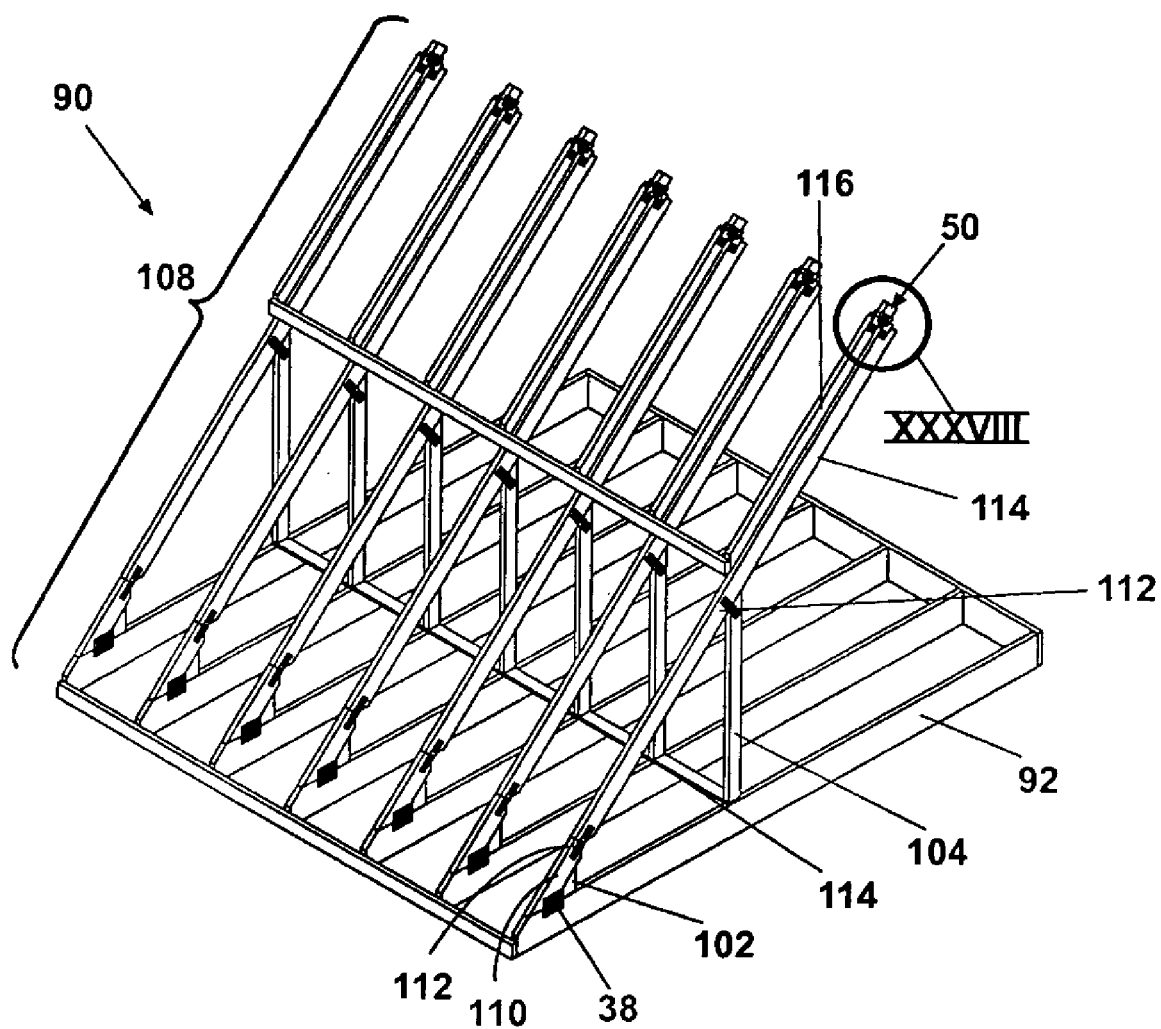
FIG. 37 is a perspective view of a foldable truss assembly in a folded position including a pair of double-hinge plates shown in FIG. 31 according to the invention.
Figure 38:
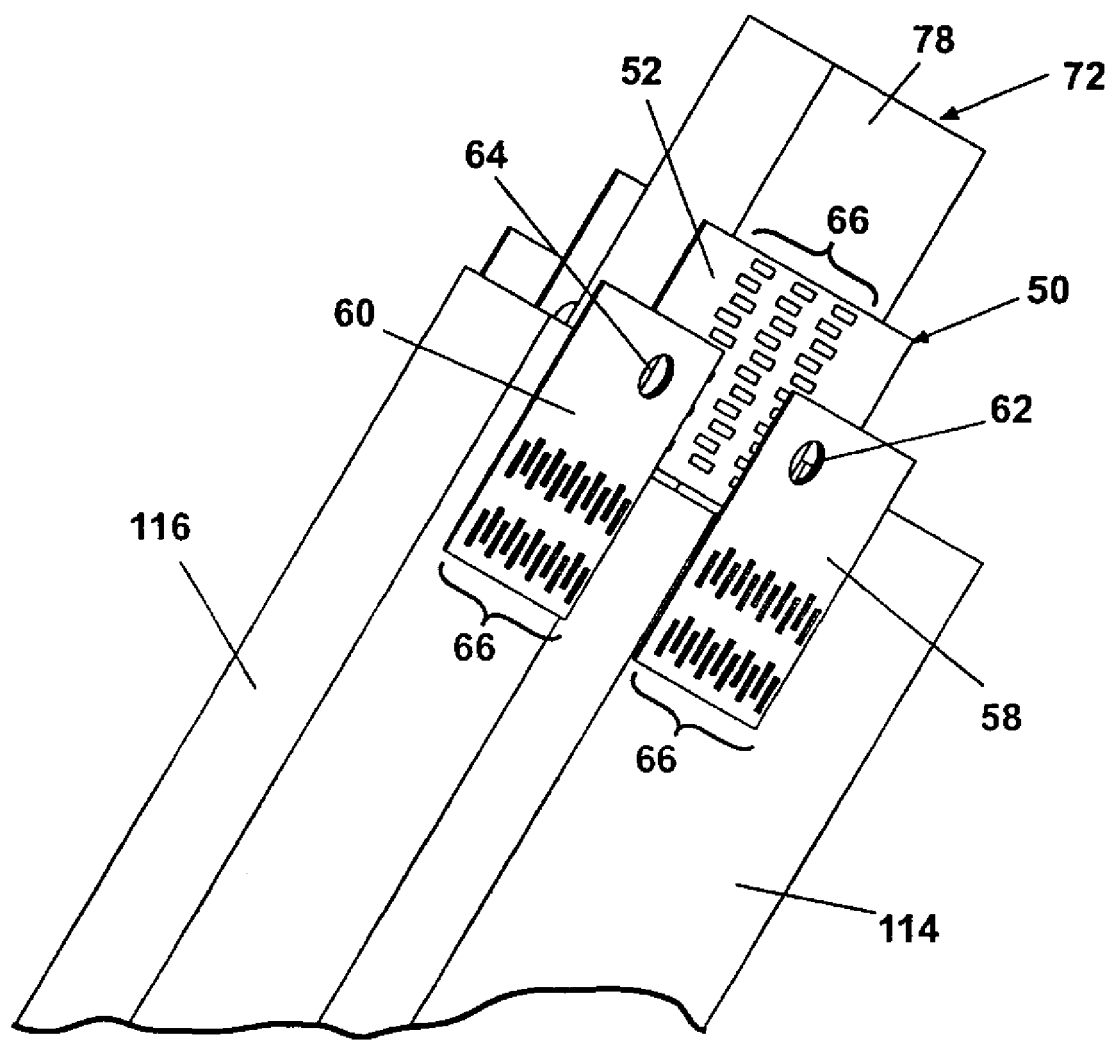
FIG. 38 is an enlarged perspective view showing the region marked XXXVIII in FIG. 37.
Figure 39:
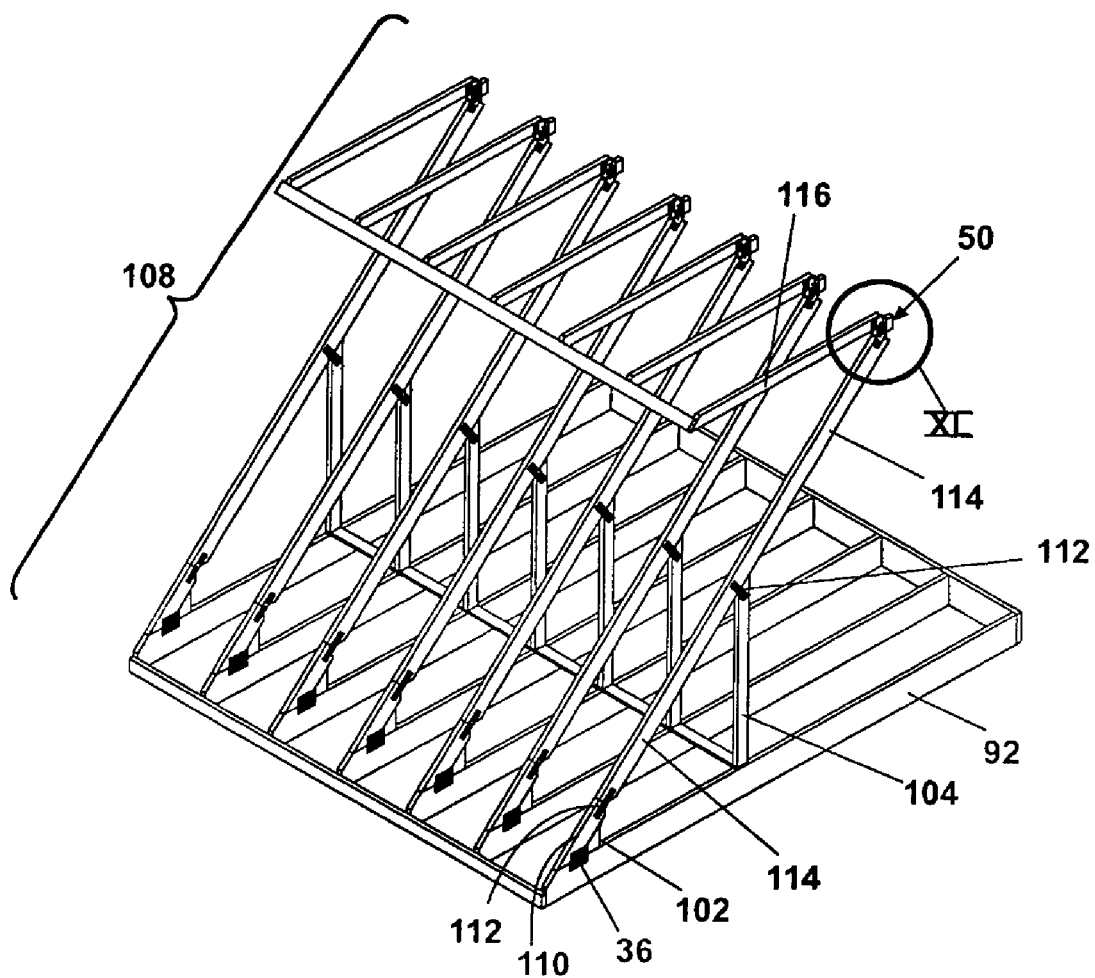
FIG. 39 is a perspective view of the foldable truss assembly of FIG. 37 in a first semi-erected position.
Figure 40:
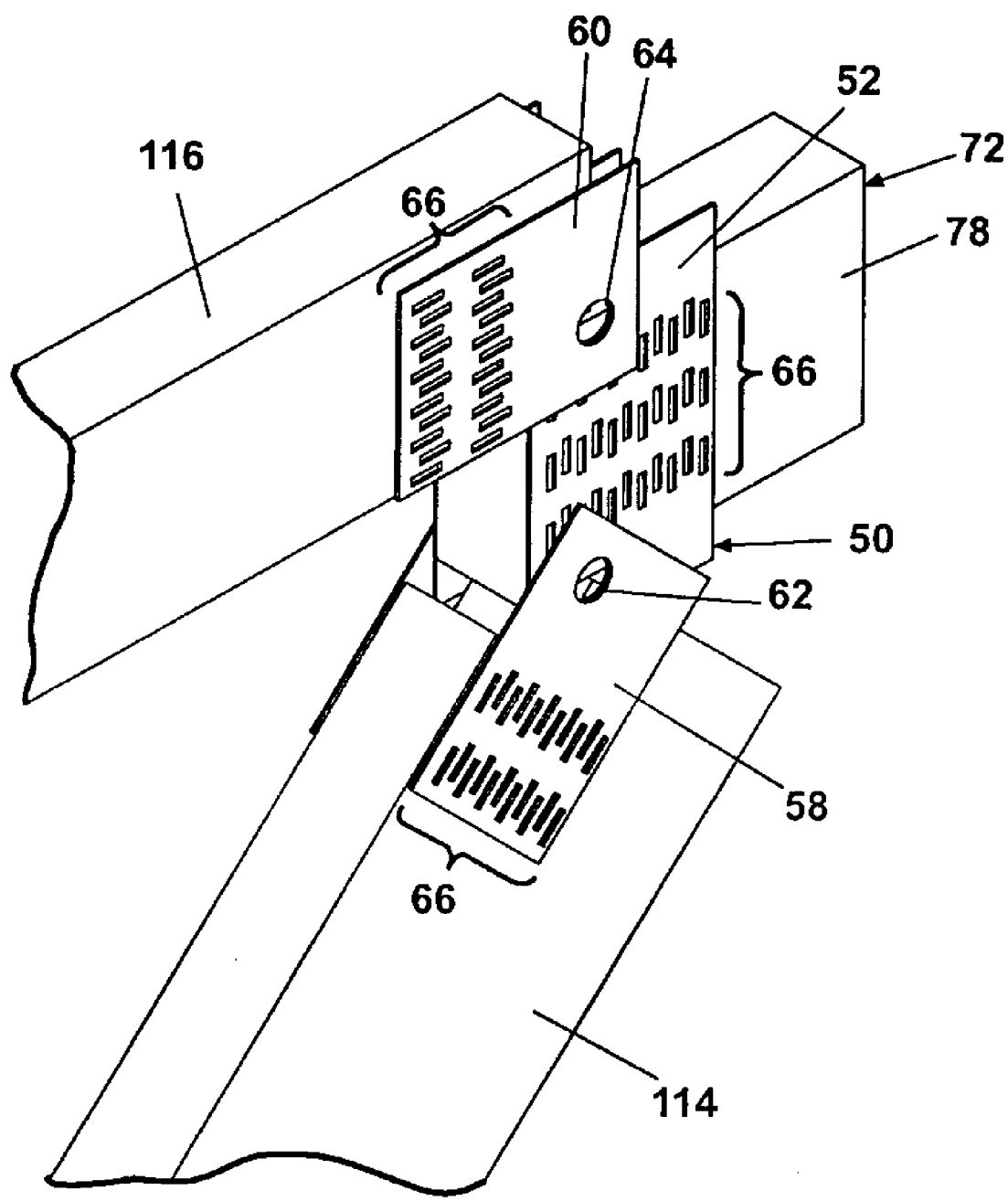
FIG. 40 is an enlarged perspective view showing the region marked XL in FIG. 39.
Figure 41:
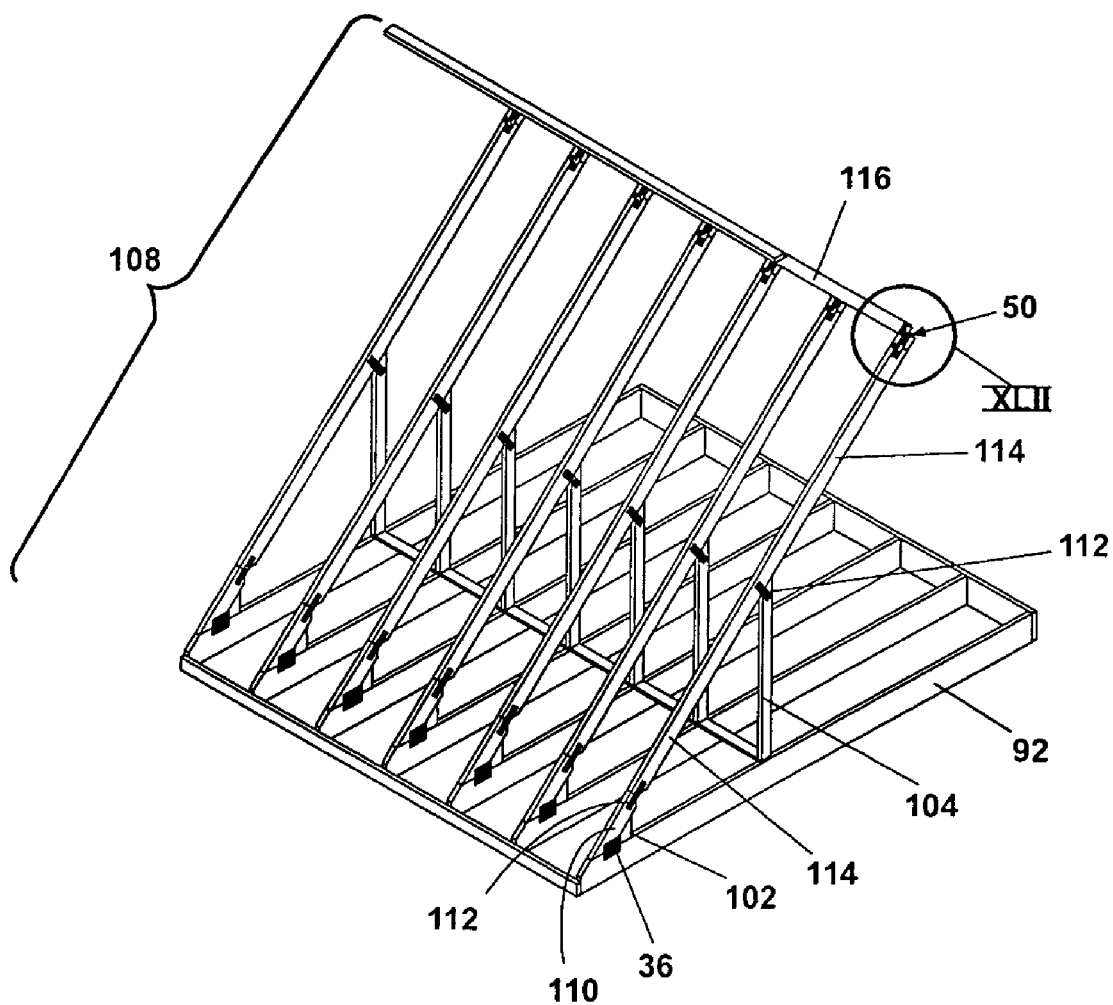
FIG. 41 is a perspective view of the foldable truss assembly of FIG. 37 in a second semi-erected position.
Figure 42:
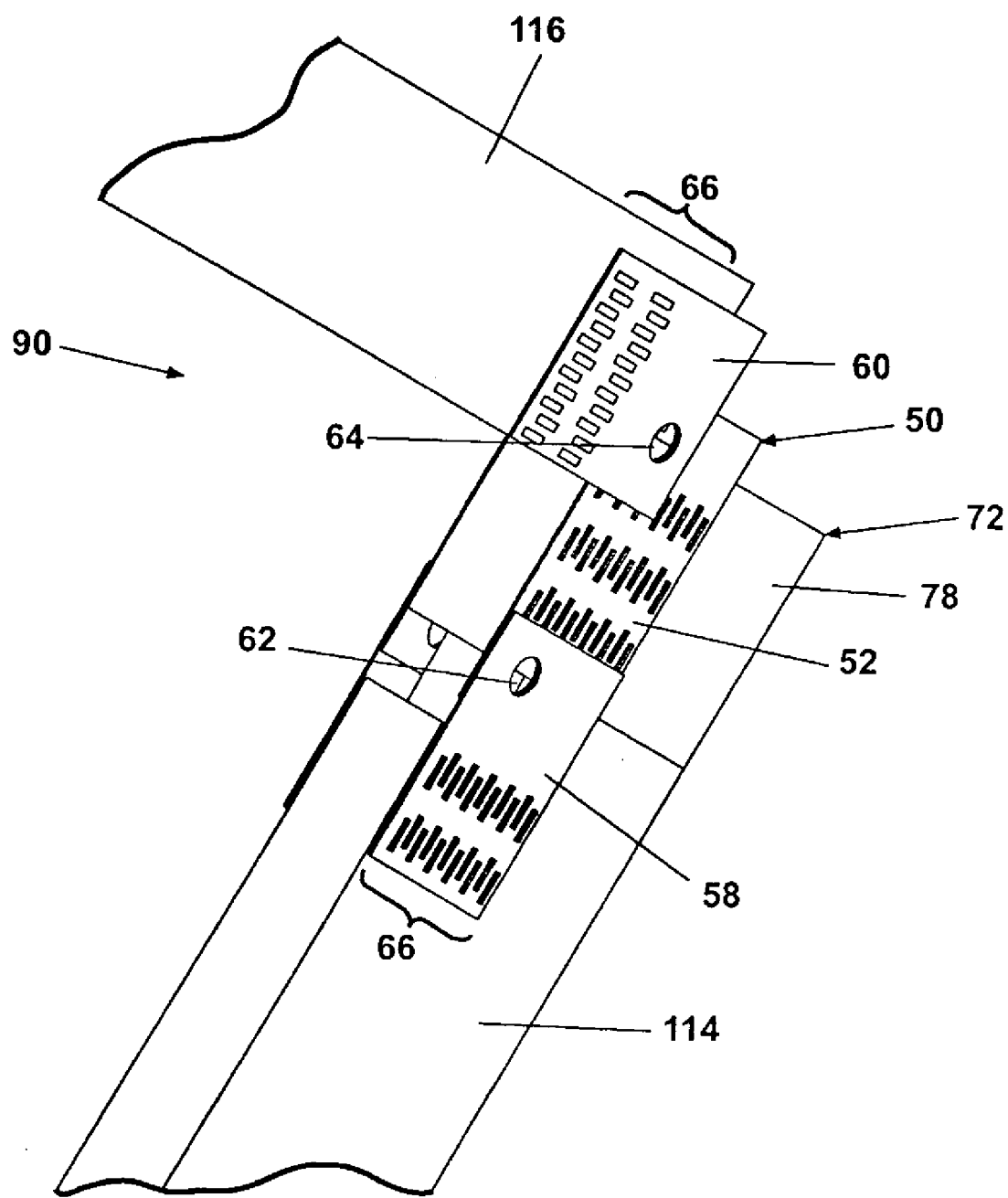
FIG. 42 is an enlarged perspective view showing the region marked XLII in FIG. 41.
Figure 43:
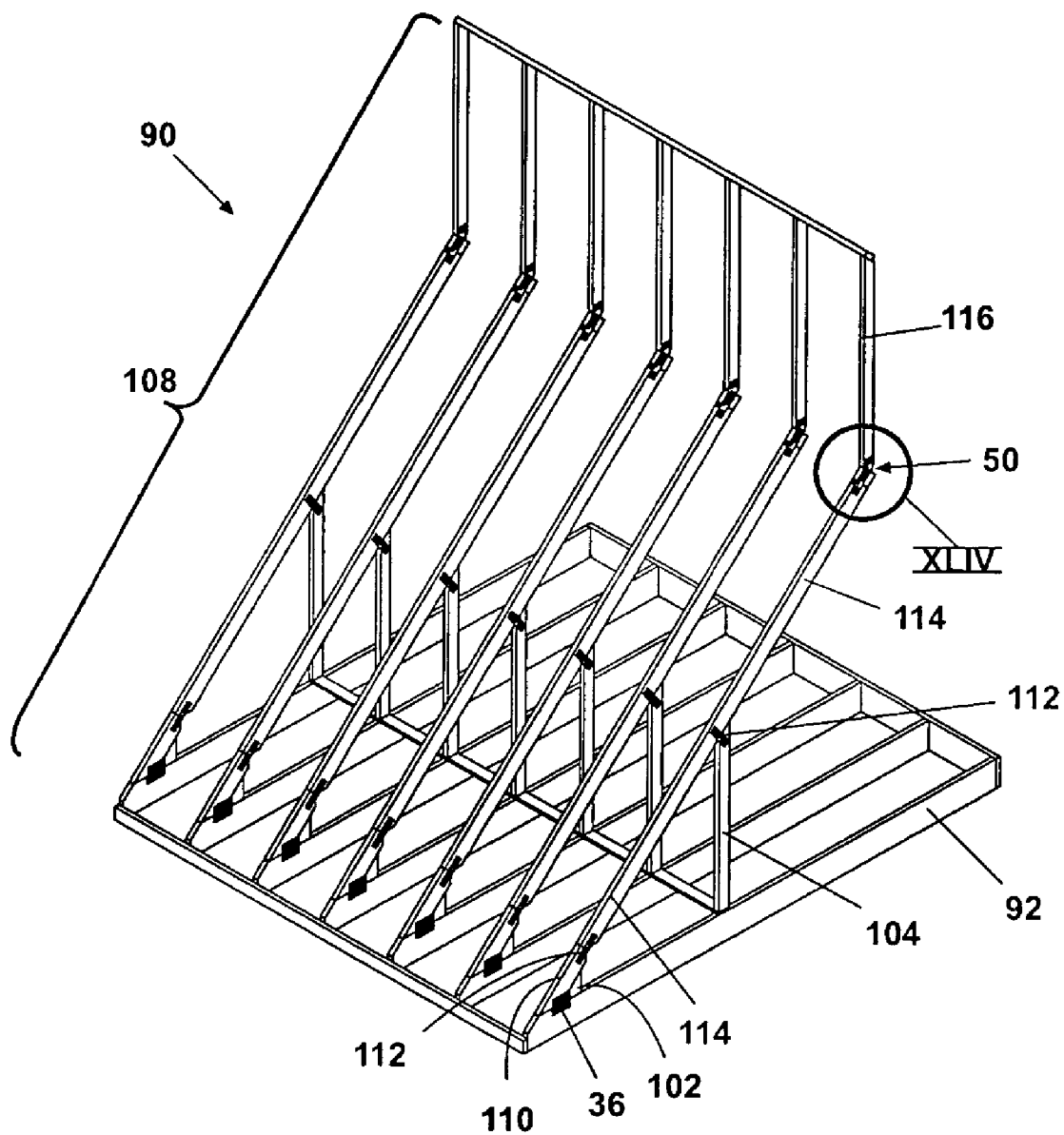
FIG. 43 is a perspective view of the foldable truss assembly of FIG. 37 in a third semi-erected position.
Figure 44:
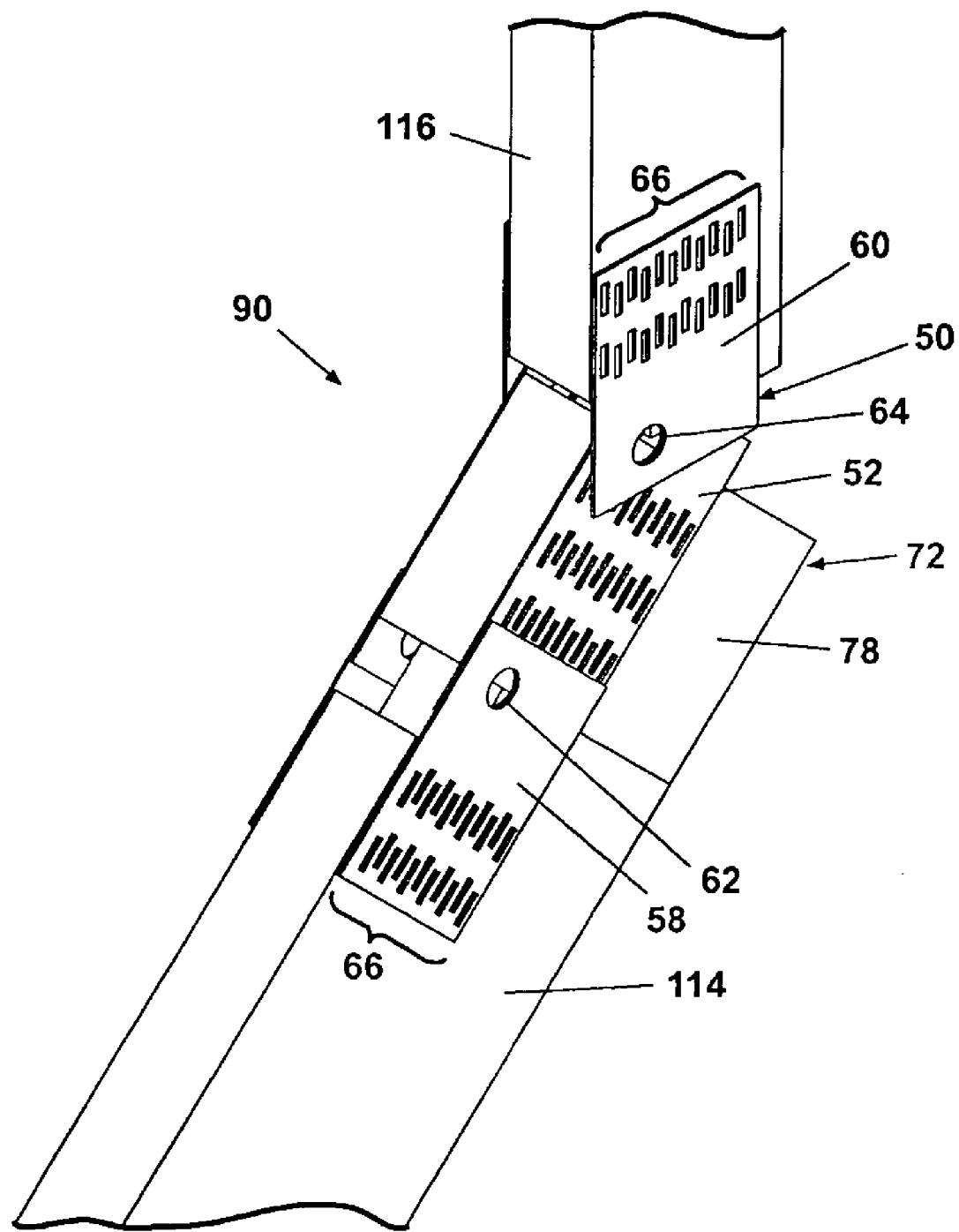
FIG. 44 is an enlarged perspective view showing the region marked XLIV in FIG. 43.
Figure 45:
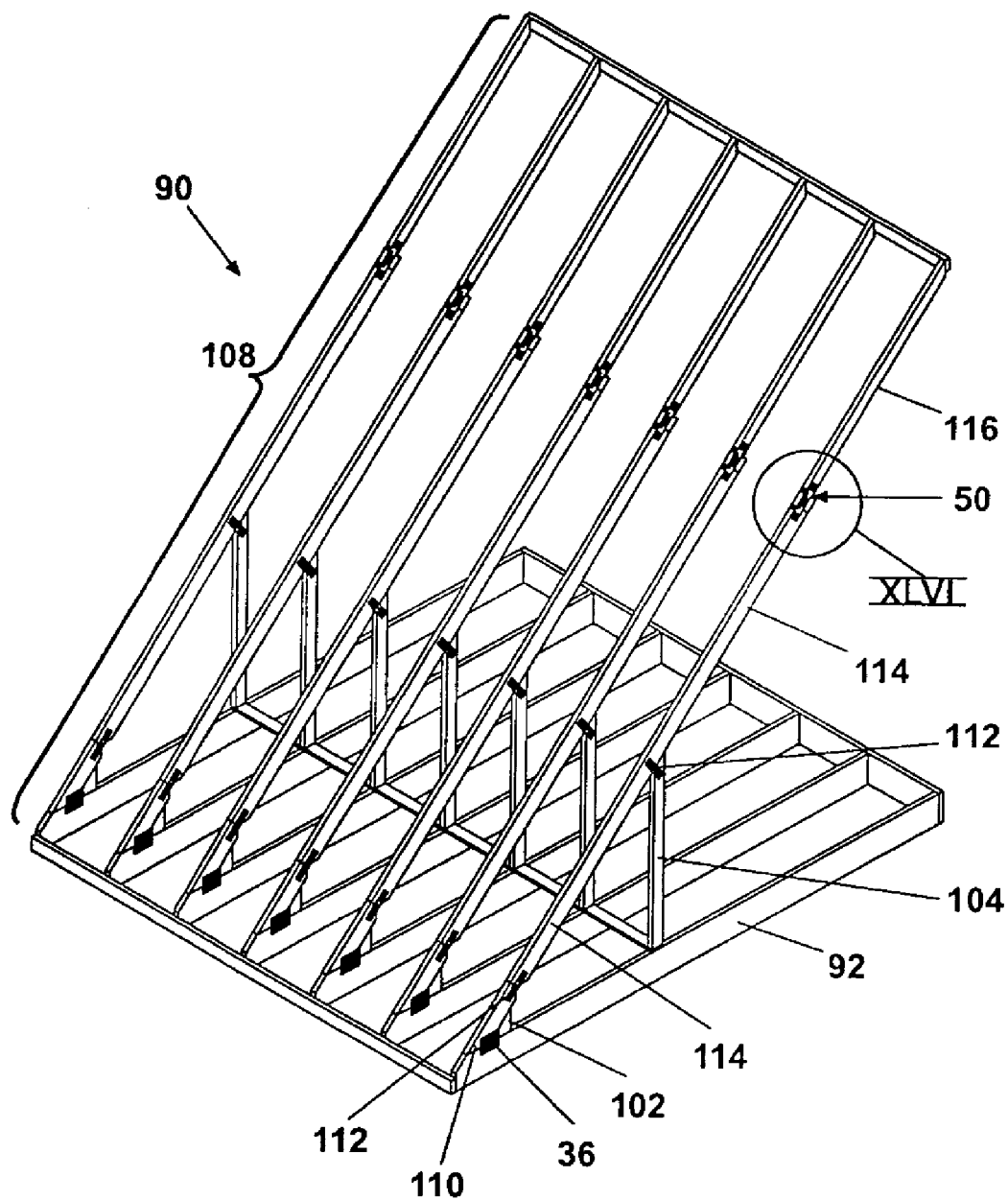
FIG. 45 is a perspective view of the foldable truss assembly of FIG. 37 in a fully-erected position.
Figure 46:
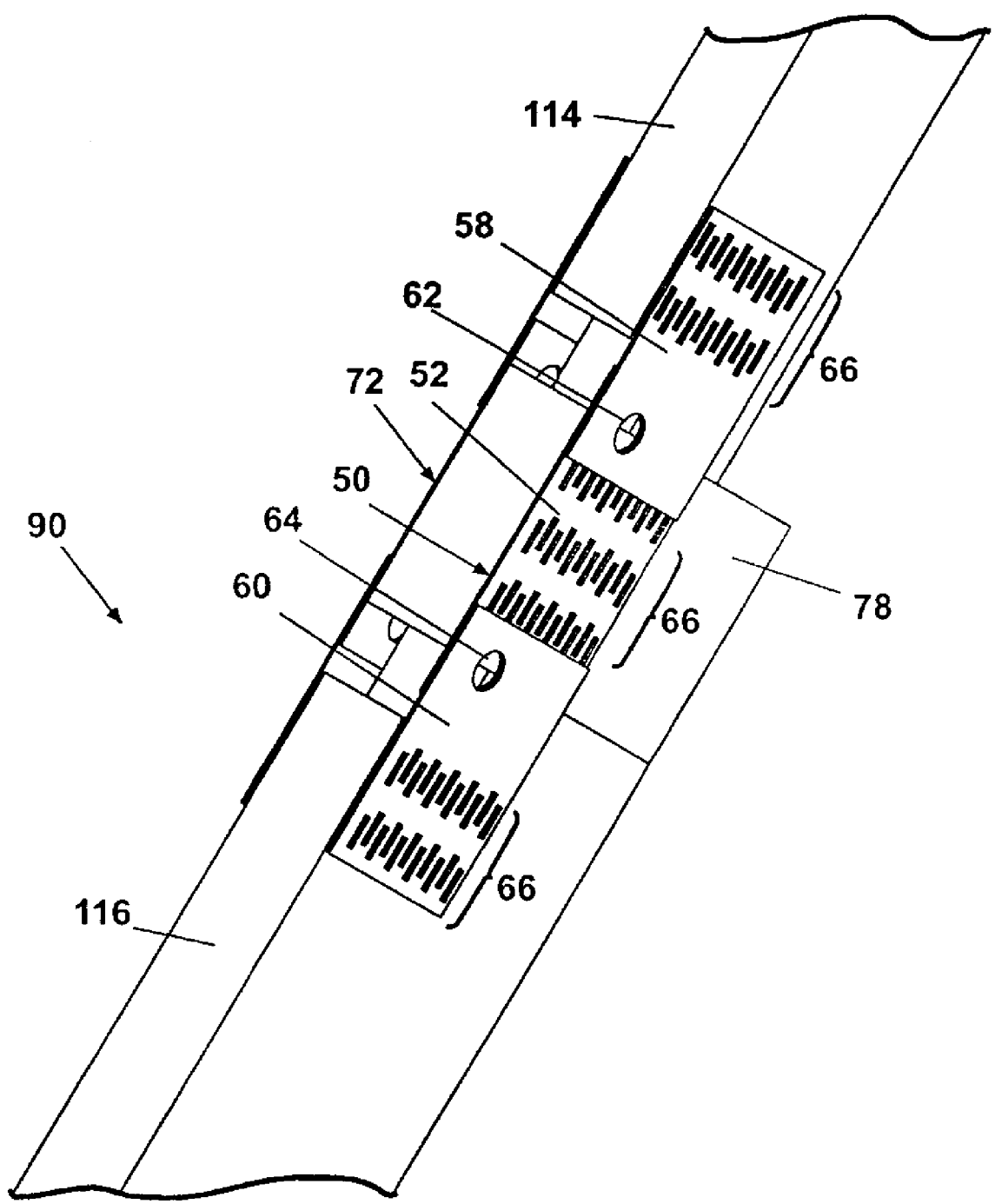
FIG. 46 is an enlarged perspective view showing the region marked XLVI in FIG. 45.
Figure 47:
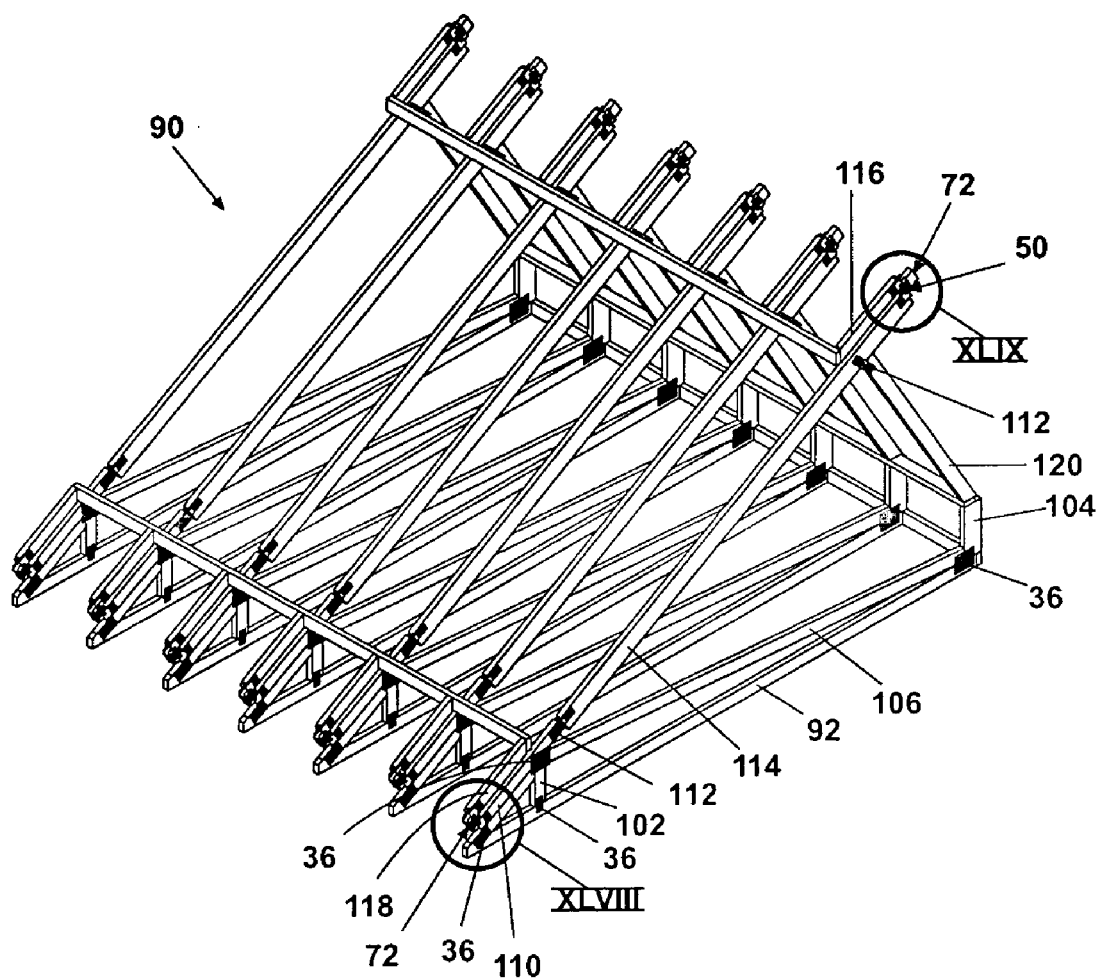
FIG. 47 is a perspective view of a foldable truss assembly in a folded position including a pair of double-hinge plates shown in FIG. 31 according to the invention, wherein the double-hinge plates create a foldable region in both a truss cap and eave portions of the truss assembly.
Figure 48:
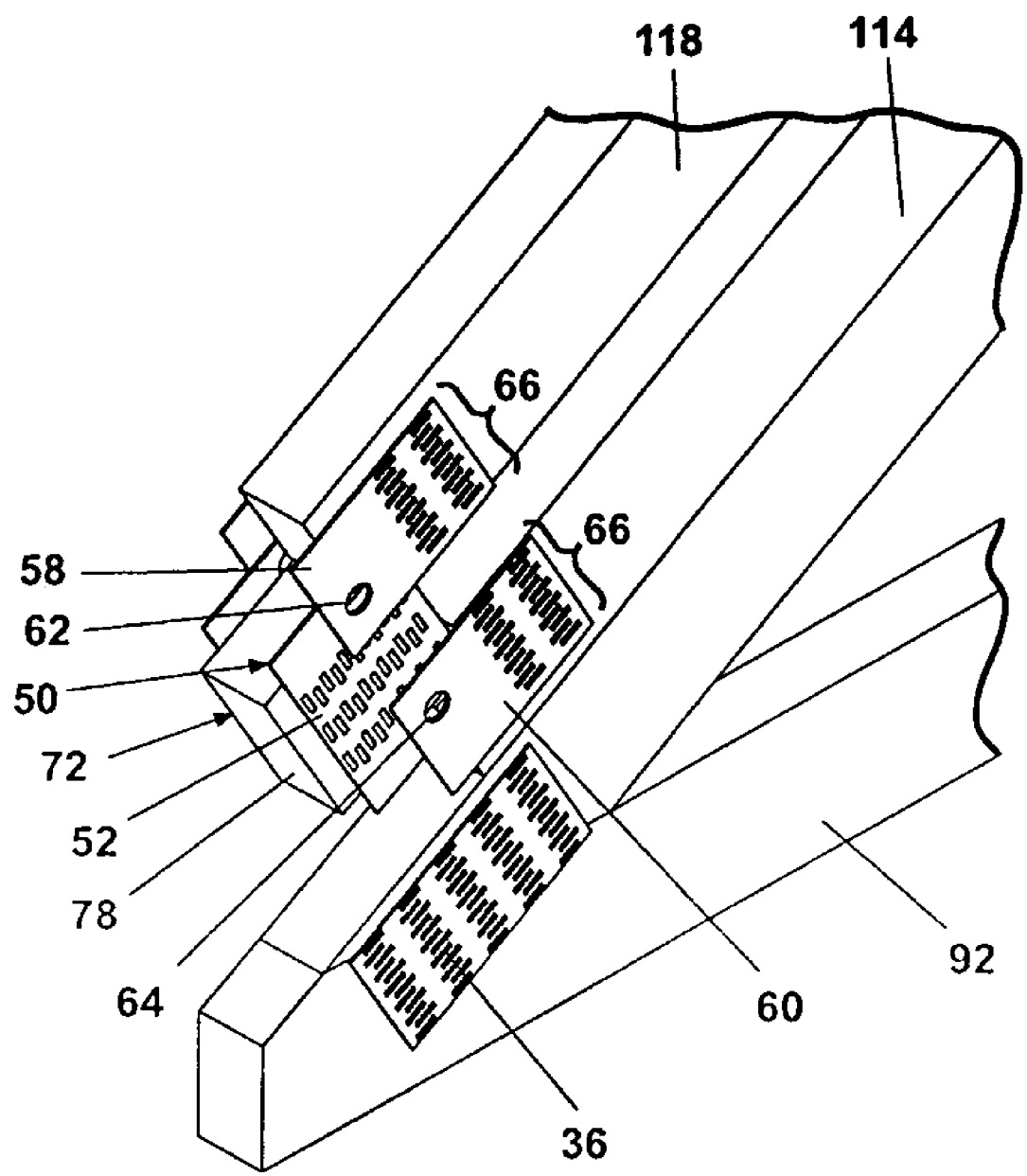
FIG. 48 is an enlarged perspective view showing the eave region marked XLVIII in FIG. 47.
Figure 49:
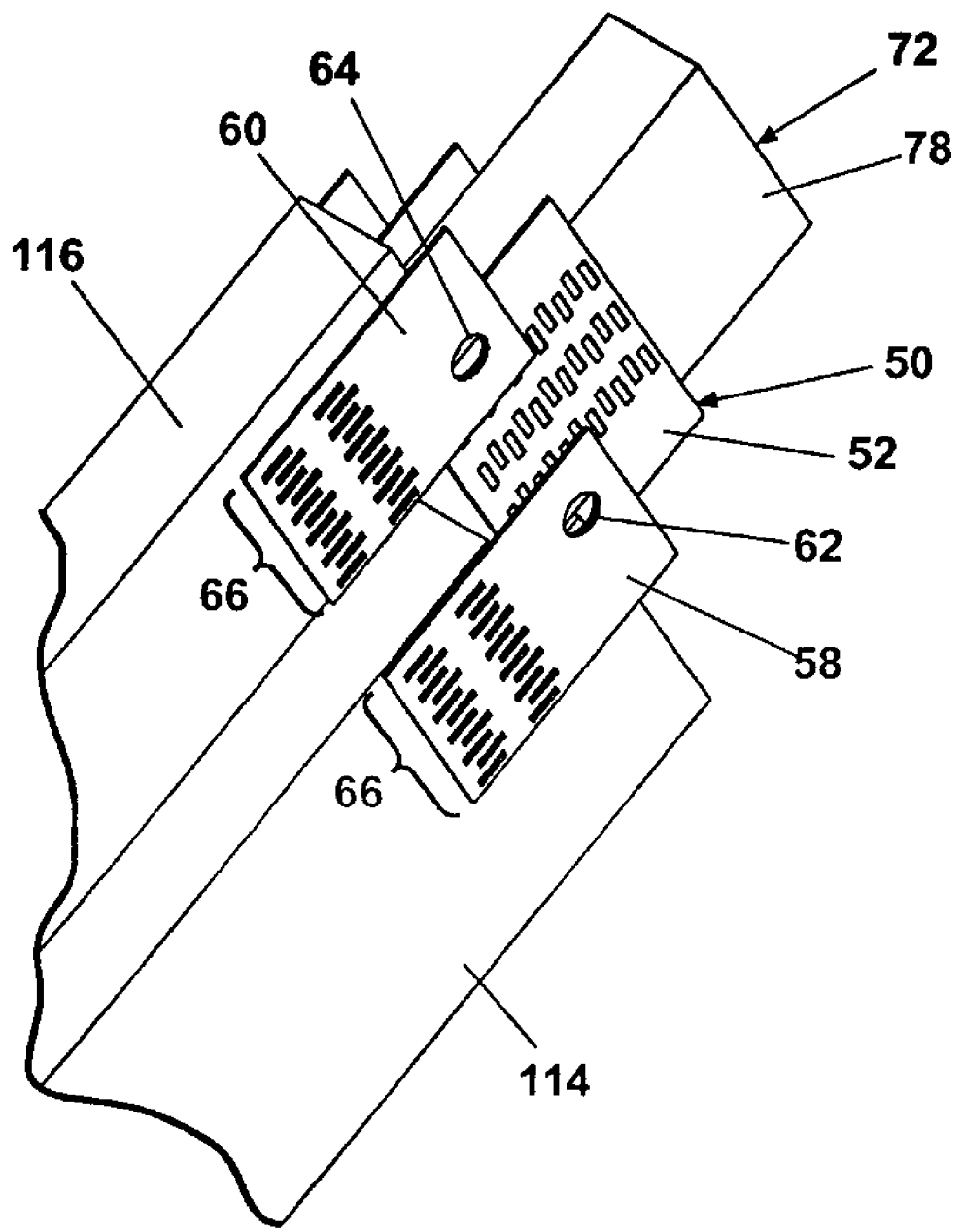
FIG. 49 is an enlarged perspective view showing the cap region marked XLIX in FIG. 47.
Figure 50:
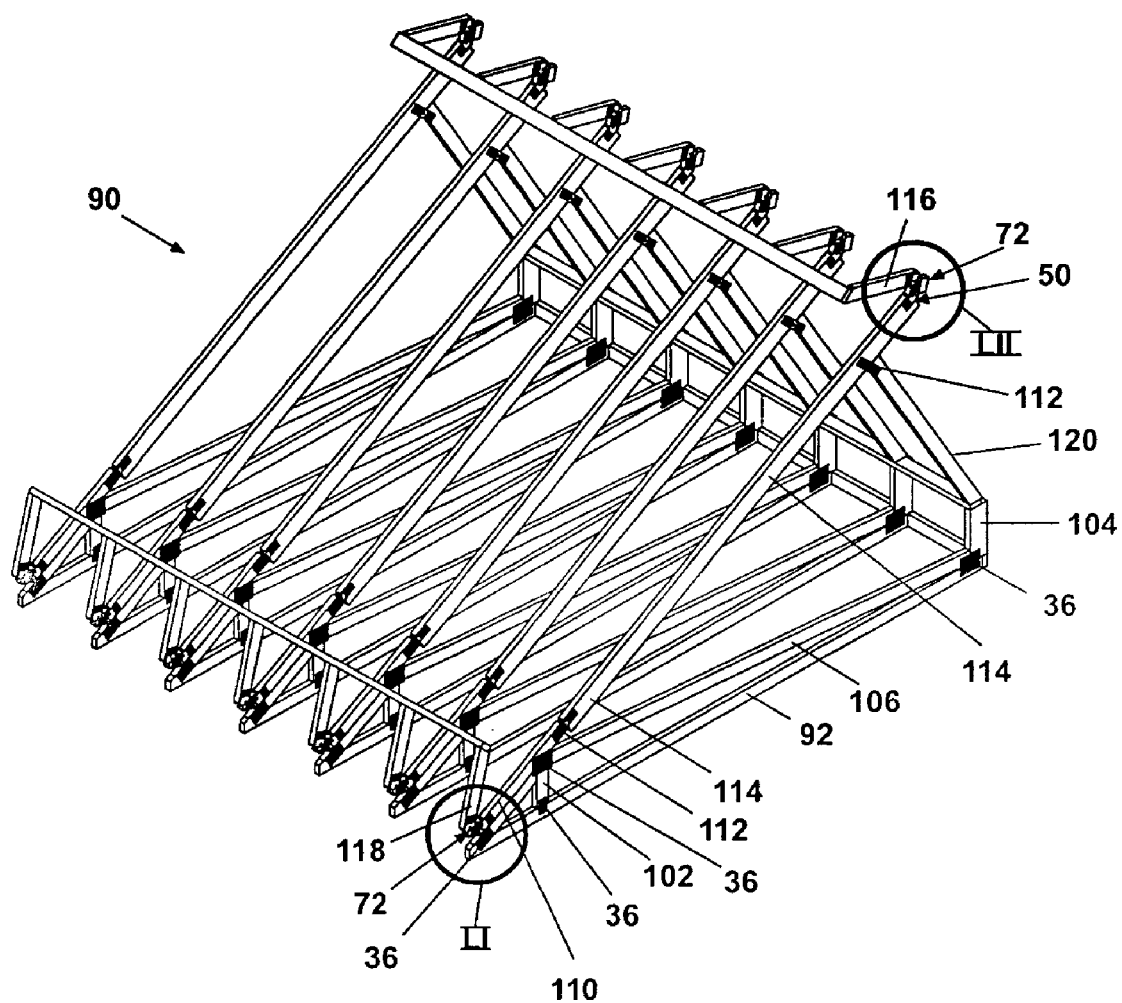
FIG. 50 is a perspective view of the foldable truss assembly of FIG. 47 in a first semi-erected position.
Figure 51:
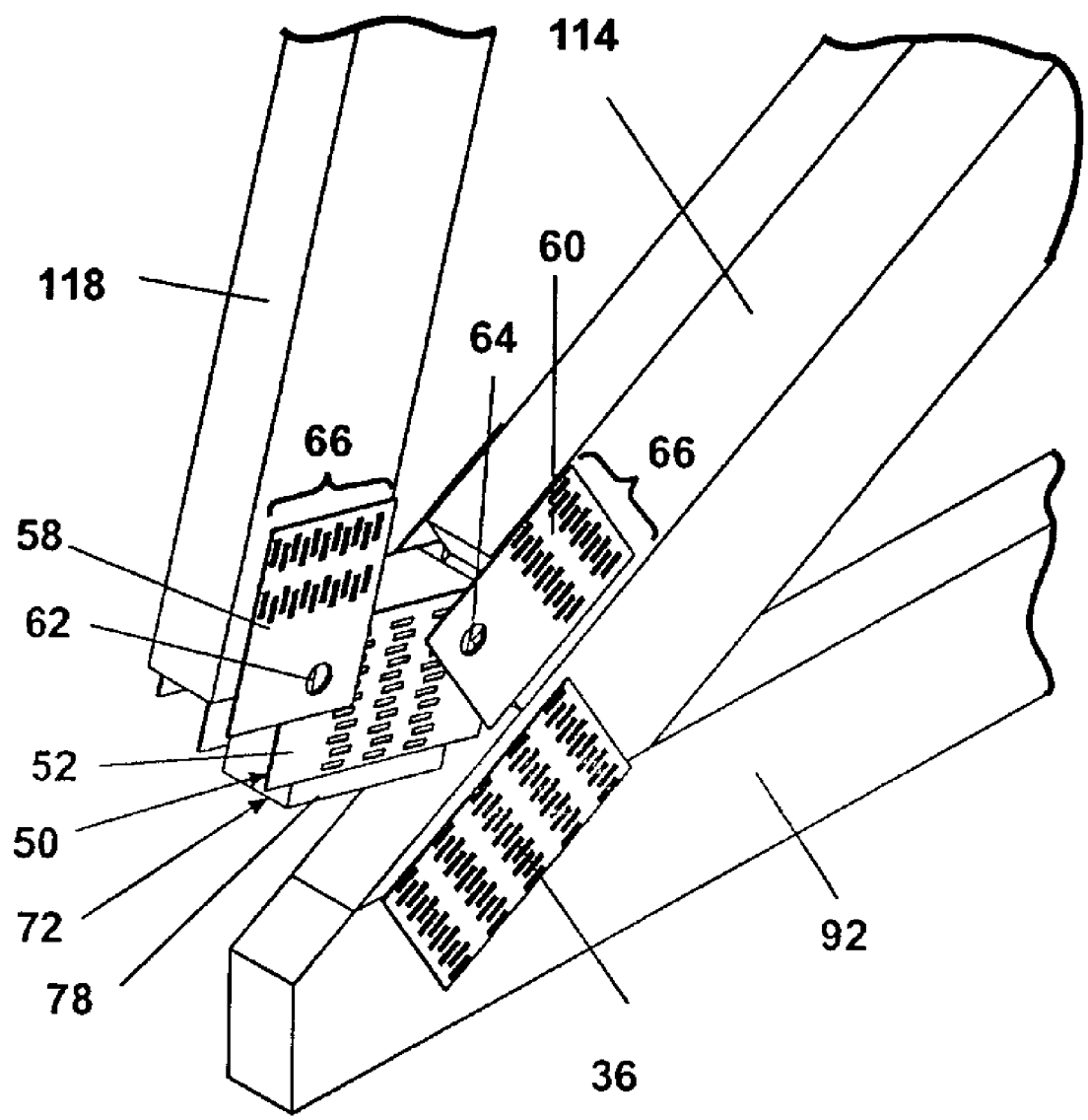
FIG. 51 is an enlarged perspective view showing the eave region marked LI in FIG. 50.
Figure 52:
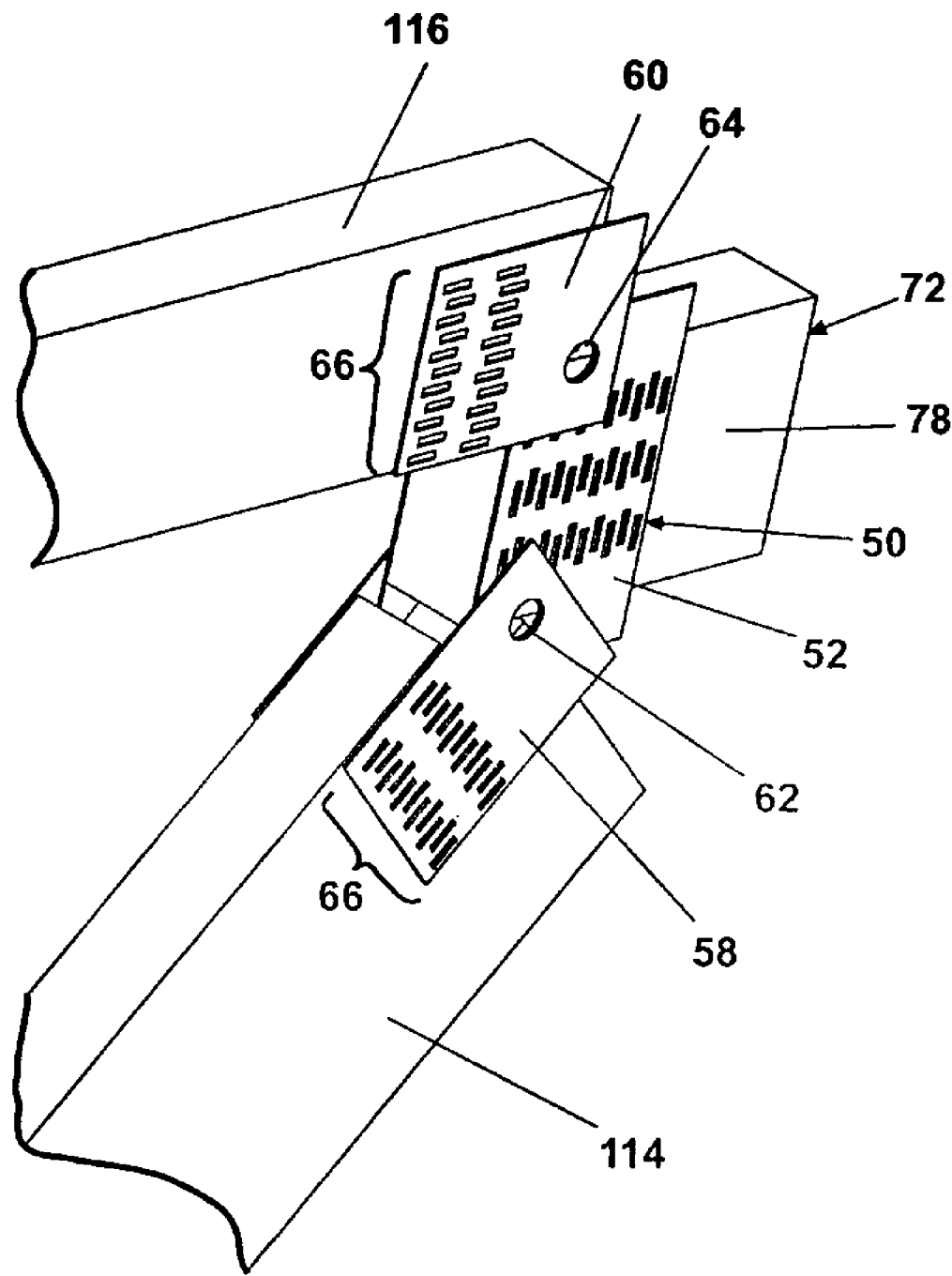
FIG. 52 is an enlarged perspective view showing the cap region marked LII in FIG. 50.
Figure 53:
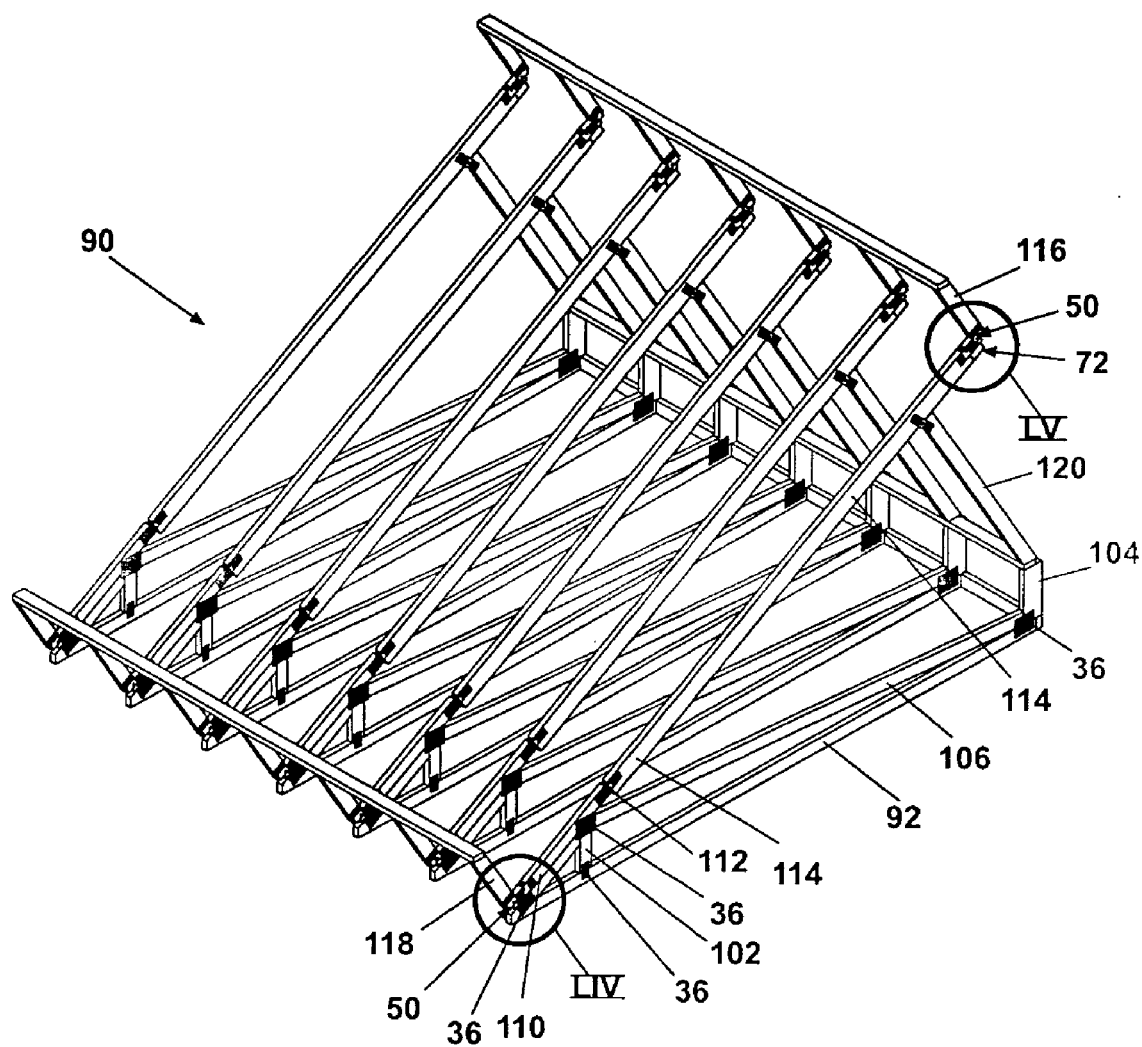
FIG. 53 is a perspective view of the foldable truss assembly of FIG. 47 in a second semi-erected position.
Figure 54:
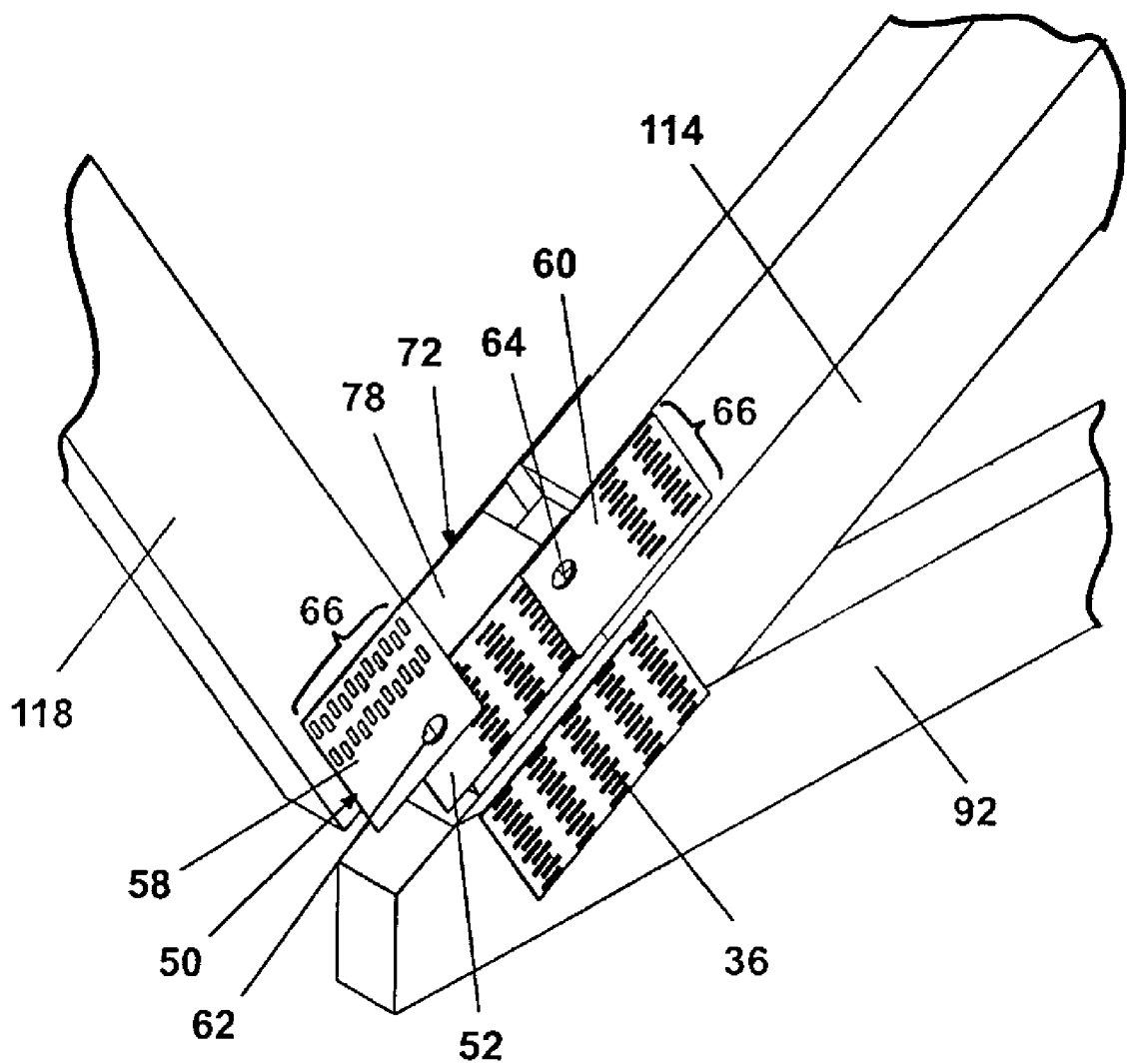
FIG. 54 is an enlarged perspective view showing the eave region marked LIV in FIG. 53.
Figure 55:
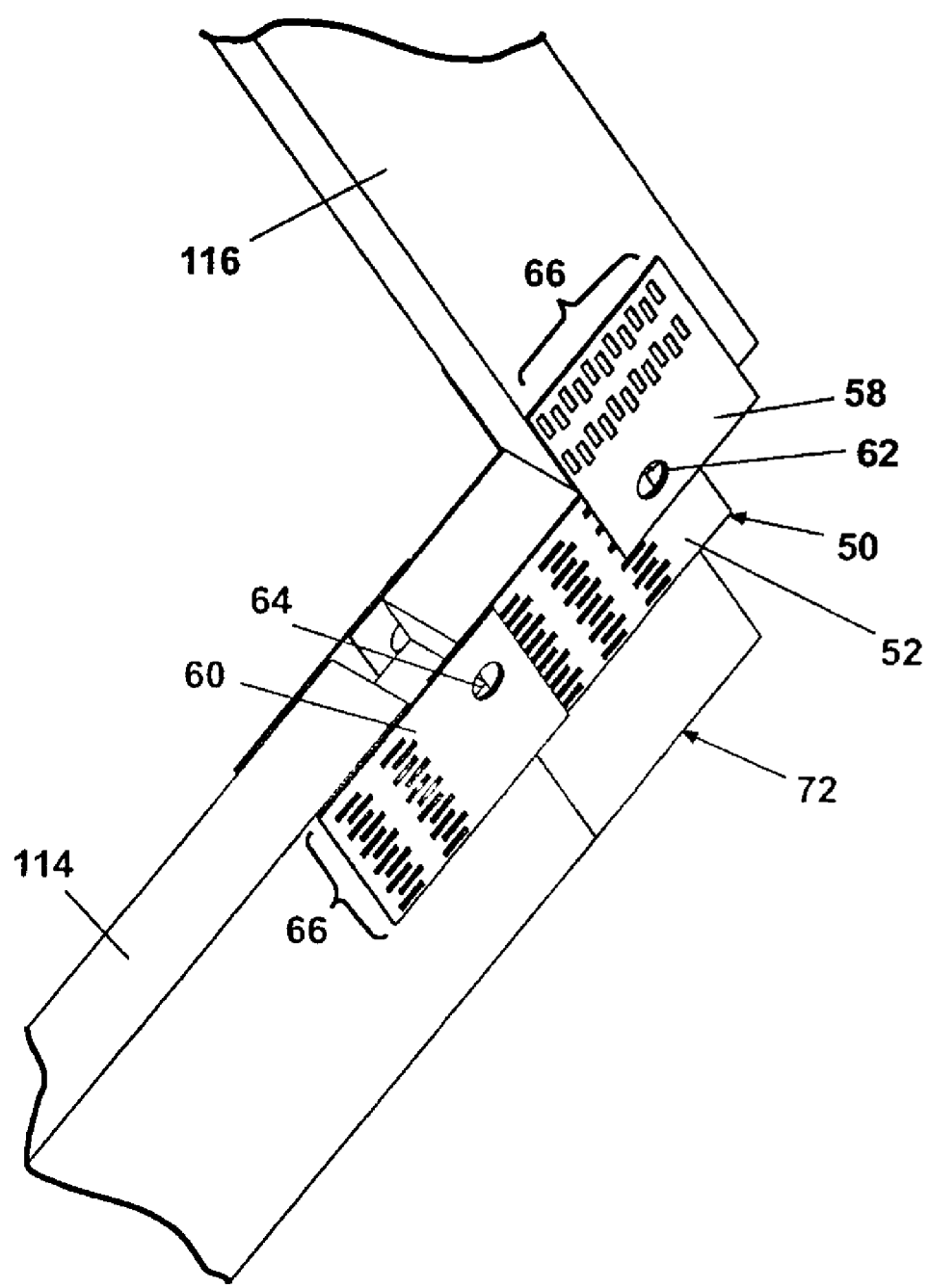
FIG. 55 is an enlarged perspective view showing the cap region marked LV in FIG. 53.
Figure 56:
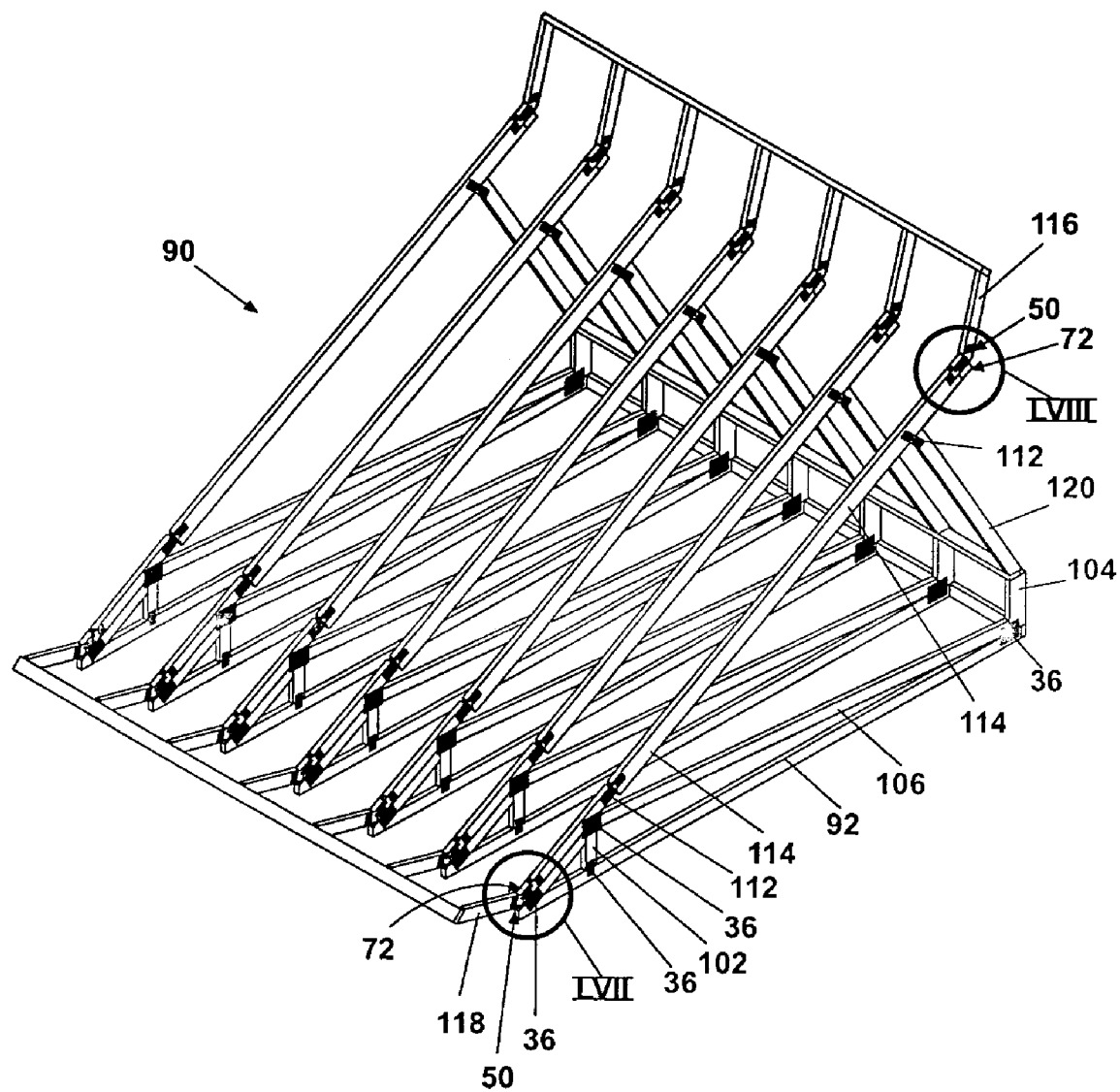
FIG. 56 is a perspective view of the foldable truss assembly of FIG. 47 in a third semi-erected position.
Figure 57:
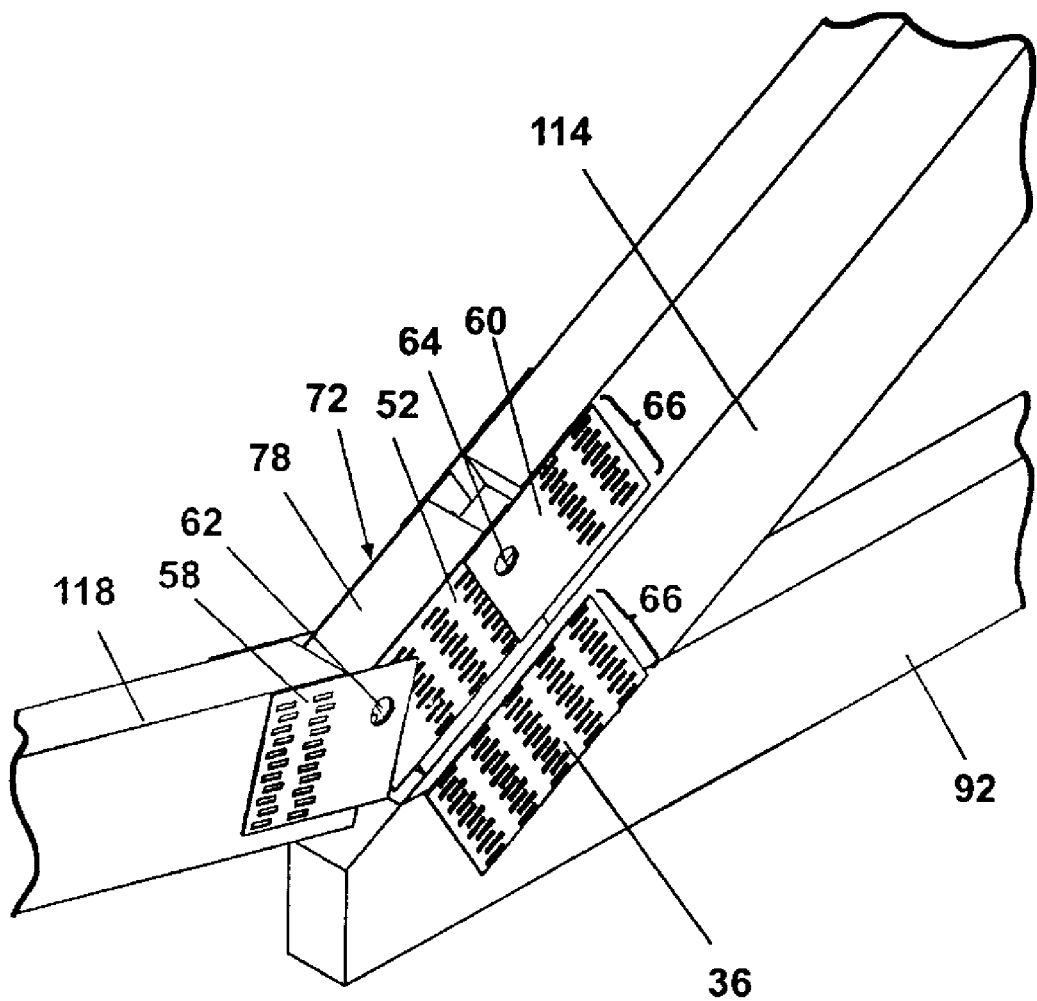
FIG. 57 is an enlarged perspective view showing the eave region marked LVII in FIG. 56.
Figure 58:
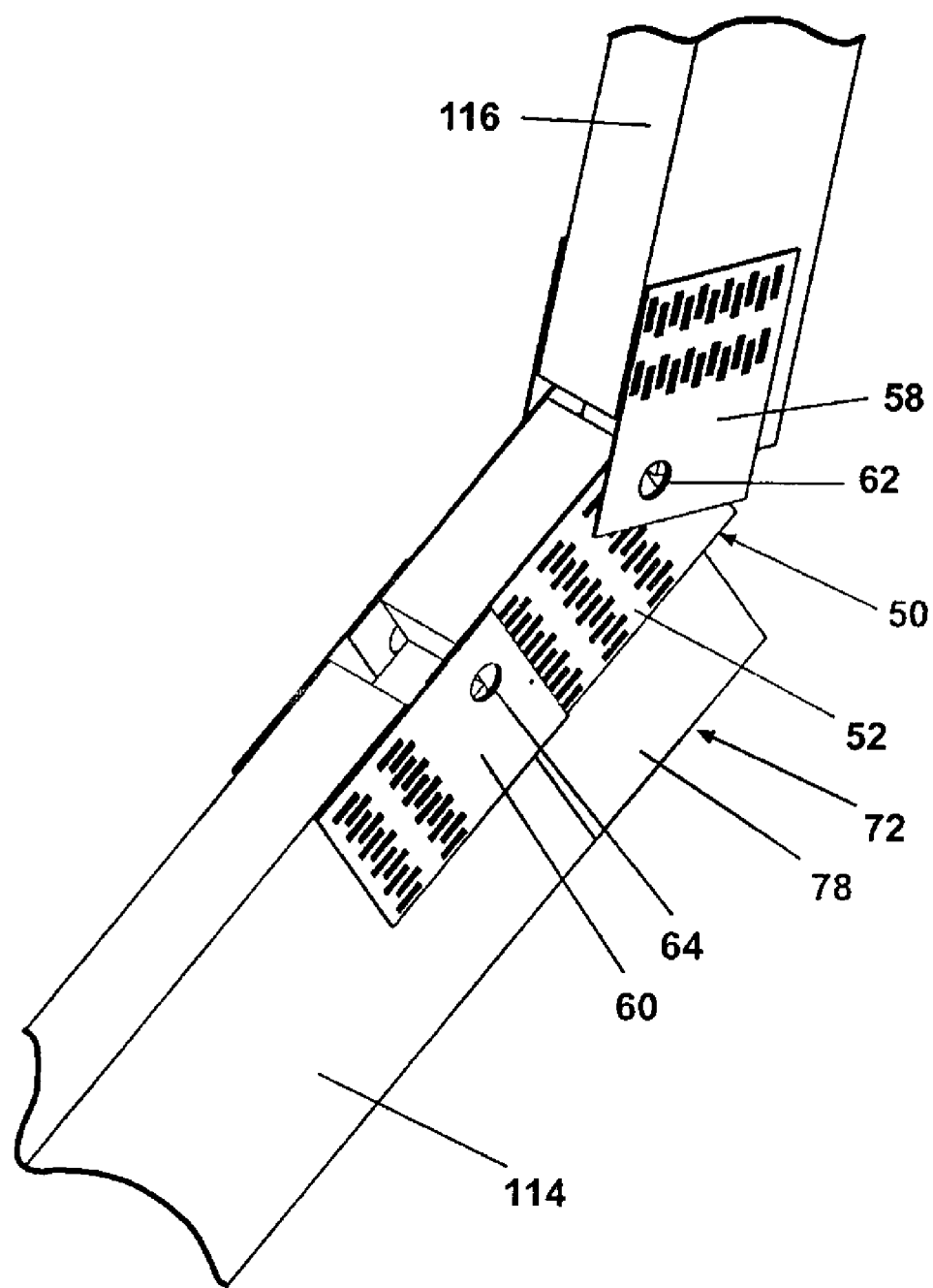
FIG. 58 is an enlarged perspective view showing the cap region marked LVIII in FIG. 56.
Figure 59:
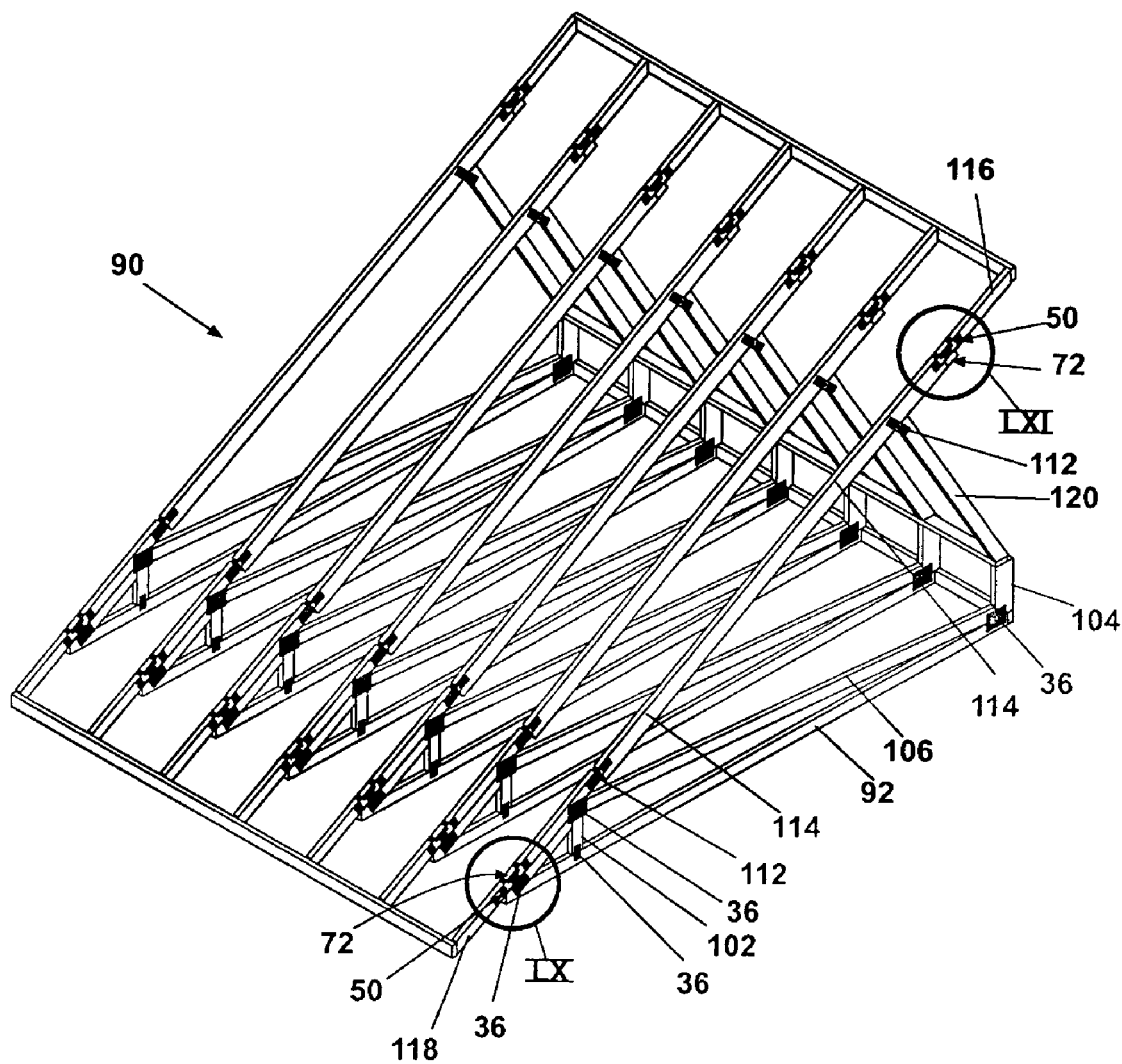
FIG. 59 is a perspective view of the foldable truss assembly of FIG. 47 in a fully-erected position.
Figure 60:
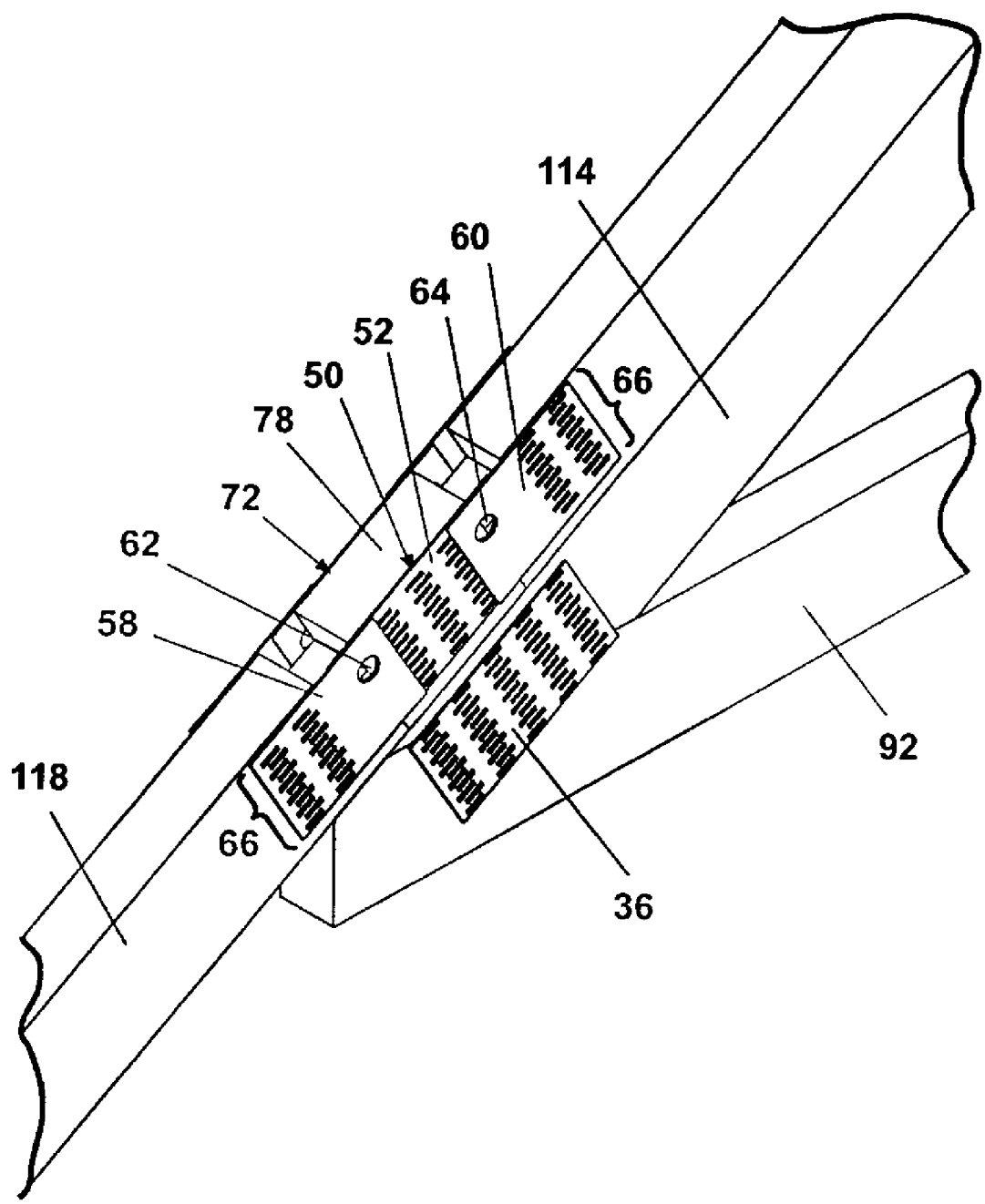
FIG. 60 is an enlarged perspective view showing the eave region marked LX in FIG. 59.
Figure 61:
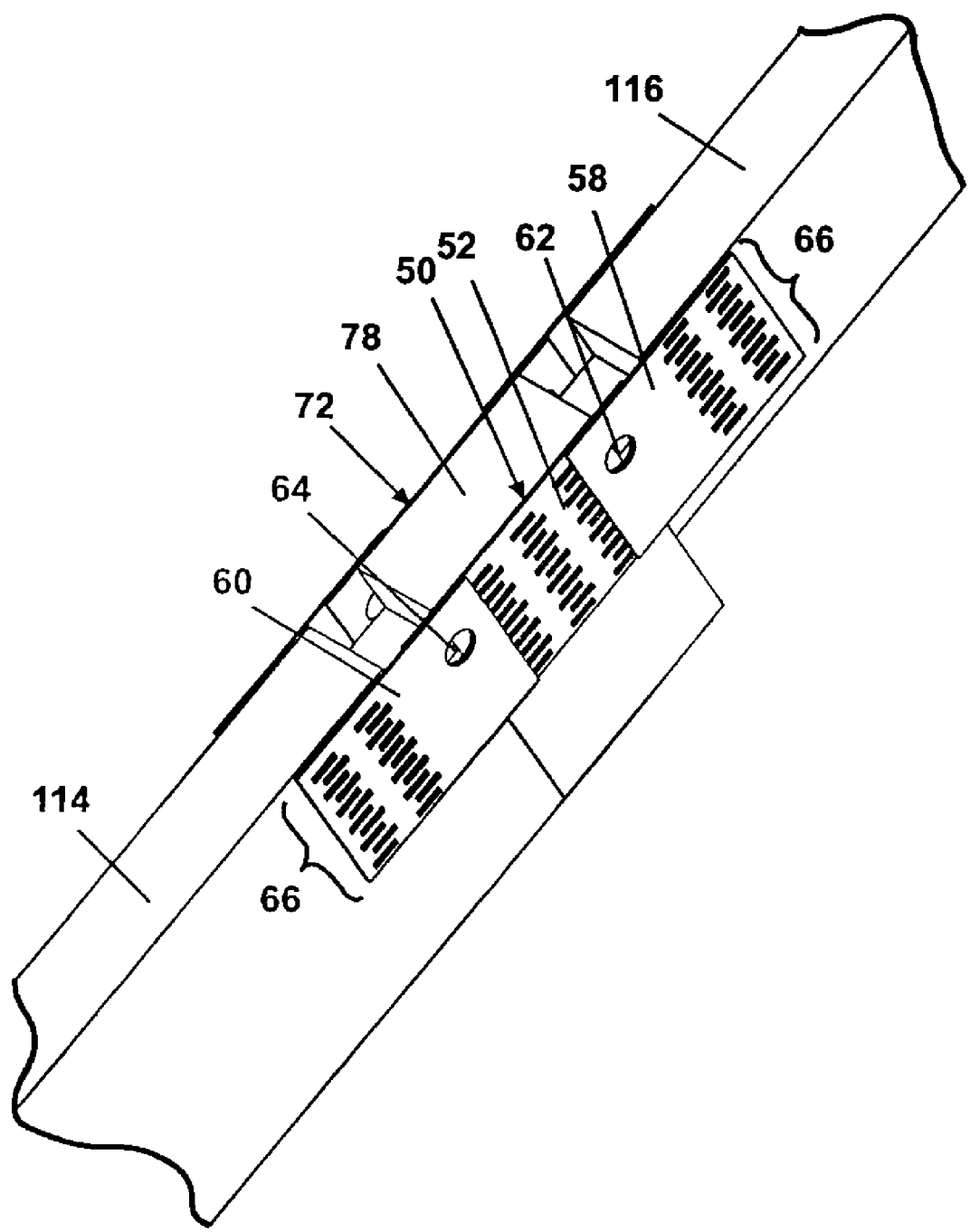
FIG. 61 is an enlarged perspective view showing the cap region marked LXI in FIG. 59.

Referring to FIGS. 31–36 and to FIGS. 35–36 in particular, a pair of hinge plates 50 are shown mounted to a lumber subassembly 72 comprising a first elongated member 74, a second elongated member 76 and a connector block 78. The first and second elongated members 74 and 76 can be any lumber member typically employed in a truss assembly. Each of the first and second elongated members 74 and 76 preferably has a notched portion 80 extending at a predetermined height and depth in from a top surface 82 and a vertical end 84. The connector block 78 preferably comprises a lumber member having a width W generally corresponding to a distance between center points of the first and second hinges 62 and 64 of the connector member 52 of a hinge plate 50.

The connector block 78 also has vertical ends 84 and a top surface 82. Notched portions 80 extend along a predetermined depth and width between the top surface of 82 and each of the vertical ends 84 of the connector block 78.

FIG. 36 shows the lumber subassembly 72 after a pair of hinge plates 50 has been mounted to opposing sides thereof in a manner which has been previously described. As is evident from the drawings, the lumber subassembly 72 can thereby be pivotally moved about each of the hinges 62 and 64 of the hinge plate 50. The abutment of the vertical ends 84 of each of the first and second elongated members 74 and 76 with the vertical ends 84 of the connector block 78 provides a secured end-to-end position of the lumber subassembly 72 in a straight-line position. Conversely, the notched portions 80 in each of the first and second elongated members 74 and 76, as well as the notched portions 80 in the connector block 78, provide clearance for pivotal movement of the hinge plate 50 about the hinges 62 and 64. As can also be seen in FIGS. 37–66, the notched portions also provide a fully-folded position as defined by the hinge plate 50 with respect to the truss 90 into which it is mounted.

Figure 8:
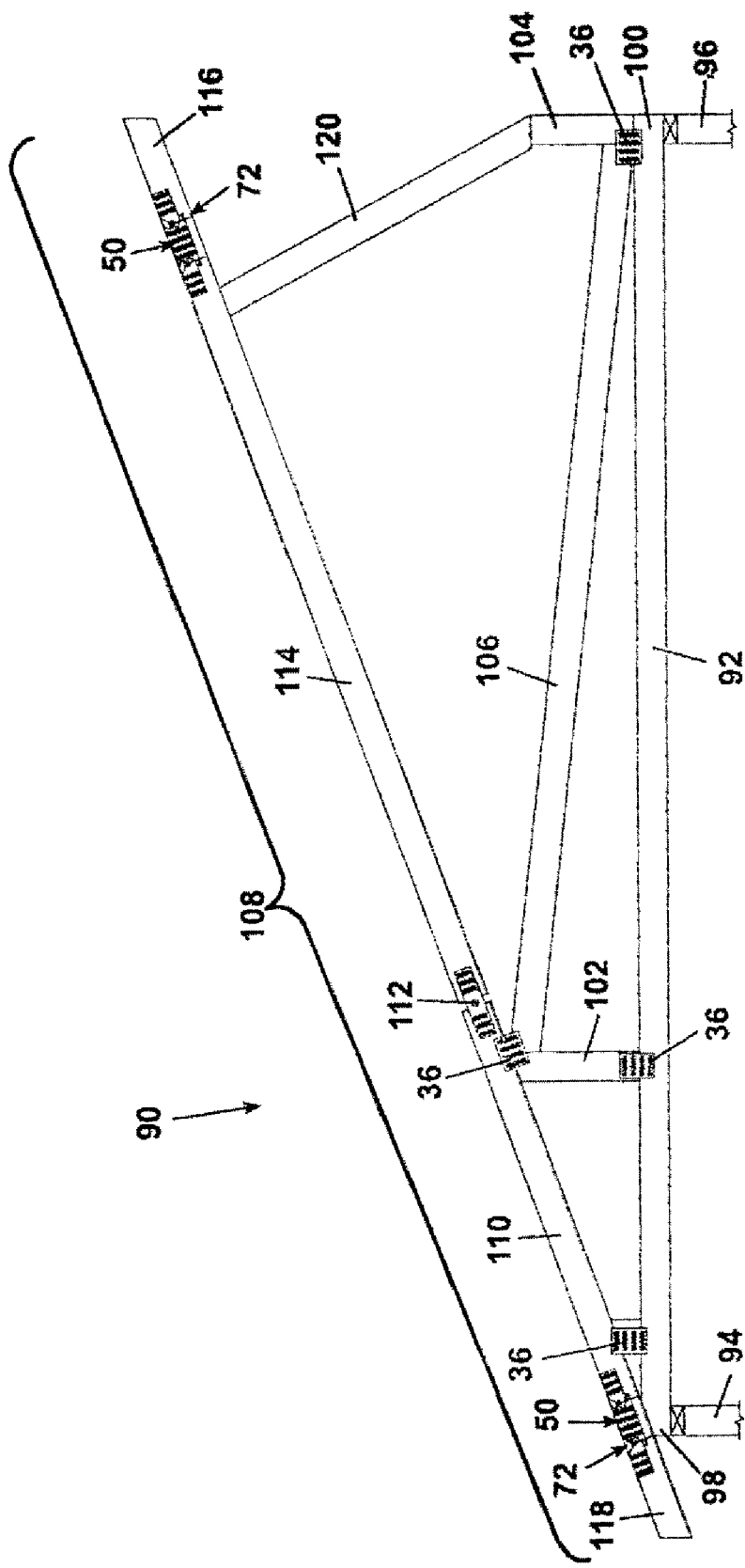
FIG. 8 is a side elevational view of a foldable truss assembly including a pair of double-hinge plate shown in FIG. 2 according to the invention.
Figure 11:
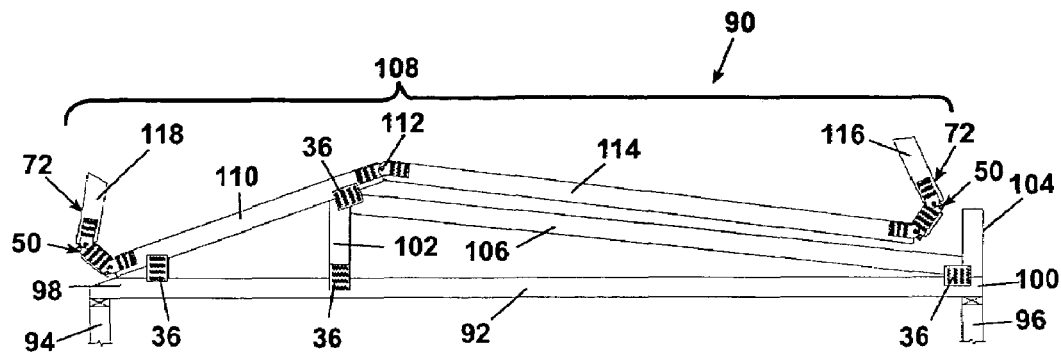
FIG. 11 is a side elevational view of the foldable truss assembly of FIG. 8 in a second semi-erected position.
Figure 10:
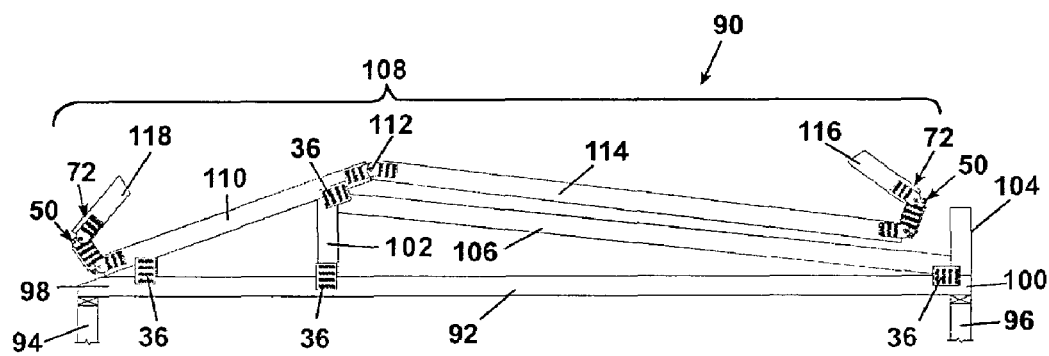
FIG. 10 is a side elevational view of the foldable truss assembly of FIG. 8 in a first semi-erected position.

FIG. 8 shows a roof truss 90 including at least one lumber subassembly 72 including a first elongated members 74, a second locking elongated member 76 and a connector block 78 according to the invention. The truss 90 comprises a bottom chord 92 support of the top a pair of walls 94 and 96 wherein the bottom chord 92 has a first end 98 and a second end 100 forming outer and inner portions of a structure, respectively. A web 102 extends upwardly from the bottom chord 92 and is attached thereto by a conventional nail plate 36.

A kingpost 104 extends upwardly from the second end 100 of the bottom chord 92. A diagonal web 106 extends between an upper portion of the web 102 and the second end 100 of the bottom chord 92 adjacent to the interconnection between the bottom end of the kingpost 104 and the second end 100 of the bottom chord 92. Conventional nail plates 36 perform the interconnection between these components as well.

A top chord 108 forms an angular upper surface of the truss 90 and includes a lower top chord 110 interconnected by a standard single-hinge plate 112 to an upper top chord 114. A first lumber subassembly 72 according to the invention extends from an upper end of the upper top chord 114 and between a lower end of a peak cap 116. A second lumber subassembly 72 extends from a lower end of the lower top chord 110 and between an upper end of an overhang chord 118.

While several installations and mountings of single hinge plates 112 are shown in the exemplary trusses 90 throughout the drawings, it will be understood that the double hinge plate 50 according to the invention can be substituted for the single hinge plates 112 at any location where the single hinge plates 112 are shown without departing from the scope of this invention. It has been found that the substitution of the single hinge plate 112 with the double hinge plate 50 can provide additional benefits in the folding and erection of trusses 90 as shown herein and which would be obvious to one skilled in the art.

As can be seen from the drawings, whereas the lumber subassembly 72 was generally described as having a connector block 78 between a pair of first and second elongated members 74 and 76, the first lumber subassembly 72 in the truss 90 shown in FIG. 8 has as its first and second elongated members the upper top chord 114 and the peak cap 116. The second lumber subassembly 72 in the truss 90 shown in FIG. 8 has as its first and second elongated members the lower top chord 110 and the overhang chord 118. A knee wall 120 can be mounted atop the kingpost 104 and extends upwardly in angular fashion to be mounted to a bottom surface of the upper top chord 114.

The truss shown generally by reference 90 in FIG. 8 is an example of the truss mounted atop a wall structure, which can be folded after home manufacture in accordance with the previous paragraph. The home can then be conveniently transported with the truss in its folded state to a building site and erected into a fully unfolded state on the wall structure to form a roof system. As will be described below, the roof truss 90 shown in FIG. 8 requires far less manufacturing at the home manufacturer's facility and less assembly once the truss 90 has been transported to the building site.

FIGS. 9–19 show the unfolding and the erection of the roof truss 90. It will be understood that, if FIGS. 9–19 are viewed in ascending order, the sequence of these drawings depict the truss 90 being erected from a folded to an unfolded state. The converse is also true and that, if FIGS. 9–19 are viewed in descending order, the sequence of these drawings depict the truss 90 being collapsed from an erected to a folded state.

Figure 9:
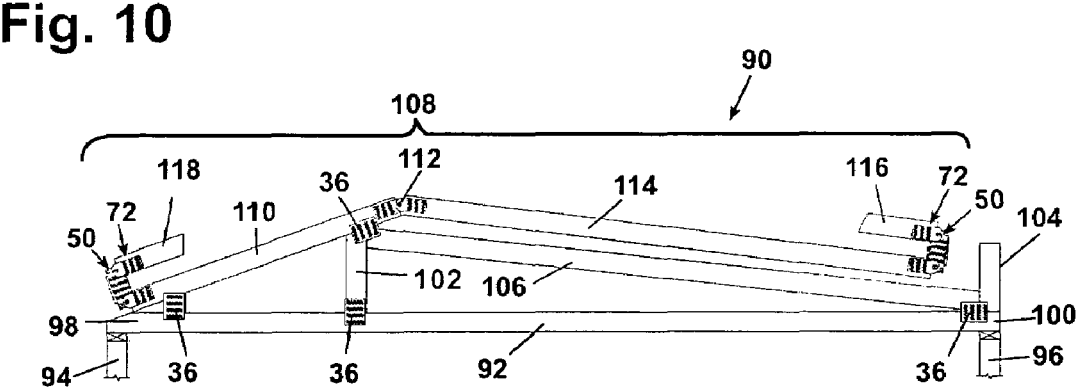
FIG. 9 is a side elevational view of the foldable truss assembly of FIG. 8 in a fully folded position.
Figure 15:
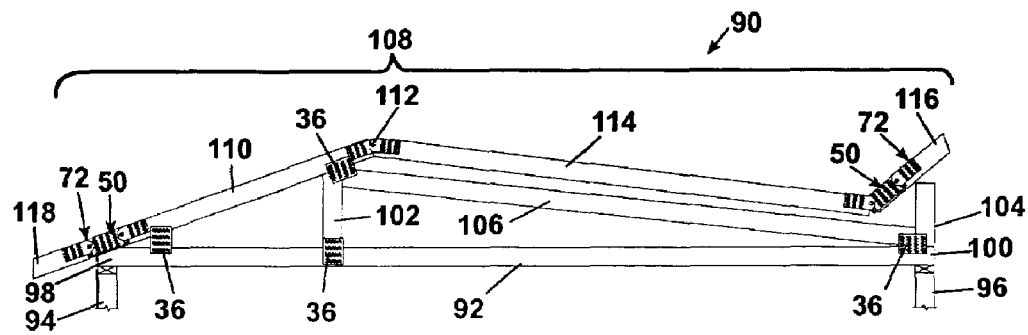
FIG. 15 is a side elevational view of the foldable truss assembly of FIG. 8 in a sixth semi-erected position.
Figure 14:
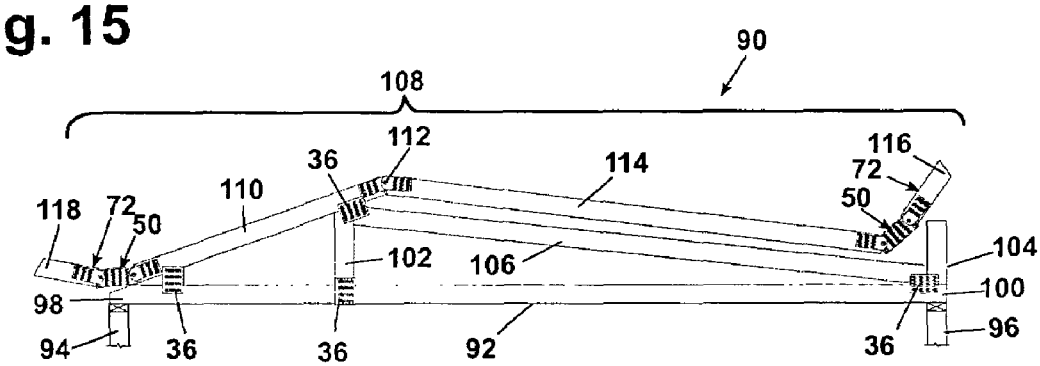
FIG. 14 is a side elevational view of the foldable truss assembly of FIG. 8 in a fifth semi-erected position.
Figure 13:
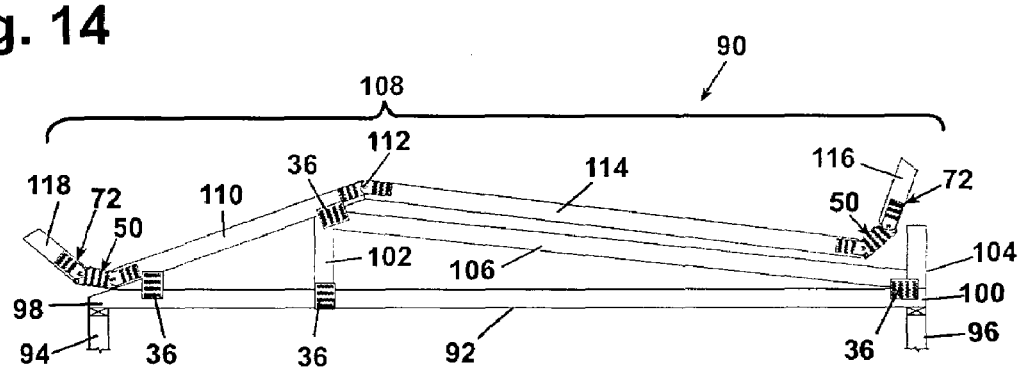
FIG. 13 is a side elevational view of the foldable truss assembly of FIG. 8 in a fourth semi-erected position.
Figure 12:
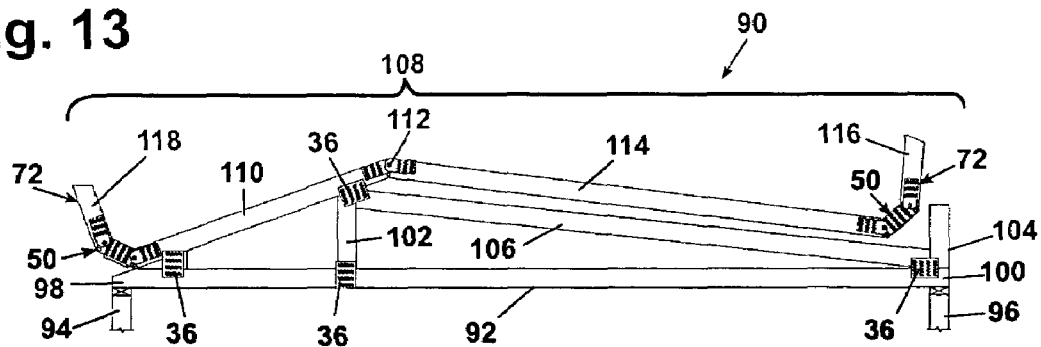
FIG. 12 is a side elevational view of the foldable truss assembly of FIG. 8 in a third semi-erected position.

Beginning with FIG. 9, the truss 90 is in a folded state in which the only rigidly-connected members are the bottom chord 92, the lower top chord 110, the web 102, the diagonal web 106 and the kingpost 104. The top chord 114 is pivoted downwardly with respect to the upper end of the lower top chord 110 about the standard single-hinge plate 112. The first and second lumber subassemblies 72 are pivoted into a reversely-folded position with respect to the upper end of the upper top chord 114 and the lower end of the lower top chord 110, respectively. The peak cap 116 and the overhang chord 118 are thereby pivoted upwardly and inwardly with respect to a medial centerline of the truss 90. As can be seen from FIG. 9, the peak cap 116 and the overhang chord 118 are thereby located inwardly of the outer ends of the truss 90 and the upper top chord 114 is pivoted downwardly so that the truss 90 has a lower overall height and width than it would otherwise have in a non-pivoted position.

FIGS. 10–16 shows step-by-step how the peak cap 116 and the overhang chord 118 are pivoted with respect to the hinge plate 50 on the first and second lumber subassemblies 72 within the top chord 108. By FIG. 15, the overhang chord 118 is in its final position wherein the lumber subassembly 72 is in a generally parallel position and the overhang chord 118 is located in place. By FIG. 16, the peak cap 116 abuts the top portion of the kingpost 104.

Figure 17:
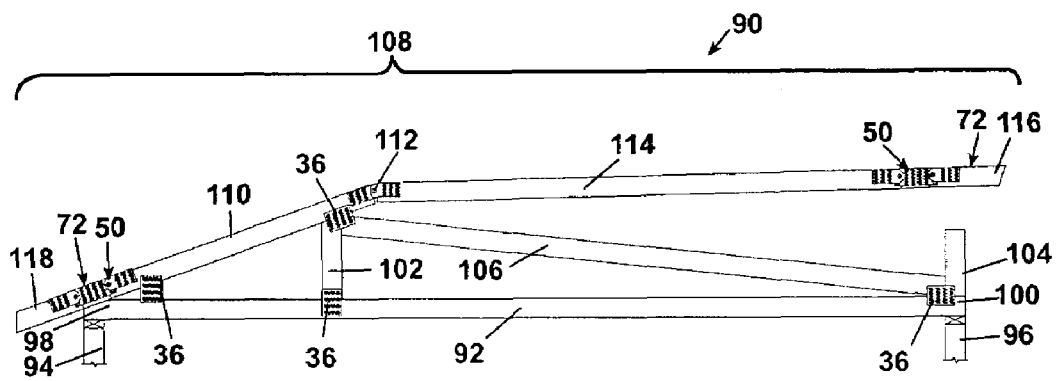
FIG. 17 is a side elevational view of the foldable truss assembly of FIG. 8 in an eighth semi-erected position.
Figure 16:
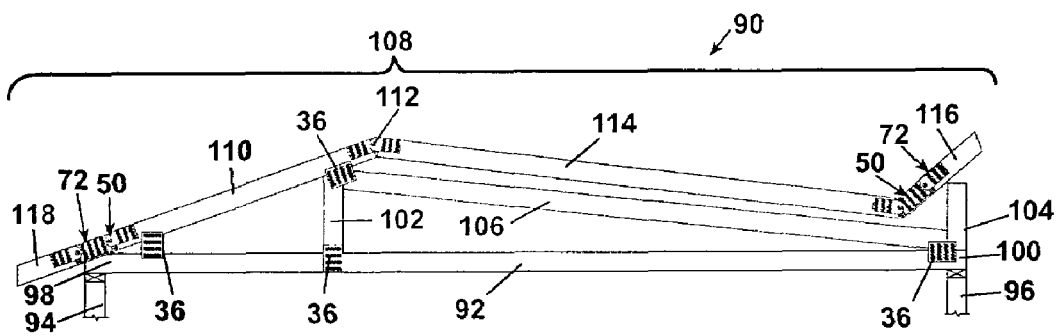
FIG. 16 is a side elevational view of the foldable truss assembly of FIG. 8 in a seventh semi-erected position.

Turning to FIG. 17, the upper top chord 114 is pivoted upwardly with respect to the single-hinge plate 112 (with respect to its connection to the upper end of the lower top chord 110) so that the first lumber subassembly 72 connecting the peak cap 116 to the upper top chord 114 is pivoted to its final, generally parallel position.

Figure 19:
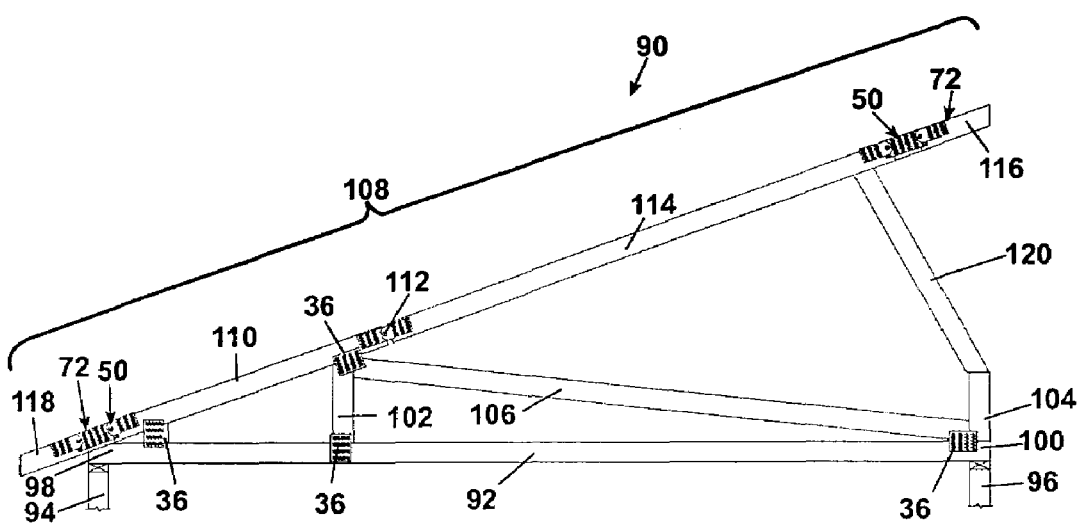
FIG. 19 is a side elevational view of the foldable truss assembly of FIG. 8 in a fully-erected position.
Figure 18:
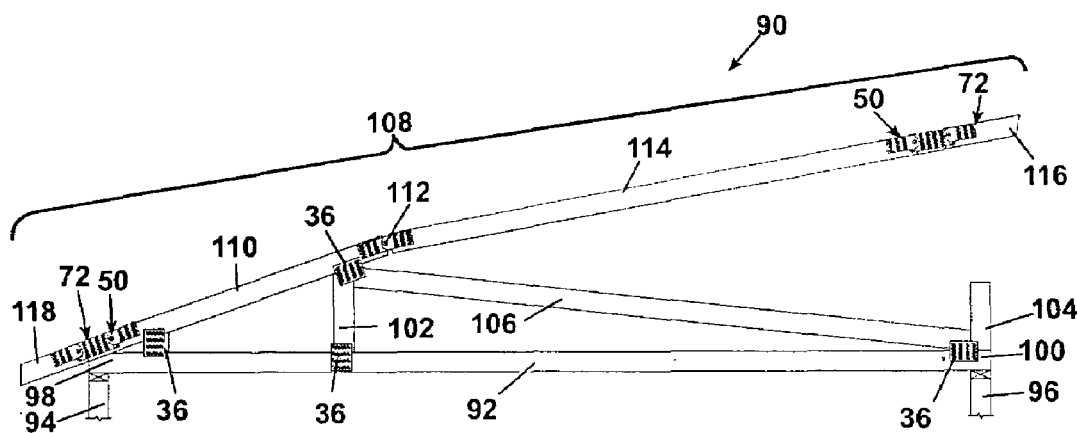
FIG. 18 is a side elevational view of the foldable truss assembly of FIG. 8 in a ninth semi-erected position.

FIGS. 18–19 show the completion of the pivot of the upper top chord 114 with respect to the single-hinge plate 112 and, in turn, with respect to the upper end of the lower top chord 110. Once the upper top chord 114 is sufficiently pivoted into a generally parallel position with respect to the lower top chord 110, the parallel alignment of all of the components of the top chord 108 (the overhang chord 118, the lower top chord 110, the upper top chord 114, and the peak cap 116) are in an in-line alignment (i.e., generally parallel) and the knee wall 120 can be inserted into place, fixedly mounted between the kingpost 104 and the lower surface of the upper top chord 114, thus completing the assembly and unfolding of the truss 90.

As can be seen from the drawings, no additional reinforcing members need be applied to the truss 90 to additionally reinforce the structural mounting between its components. The parallel abutment of the vertical ends 84 within each of the lumber subassemblies 72 provides a locking abutment which prevents over rotating of the particular first and second elongated members making up the lumber subassembly 72.

This invention consists of a system 72 of accurately cut wood members and a unique double-hinge metal plate connector 50. Conceptually, two elongated members 74 and 76 are brought together and sandwiched around a shorter center wood member (i.e., the connector block 78). The ends of the elongated members 74 and 76 are first cut 90 degrees to the length of the boards. An additional cut on the ends (i.e., the chamfer 80) is added which trims off the corners at an angle or in the dado-style cut shown in the embodiment of FIGS. 31–36, preferably greater than 45 degrees to the length of the board. Both ends of the connector block 78 are trimmed in a similar fashion to the elongated members 74 and 76. The elongated members 74 and 76 are brought together to butt against the connector block 78 with intimate wood-to-wood contact.

The double-hinge plate 50 consists of two rectangular, preferably light-gauge galvanized steel plates 58 and 60. A center connector plate 52, preferably with a similar gauge steel, overlaps both lateral plates 58 and 60. In the area of overlap, the connector plate 52 is hinged to both lateral plates 58 and 60. Punching through each set of overlapping plates forms the hinges 62 and 64. All plates have pieces of the metal plate pierced from the mother plate on three sides and bent out on the fourth side to form the teeth 66. Each plate 52, 54 and 56 preferably contains a multiple number of teeth grouped together, commonly called gang-nails.

The gang-nails in the lateral plates 58 and 60 are embedded into the elongated members using a hydraulic press or other suitable methods. In this pressing process, the connector plate 52 is concurrently embedded into the center wood member, i.e., the connector block 78. The system is capable of rotating, as previously described, and also is structurally capable of transmitting shear and axial loads between both main members.

Compared to the prior art, making the hinge plate 50 an integral part of the truss design eliminates the need for additional on-site reinforcements for structural soundness to be achieved. The system 72 is capable of transferring shear or axial loads as well.

Figure 22:
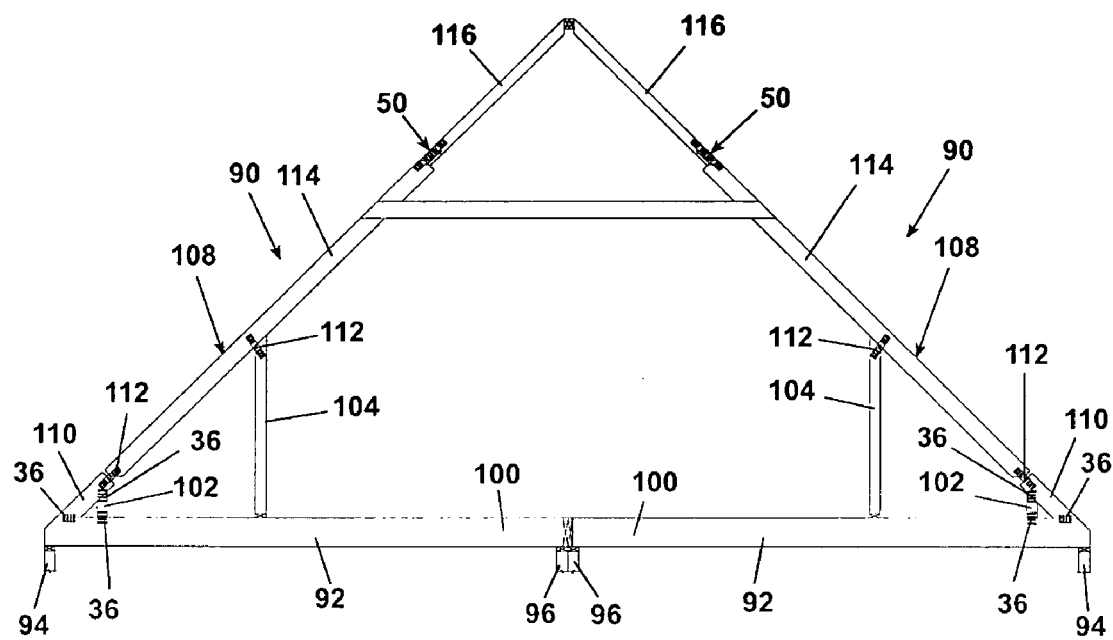
FIG. 22 is a side elevational view of a third alternative embodiment of a foldable truss assembly incorporating the invention.
Figure 23:
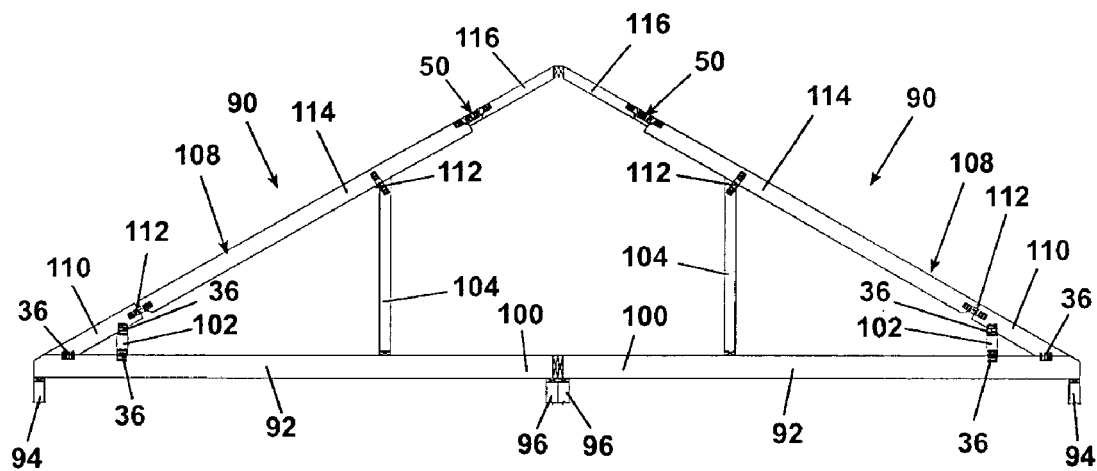
FIG. 23 is a side elevational view of a fourth alternative embodiment of a foldable truss assembly incorporating the invention.

It will be understood that the foldable truss assembly 90 can be employed with various roof configurations without departing from the scope of this invention. FIG. 20 is a side elevational view of a foldable truss assembly 90 employed in a double-wide monopitch roof configuration. FIG. 21 is a side elevational view of a foldable truss assembly 90 employed in a triple-wide monopitch roof configuration. FIG. 22 is a side elevational view of a foldable truss assembly 90 employed in a Cape Cod-style attic-frame roof configuration. FIG. 23 is a side elevational view of a foldable truss assembly 90 employed in a roof configuration arranged for attic storage.

FIGS. 24–30 illustrate the various steps employed in the manufacture of a home or other residential or commercial dwelling including the foldable truss assembly shown by example in FIGS. 1–19 and in the alternative in FIGS. 20–23.

Figure 24:
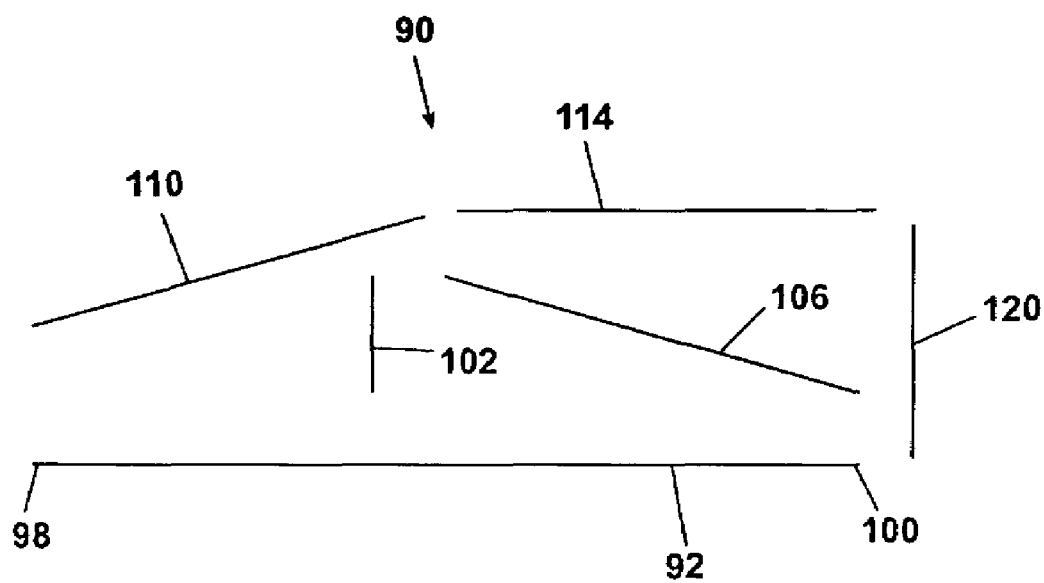
FIG. 24 is a schematic view of the foldable truss assembly shown in FIGS. 1–19 in a disassembled state.
Figure 25:
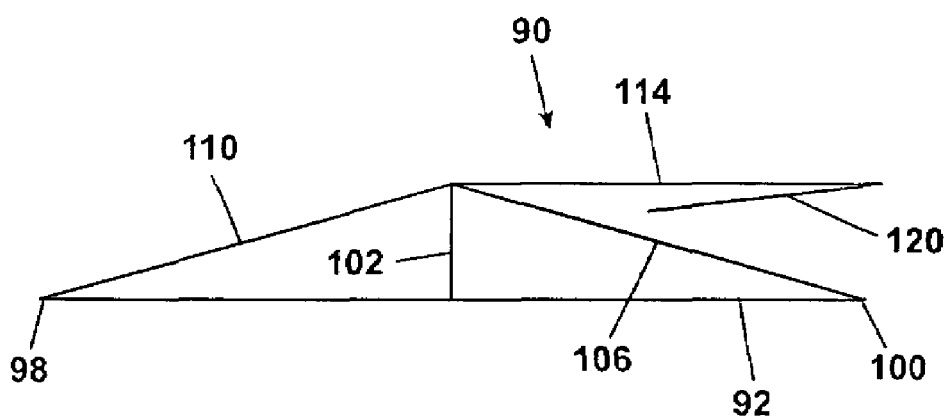
FIG. 25 is a schematic view of the foldable truss assembly shown in FIG. 24 in an assembled state.

FIGS. 24–25 generally illustrate the manufacturing steps that occur at a truss manufacturer's facility. Truss components (generally identified by reference numerals 92–120) shown in FIG. 24 are assembled in the manner described above into the foldable truss assembly 90 as shown schematically in FIG. 25 and in more detail in FIGS. 1–23.

Figure 26:
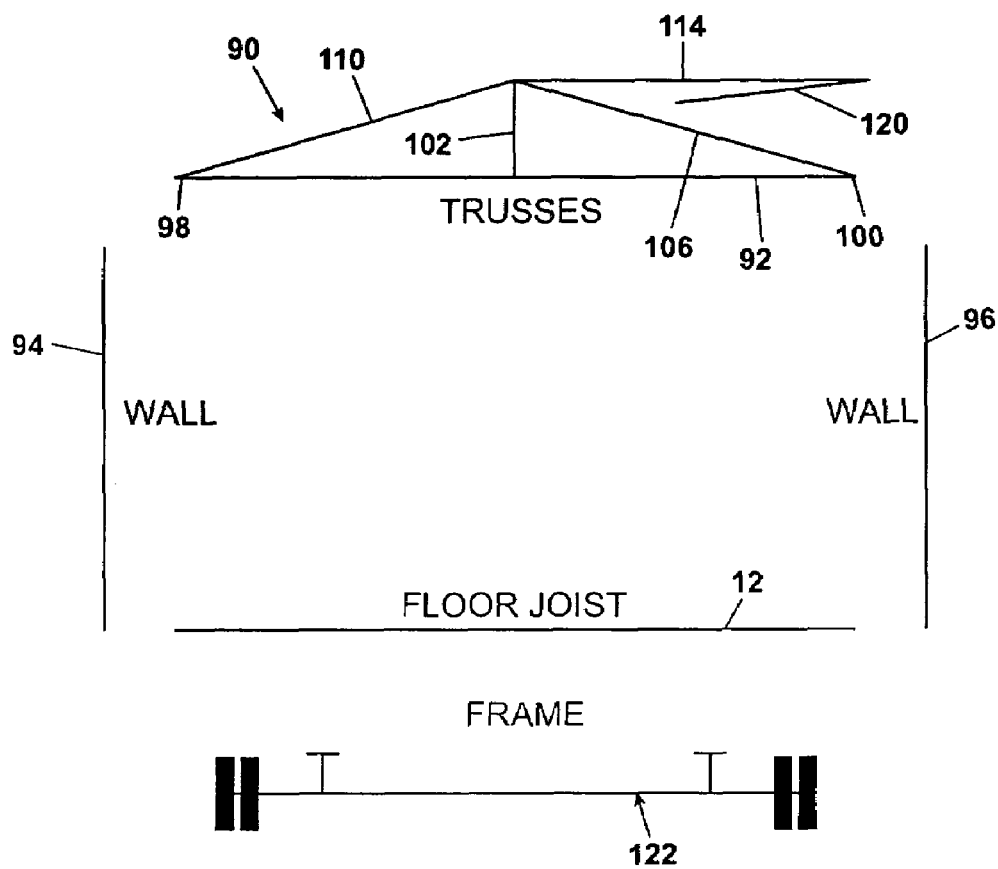
FIG. 26 is a schematic view of the foldable truss assembly of FIG. 25 shown aligned with a pair of walls, a floor joist and a transport frame in a disassembled state with respect to these components.
Figure 27:
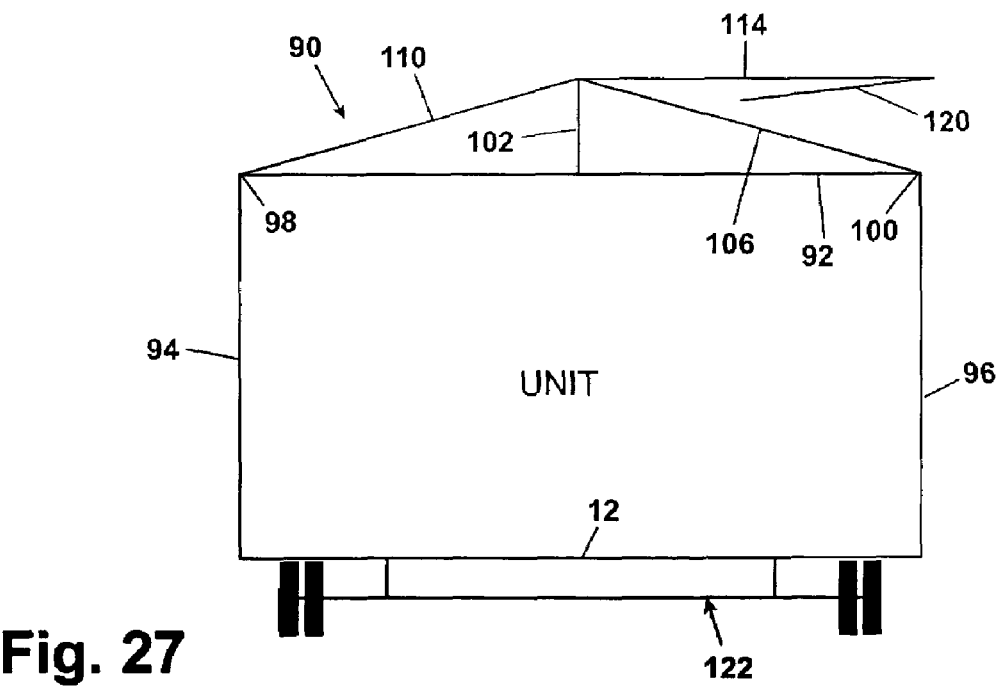
FIG. 27 is a schematic view of the foldable truss assembly of FIG. 26 shown aligned with a pair of walls, a floor joist and a transport frame in an assembled state with respect to these components.

FIGS. 26–27 generally illustrate the assembly steps that occur at a housing manufacturer's facility. The foldable truss assembly 90 received from the truss manufacturer (as in FIG. 25) is assembled onto a floor joist 12 and walls (shown by example as reference numerals 94 and 96). In addition, the floor joist is supported on a wheeled frame 122 (a structure well known in the art comprising a frame supporting wheels of the semi-truck ilk) as shown in FIG. 27.

Figure 28:
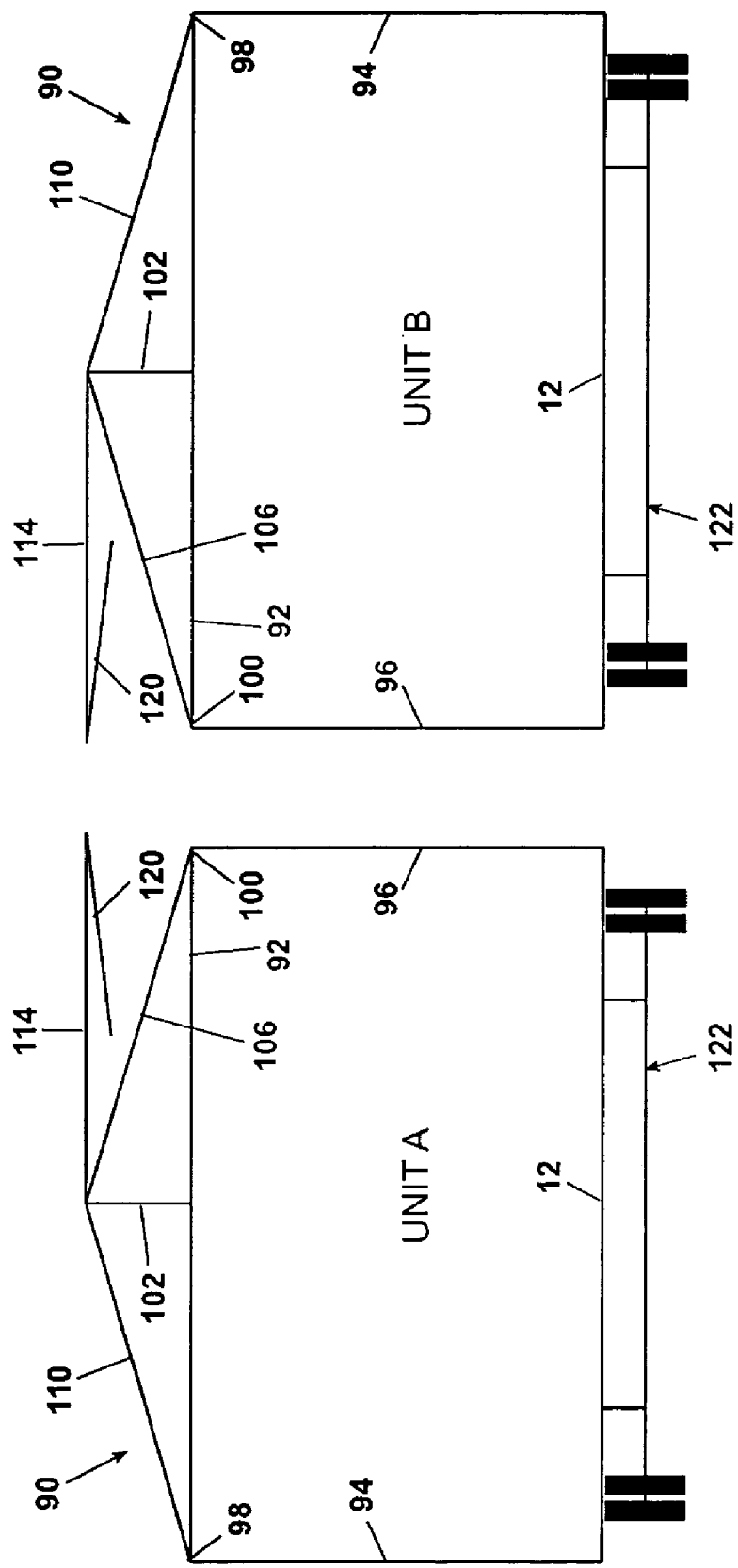
FIG. 28 is a schematic view of a pair of foldable truss assemblies of FIG. 27 each mounted atop a pair of walls, a floor joist and a transport frame with the truss assemblies in a juxtaposed relationship with respect to one another and the truss assemblies in a folded state.
Figure 29:
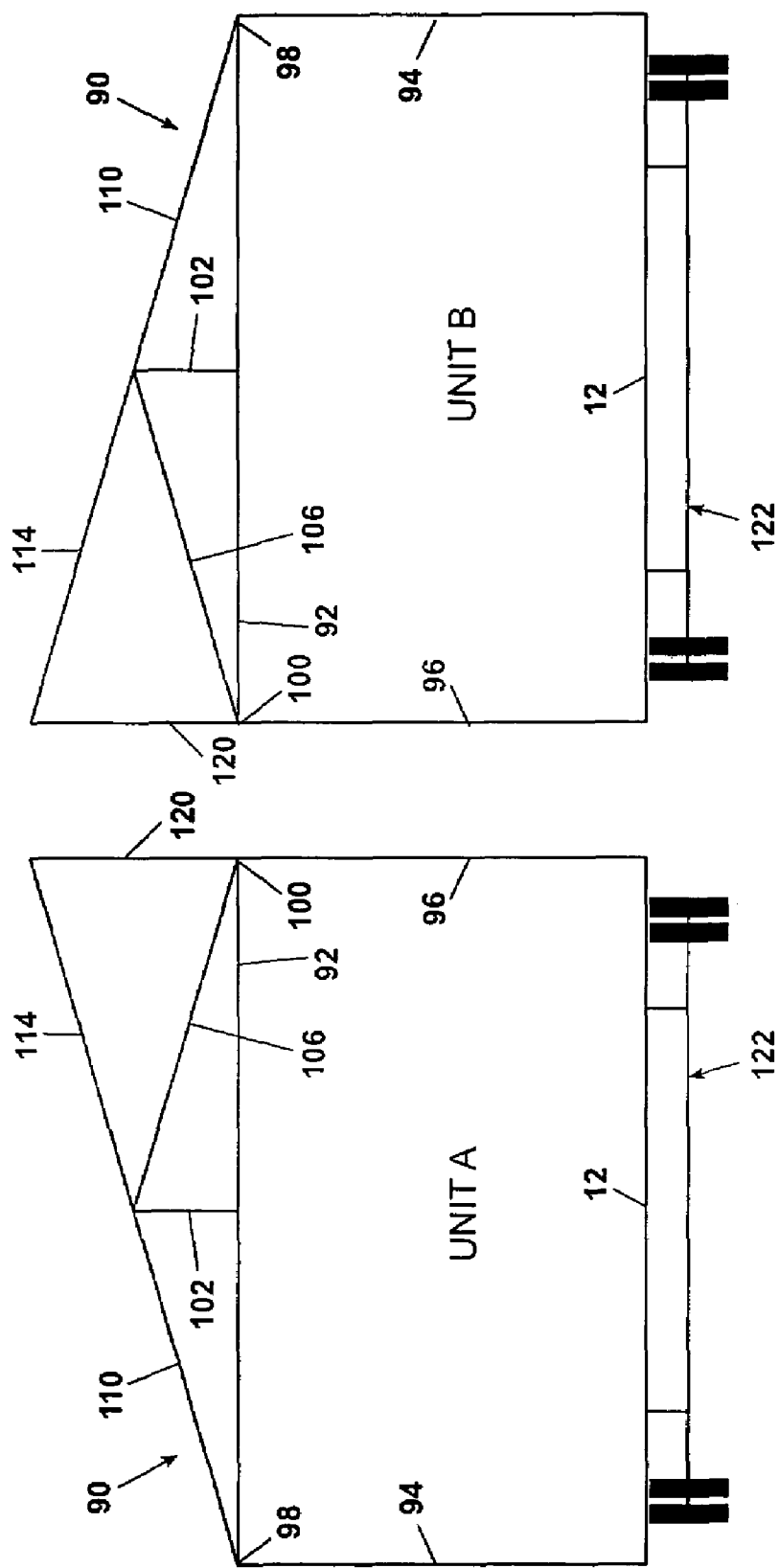
FIG. 29 is a schematic view of a pair of foldable truss assemblies in a similar orientation of FIG. 28 each mounted atop a pair of walls, a floor joist and a transport frame with the truss assemblies in a juxtaposed relationship with respect to one another and the truss assemblies in an erected state.
Figure 30:
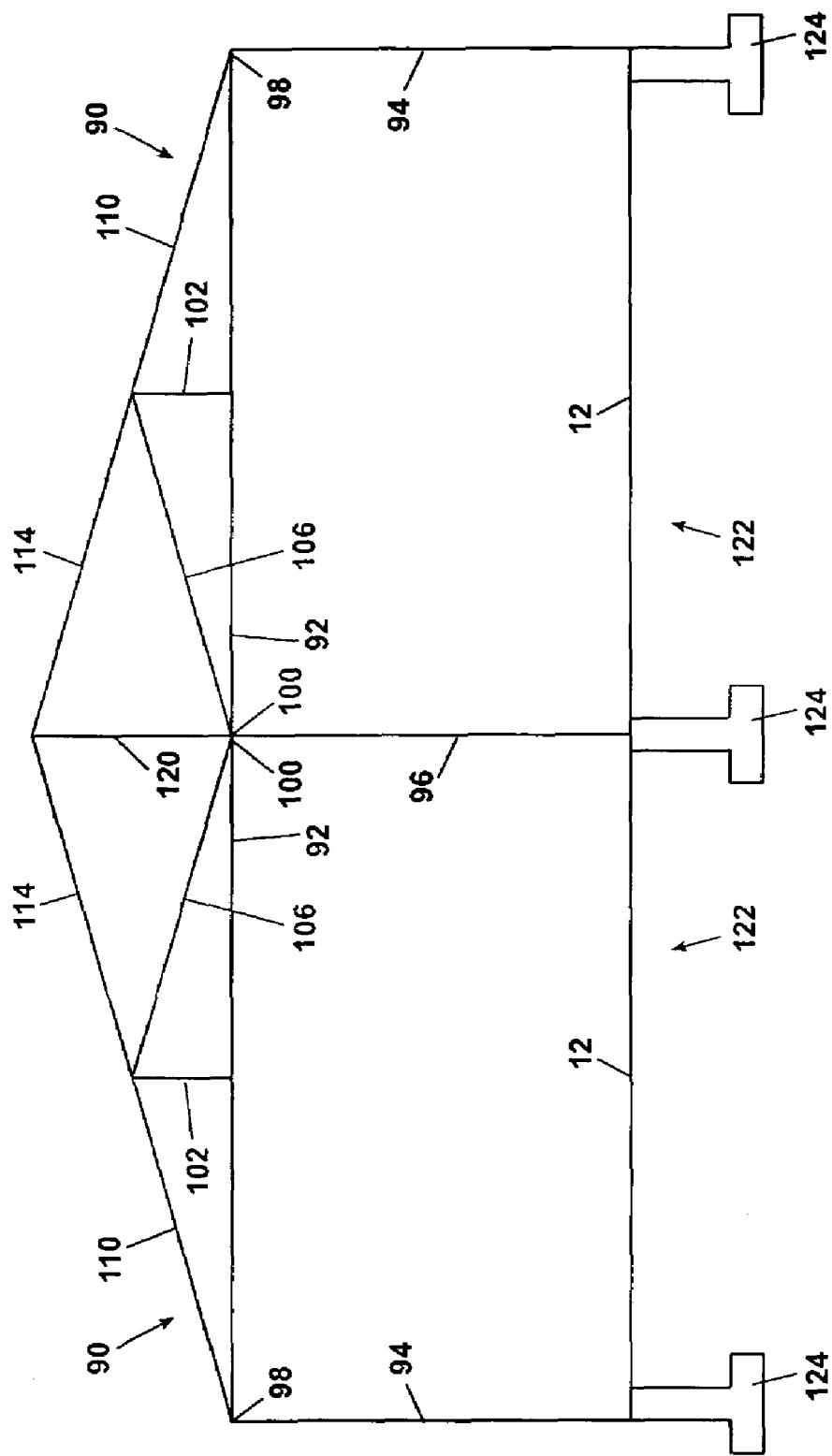
FIG. 30 is a schematic view of an assembled dwelling formed from the pair of assemblies shown in FIG. 29.
Figure 31:
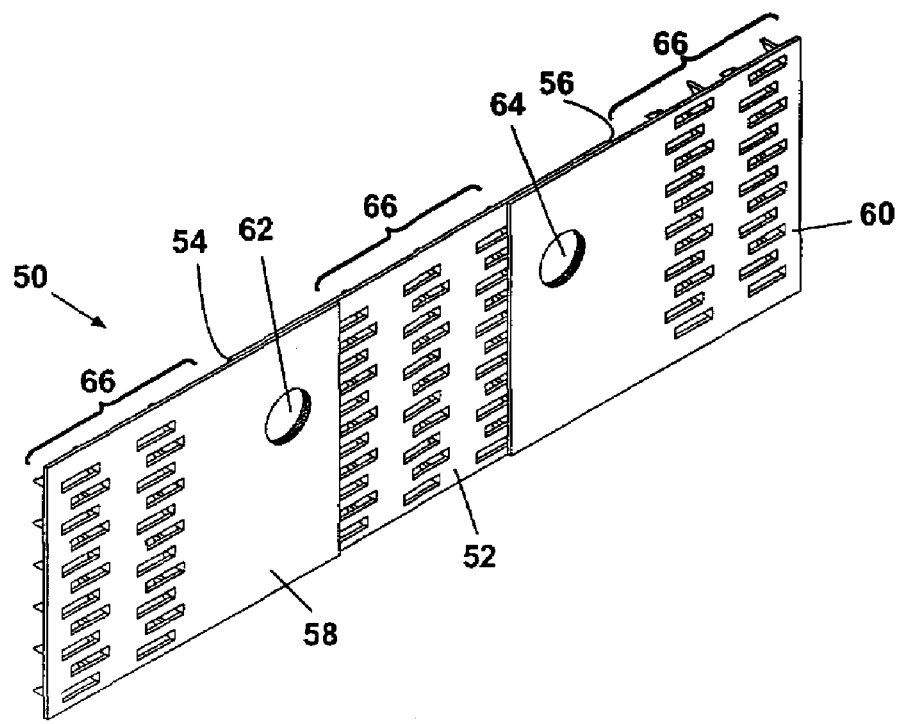
FIG. 31 is a perspective view of another embodiment of the double-hinge plate according to the invention showing in particular a front surface thereof.
Figure 32:
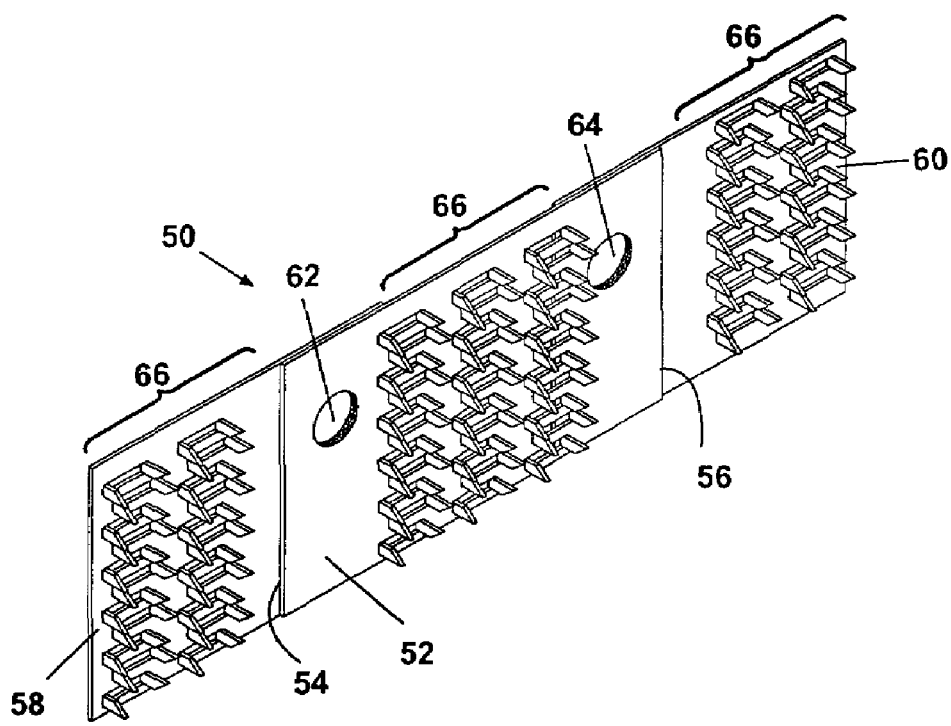
FIG. 32 is a perspective view of a rear surface of the double-hinge plate of FIG. 31.
Figure 33:
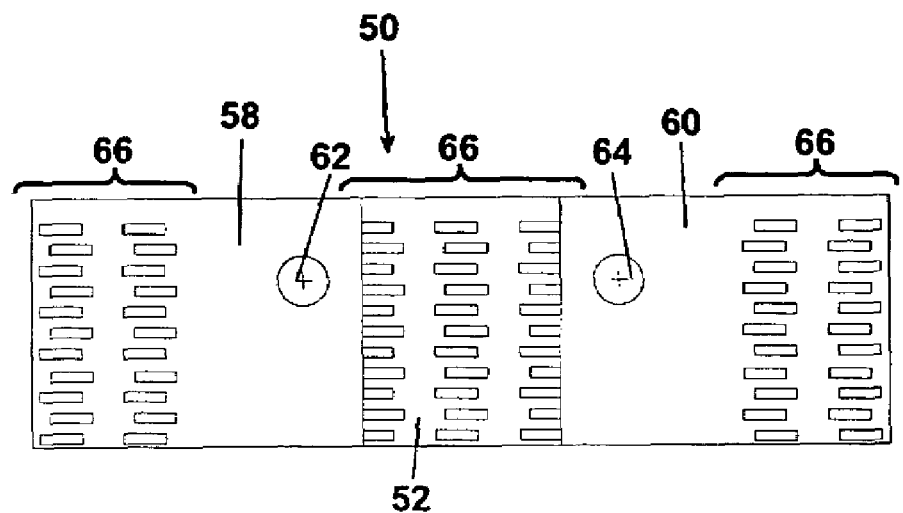
FIG. 33 is a front elevational view of the double-hinge plate of FIG. 31.
Figure 34:
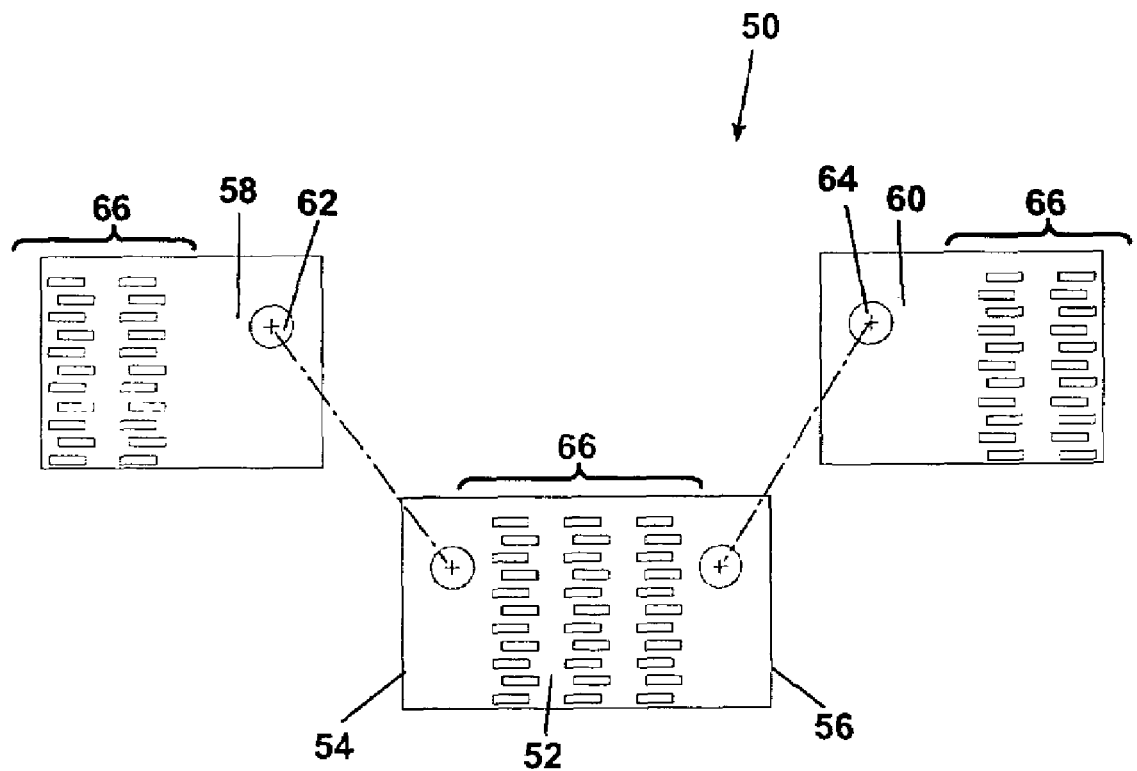
FIG. 34 is a front elevational view in an exploded orientation of the double-hinge plate of FIG. 31.

FIG. 28 generally illustrates the transportation steps that occur as the housing assembly shown in FIG. 27 is transported to a housing site. As can be seen, each half of a manufactured home is transported on a frame 122 to the site. When the frames 122 arrive at the housing site, they are generally positioned in an opposed relationship as shown in the orientation of FIG. 28. The foldable truss assemblies 90 on each frame 122 are erected as previously described as shown in FIG. 29. The two housing halves shown in FIG. 29 are mounted together into the home structure and positioned on bastions 124 as shown in FIG. 30, thus completing the housing assembly.

By way of additional examples, FIGS. 37–67 show additional examples of inventive truss assemblies incorporating the inventive hinge plate 50. It will be understood that the components of the foldable trusses 90 shown in FIGS. 37–67 are numbered with common reference numerals in order that an unduly repetitive descriptions of the structure and assembly of these trusses can be avoided, and wherein the written description of the earlier truss embodiments is equally applicable to the trusses 90 shown in FIGS. 37–67.

For example, FIGS. 37–46 show a Cape Cod-style roof truss 90 having a foldable cap portion being moved from a fully-folded position (see FIGS. 37–38) to a fully-erected position (FIGS. 45–46) through intermediate semi-erected 135-degree (FIGS. 39–40), 90-degree (FIGS. 41–42), and 45-degree (FIGS. 43–44) positions. When the hinge plate(s) 50 are fully unfolded, the zero-degree position as shown in FIGS. (45–46) is created.

By way of further example, FIGS. 47–61 show a hinged monopitch-style roof truss 90 having both a foldable cap portion and a foldable eave portion being moved from a fully-folded position (see FIGS. 47–49) to a fully-erected position (FIGS. 59–61) through intermediate semi-erected 135-degree (FIGS. 50–52), 90-degree (FIGS. 53–55), and 45-degree (FIGS. 56–58) positions. When the hinge plate(s) 50 are fully unfolded, the zero-degree position as shown in FIGS. (59–61) for both the cap portion and the eave portion of the truss is created.

Figure 62:
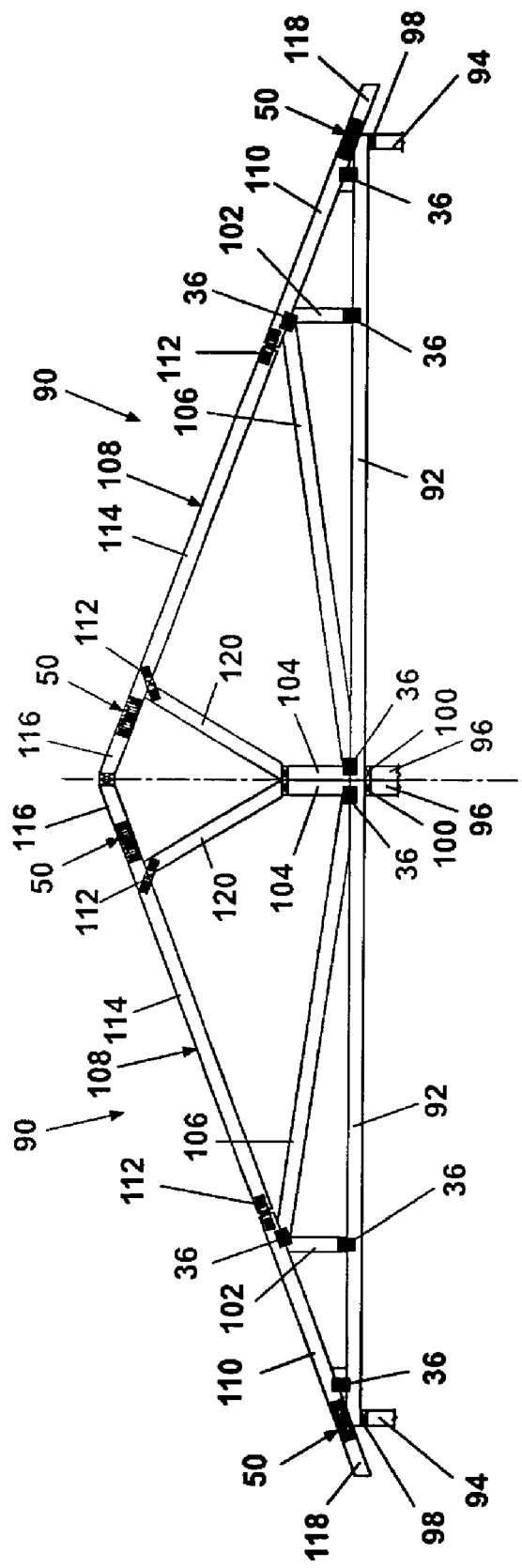
FIG. 62 is a side elevational view of an alternative embodiment of a foldable truss assembly incorporating the invention, wherein the truss shown in FIG. 62 is a truss typically known as a double-wide, monopitch truss.
Figure 63:
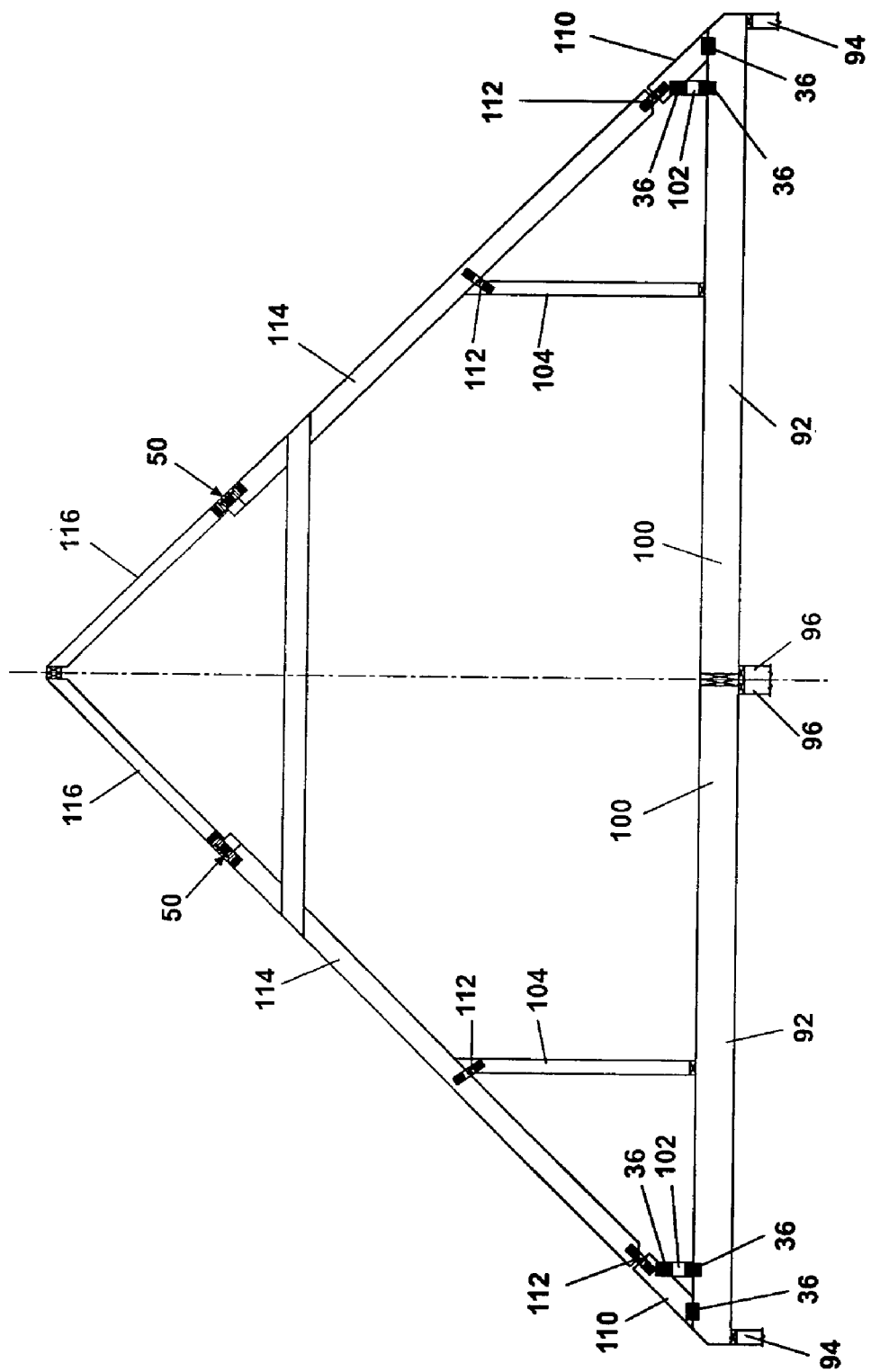
FIG. 63 is a side elevational view of an alternative embodiment of a foldable truss assembly incorporating the invention, wherein the truss shown in FIG. 63 is a truss typically known as a double-wide, Cape Cod-style truss.
Figure 66:
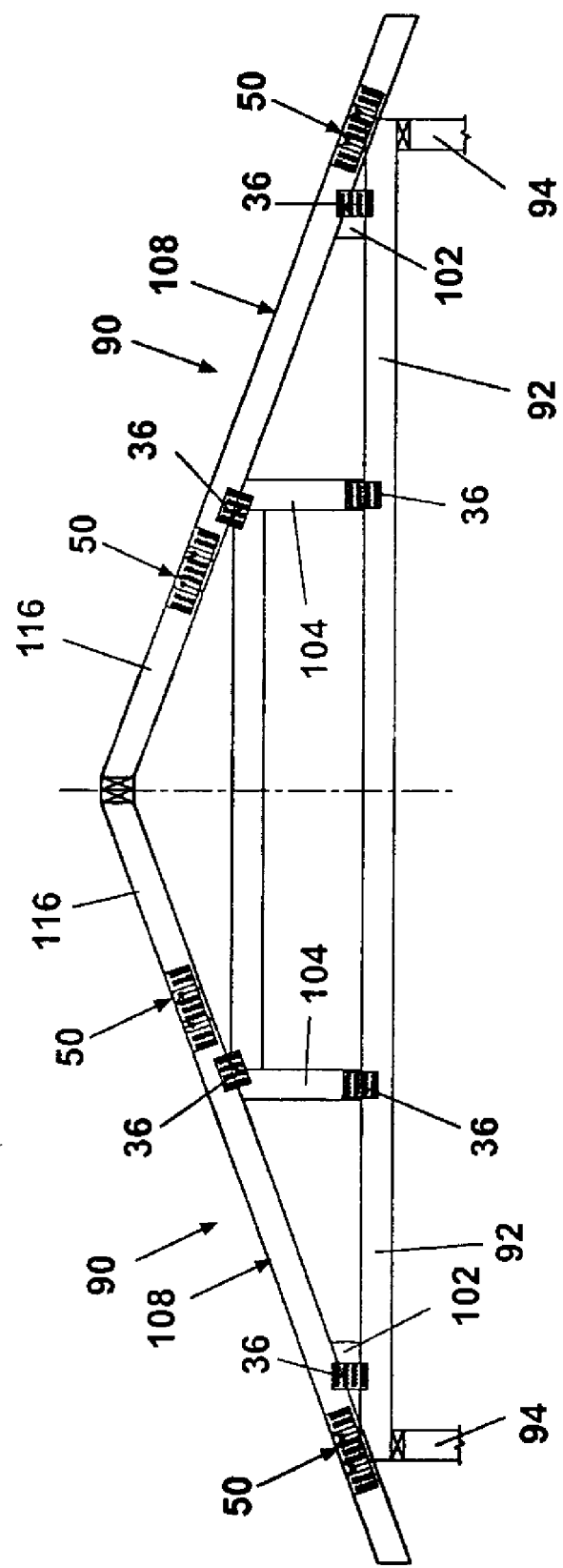
FIG. 66 is a side elevational view of an alternative embodiment of a foldable truss assembly incorporating the invention, wherein the truss shown in FIG. 66 is a truss typically known as a single-wide truss with a hinged peak as created by the invention.

Other examples of trusses 90 according to the invention are shown in FIGS. 62–67. FIG. 62 is a side elevational view of an alternative embodiment of a foldable truss assembly 90 incorporating the invention, wherein the truss shown in FIG. 62 is a truss typically known as a double-wide, monopitch truss. FIG. 63 is a side elevational view of an alternative embodiment of a foldable truss assembly 90 incorporating the invention, wherein the truss shown in FIG. 63 is a truss typically known as a double-wide, Cape Cod-style truss. FIG. 64 is a side elevational view of an alternative embodiment of a foldable truss assembly 90 incorporating the invention, wherein the truss shown in FIG. 64 is a truss typically known as a triple-wide, monopitch truss. FIG. 65 is a side elevational view of an alternative embodiment of a foldable truss 90 assembly incorporating the invention, wherein the truss shown in FIG. 65 is a truss typically known as a double-wide, storage-style truss. FIG. 66 is a side elevational view of an alternative embodiment of a foldable truss assembly 90 incorporating the invention, wherein the truss shown in FIG. 66 is a truss typically known as a single-wide truss with a hinged peak as created by the invention.

Figure 67:
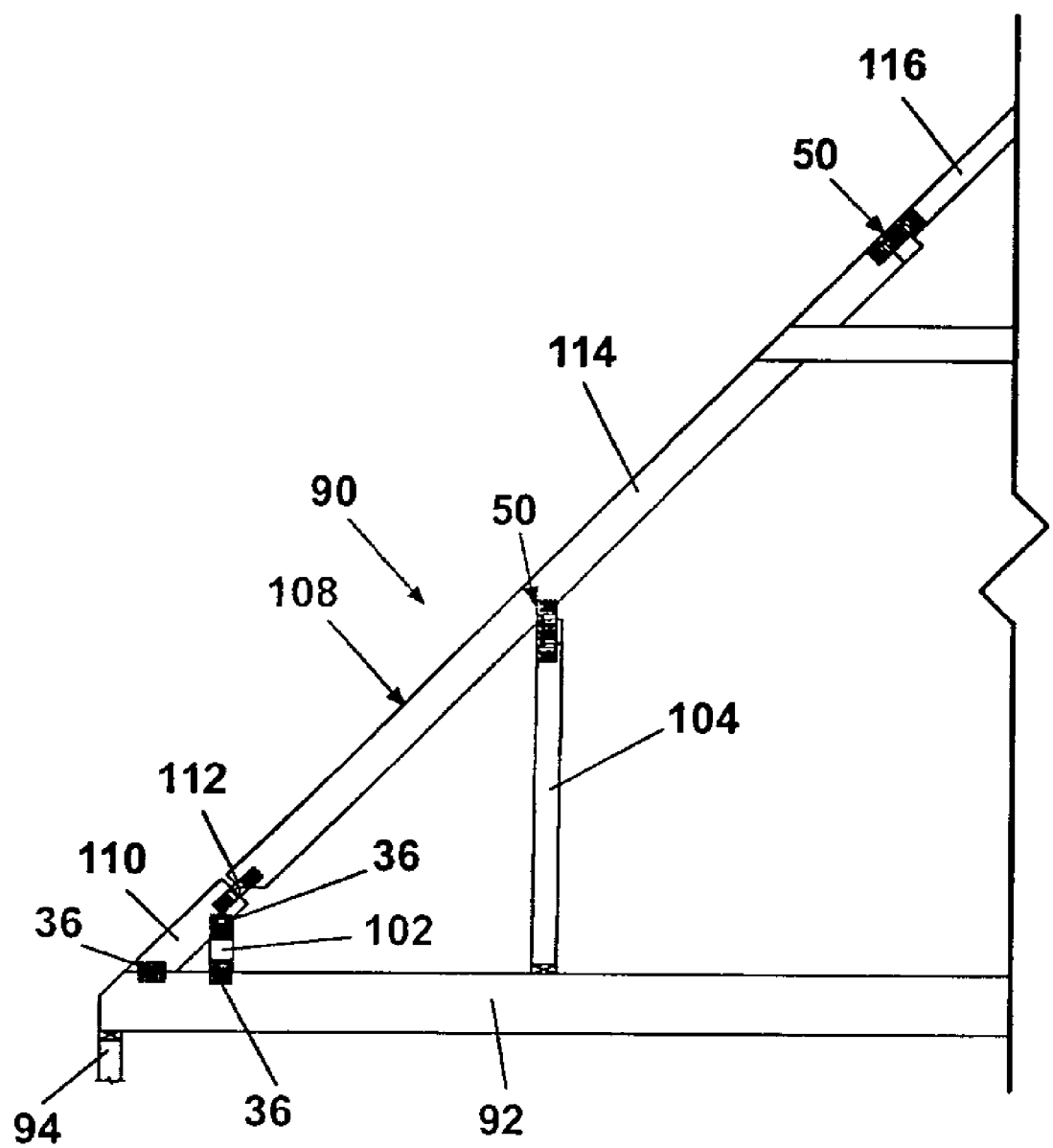
FIG. 67 is a side elevational, fragmentary view of an alternative embodiment of a foldable truss assembly incorporating the invention, wherein the truss shown in FIG. 67 includes the invention to create a hinged attachment for a kneewall, whereby folding of interior members of the truss can be performed in directions not normally found with conventional prior art trusses.

Another example of a suitable use for the hinge plate 50 in a foldable truss 90 according to the invention is shown in FIG. 67 which employs the hinge plate 50 to create a hinged attachment for a kneewall 104, whereby folding of interior members of the truss 90 can be performed in directions not normally found with conventional prior trusses, such as outwardly (counterclockwise in the orientation of FIG. 67) into the living space of the truss 90 shown therein.

While the invention has been specifically described in connection with certain specific embodiments thereof, it is to be understood that this is by way of illustration and not of limitation, and the scope of the appended claims should be construed as broadly as the prior art will permit.

The invention claimed is:

1. A hinge plate for integrally and pivotally connecting a first truss member to a second truss member comprising:
a first connector comprising a planar member having at least one mounting portion thereon, the first connector having a hinge portion thereon;
a second connector comprising a planar member having at least one mounting portion thereon, the second connector having a hinge portion thereon;
an intermediate member comprising a planar member having at least one mounting portion thereon comprising a nail plate having a plurality of teeth extending from a side, the intermediate member having a hinge portion at a first end thereof and a hinge portion at a second end thereof opposite to the first end, wherein the hinge portion on the first connector is pivotally mounted to the hinge portion on the first end of the intermediate member and the hinge portion on the second connector is pivotally mounted to the hinge portion on the second end of the intermediate member;
whereby a multifunctional pivotal mounting between truss members can be made by fastening the first connector to a first truss member and fastening the second connector to a second truss member.

2. The hinge plate of claim 1 wherein the at least one mounting portion on the first connector comprises a nail plate.

3. The hinge plate of claim 1 wherein the hinge portion on at least one of the first connector, second connector and the intermediate member comprises a roll-formed hinge portion.

4. The hinge plate of claim 1 wherein the at least one mounting portion on the second connector comprises a nail plate.

5. The hinge plate of claim 1 wherein the at least one mounting portion on the intermediate member comprises a nail plate.

6. The hinge plate of claim 1 wherein the hinge portion on at least one of the first connector, second connector and the intermediate member comprises a roll-formed hinge portion.

7. The hinge plate of claim 2 wherein the at least one mounting portion on the second connector comprises a nail plate.

8. A connector subassembly for integrally and pivotally connecting a first truss member to a second truss member comprising:
a connector block having a first end and a second end opposite from the first end, wherein the connector block has a recessed portion adapted to receive a portion of the first truss member when the first truss member is positioned in a folded position with respect to the connector block;
a first connector member extending from the first end of the connector block and pivotally attached thereto, wherein the first connector member is adapted to be fastened to a first truss member;
a second connector member extending from the second end of the connector block and pivotally attached thereto, wherein the second connector member is adapted to be fastened to a second truss member;
wherein the first connector member and the second connector member are interconnected by an intermediate member, and wherein the first connector member is hingedly connected to the intermediate member;
wherein, when the first connector is fastened to the first truss member and when the second connector is fastened to the second truss member, the first truss member can be folded reversely atop the second truss member by pivoting the first and second truss members about the respective pivotal mountings on the connector block and the connector block provides spacing for such folding to occur.

9. The connector subassembly of claim 8 wherein the second connector member is hingedly connected to the intermediate member.

10. The connector subassembly of claim 8 wherein the recessed portion comprises a chamfered portion.

11. The connector subassembly of claim 8 wherein the recessed portion comprises a notched portion.

12. The connector subassembly of claim 8 wherein the connector block has a recessed portion adapted to receive a portion of the second truss member when the second truss member is positioned in a folded position with respect to the connector block.

13. The connector subassembly of claim 8 wherein the first connector member is hingedly connected to the intermediate member.

14. The connector subassembly of claim 8 wherein the second connector member is hingedly connected to the intermediate member.

15. The connector subassembly of claim 9 wherein the intermediate member is fastened to the connector block.

16. The connector subassembly of claim 15 wherein the intermediate member comprises an integral interconnection with the connector block.

17. The connector subassembly of claim 11 wherein the notched portion is rectangular.

18. The connector subassembly of claim 12 wherein the recessed portion comprises a chamfered portion.

19. The connector subassembly of claim 12 wherein the recessed portion comprises a notched portion.

20. The connector subassembly of claim 12 wherein the connector block is made of wood.

21. The connector subassembly of claim 19 wherein the notched portion is rectangular.

22. The connector subassembly of claim 14 wherein the intermediate member is fastened to the connector block.

23. The connector subassembly of claim 22 wherein the intermediate member comprises an integral interconnection with the connector block.

24. A truss comprising:
an array of interconnected truss members including a first truss member and a second truss member;
a pivotal interconnection between the first truss member and the second truss member comprising:
a connector block having a first end and a second end opposite from the first end, wherein the connector block has a recessed portion adapted to receive a portion of the first truss member when the first truss member is positioned in a folded position with respect to the connector block;
a first connector member extending from the first end of the connector block and pivotally mounting the connector block to the first truss member;
a second connector member extending from the second end of the connector block and pivotally mounting the connector block to the second truss member;
wherein the first truss member has an inner vertical surface and the connector block has an outer vertical surface, and wherein the inner vertical surface of the first truss member and the outer vertical surface of the connector block come into abutment when the first truss member is moved to a fully unfolded position with respect to the connector block;
whereby the first truss member can be folded reversely atop the second truss member by pivoting the first and second truss members about the respective pivotal mountings on the connector block and the connector block provides spacing for such folding to occur.

25. The truss of claim 24 wherein the second truss member has an inner vertical surface and the connector block has an outer vertical surface, and wherein the inner vertical surface of the second truss member and the outer vertical surface of the connector block come into abutment when the second truss member is moved to a fully unfolded position with respect to the connector block.

26. The truss of claim 24 wherein the recessed portion comprises a chamfered portion.

27. The truss of claim 24 wherein the recessed portion comprises a notched portion.

28. The truss of claim 24 wherein the connector block has a recessed portion adapted to receive a portion of the second truss member when the second truss member is positioned in a folded position with respect to the connector block.

29. The truss of claim 24 wherein the truss comprises a monopitch truss.

30. The truss of claim 24 wherein the truss comprises a double-wide truss.

31. The truss of claim 24 wherein the truss comprises a triple-wide truss.

32. The truss of claim 24 wherein the truss comprises a Cape Cod-style truss.

33. The truss of claim 24 wherein the truss comprises a storage-type truss.

34. The truss of claim 24 wherein at least one of the first and second truss members is a chord.

35. The truss of claim 24 wherein at least one of the first and second truss members is a kneewall.

36. The truss of claim 24 wherein at least one of the first and second truss members forms an eave portion of the truss.

37. The truss of claim 24 wherein at least one of the first and second truss members forms a peak portion of the truss.

38. The truss of claim 27 wherein the notched portion is rectangular.

39. The truss of claim 28 wherein the recessed portion comprises a chamfered portion.

40. The truss of claim 28 wherein the recessed portion comprises a notched portion.

41. The truss of claim 28 wherein the truss comprises a monopitch truss.

42. The truss of claim 28 wherein the truss comprises a double-wide truss.

43. The truss of claim 28 wherein the truss comprises a triple-wide truss.

44. The truss of claim 28 wherein the truss comprises a Cape Cod-style truss.

45. The truss of claim 28 wherein the truss comprises a storage-type truss.

46. The truss of claim 40 wherein the notched portion is rectangular.

47. A truss comprising:
an array of interconnected truss members comprising at least a first truss member and a second truss member;
a connector block having a first end and a second end opposite from the first end;
an intermediate member mounted to the connector block the intermediate member comprising a nail plate having a plurality of teeth extending from a side;
a first connector member mounted to the first truss member and pivotally mounted to the intermediate member;
a second connector member mounted to the second truss member and pivotally mounted to the intermediate member;
wherein the first truss member can be folded reversely atop the second truss member by pivoting the first and second truss members about the respective pivotal mountings to the intermediate member and the connector block provides spacing for such folding to occur.

48. The truss of claim 47 wherein the first truss member has an inner vertical surface and the connector block has an outer vertical surface, and wherein the inner vertical surface of the first truss member and the outer vertical surface of the connector block come into abutment when the first truss member is moved to a fully unfolded position with respect to the connector block.

49. The truss of claim 47 wherein the second truss member has an inner vertical surface and the connector block has an outer vertical surface, and wherein the inner vertical surface of the second connector member and the outer vertical surface of the connector block come into abutment when the second truss member is moved to a fully unfolded position with respect to the connector block.

50. The truss of claim 47 wherein the connector block has a recessed portion adapted to receive a portion of the first truss member when the first truss member is positioned in a folded position with respect to the connector block.

51. The truss of claim 47 wherein the connector block has a recessed portion adapted to receive a portion of the second truss member when the second truss member is positioned in a folded position with respect to the connector block.

52. The truss of claim 48 wherein the second truss member has an inner vertical surface and the connector block has an outer vertical surface, and wherein the inner vertical surface of the second truss member and the outer vertical surface of the connector block come into abutment when the second truss member is moved to a fully unfolded position with respect to the connector block.

53. The truss of claim 52 wherein the connector block has a recessed portion adapted to receive a portion of the first truss member when the first truss member is positioned in a folded position with respect to the connector block.

54. The truss of claim 53 wherein the recessed portion comprises a chamfered portion.

55. The truss of claim 53 wherein the recessed portion comprises a notched portion.

56. The truss of claim 53 wherein the connector block has a recessed portion adapted to receive a portion of the second truss member when the second truss member is positioned in a folded position with respect to the connector block.

57. The truss of claim 55 wherein the notched portion is rectangular.

58. The truss of claim 56 wherein the recessed portion comprises a chamfered portion.

59. The truss of claim 56 wherein the recessed portion comprises a notched portion.

60. The truss of claim 50 wherein the recessed portion comprises a chamfered portion.

61. The truss of claim 50 wherein the recessed portion comprises a notched portion.

62. The truss of claim 61 wherein the notched portion is rectangular.

63. The truss of claim 51 wherein the recessed portion comprises a chamfered portion.

64. The truss of claim 51 wherein the recessed portion comprises a notched portion.

65. A connector subassembly for integrally and pivotally connecting a first truss member to a second truss member comprising:
   a connector block having a first end and a second end opposite from the first end;
   a first connector member extending from the first end of the connector block and pivotally attached thereto, wherein the first connector member is adapted to be fastened to a first truss member;
   a second connector member extending from the second end of the connector block and pivotally attached thereto, wherein the second connector member is adapted to be fastened to a second truss member;
   wherein the first connector member and the second connector member are interconnected by an intermediate member;
   wherein, when the first connector is fastened to the first truss member and when the second connector is fastened to the second truss member, the first truss member can be folded reversely atop the second truss member by pivoting the first and second truss members about the respective pivotal mountings on the connector block and the connector block provides spacing for such folding to occur; and
   wherein the connector block has a recessed portion adapted to receive a portion of the first truss member when the first truss member is positioned in a folded position with respect to the connector block.

66. The connector subassembly of claim 65 wherein the recessed portion comprises a chamfered portion.

67. The connector subassembly of claim 65 wherein the recessed portion comprises a notched portion.

68. The connector subassembly of claim 67 wherein the notched portion is rectangular.

* * * * *